US012563631B2

(12) United States Patent
Chun et al.

(10) Patent No.: US 12,563,631 B2
(45) Date of Patent: Feb. 24, 2026

(54) MULTICAST BROADCAST SERVICE CONTROL

(71) Applicant: KONINKLIJKE PHILIPS N.V., Eindhoven (NL)

(72) Inventors: SungDuck Chun, Fairfax, VA (US); Kyungmin Park, Vienna, VA (US); Esmael Hejazi Dinan, McLean, VA (US); Jian Xu, McLean, VA (US); Peyman Talebi Fard, Vienna, VA (US); Weihua Qiao, Herndon, VA (US); Stanislav Filin, Chantilly, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/040,420

(22) Filed: Jan. 29, 2025

(65) Prior Publication Data

US 2025/0176057 A1 May 29, 2025

Related U.S. Application Data

(63) Continuation of application No. PCT/US2023/028849, filed on Jul. 27, 2023.

(Continued)

(51) Int. Cl.
*H04W 76/20* (2018.01)
*H04W 36/08* (2009.01)
(Continued)

(52) U.S. Cl.
CPC ........... *H04W 76/20* (2018.02); *H04W 36/08* (2013.01); *H04W 76/30* (2018.02); *H04W 76/40* (2018.02)

(58) Field of Classification Search
CPC ..... H04W 76/20; H04W 36/08; H04W 76/30; H04W 76/40
See application file for complete search history.

(56) References Cited

U.S. PATENT DOCUMENTS

2021/0105196 A1* 4/2021 Dao ...................... H04L 43/026
2021/0289471 A1 9/2021 Zhu et al.
(Continued)

FOREIGN PATENT DOCUMENTS

EP    4 207 936 A1    7/2023
EP    4 255 020 A1    10/2023
(Continued)

OTHER PUBLICATIONS

3GPP TS 23.247 V17.2.0 (Mar. 2022); Technical Specification; 3rd Generation Partnership Project; Technical Specification Group Services and System Aspects; Architectural enhancements for 5G multicast-broadcast services; Stage 2; (Release 17).

(Continued)

*Primary Examiner* — Will W Lin
(74) *Attorney, Agent, or Firm* — Peter Flanagan; Kavon Nasabzadeh; Jacob L. Mangan

(57)    ABSTRACT

A method can include receiving, by a wireless device from a first base station, a radio resource control (RRC) release message indicating transition of the wireless device from an RRC connected state to an RRC inactive state or an RRC idle state. The method can also include performing a cell reselection of a cell of a second base station. The method can further include determining, after the cell reselection, that a configuration in the cell for a multicast and broadcast service (MBS) session that the wireless device has joined is not supported for the RRC inactive state or the RRC idle state. The method can additionally include sending, in the RRC inactive state or the RRC idle state to the second base station and based on the determining associated with the MBS session, an RRC resume request comprising an indication of a cause for the RRC resume request.

20 Claims, 30 Drawing Sheets

Related U.S. Application Data

(60) Provisional application No. 63/393,675, filed on Jul. 29, 2022.

(51) Int. Cl.
 *H04W 76/30* (2018.01)
 *H04W 76/40* (2018.01)

(56) References Cited

U.S. PATENT DOCUMENTS

| | | | |
|---|---|---|---|
| 2021/0321226 A1 | 10/2021 | Zhang et al. | |
| 2021/0392467 A1 | 12/2021 | Kim et al. | |
| 2021/0410045 A1 | 12/2021 | Kadiri et al. | |
| 2022/0132467 A1 | 4/2022 | Shrivastava et al. | |
| 2022/0232403 A1 | 7/2022 | Lee et al. | |
| 2022/0232609 A1 | 7/2022 | Lee et al. | |
| 2022/0272662 A1 | 8/2022 | Kim | |
| 2022/0286818 A1 | 9/2022 | Chin et al. | |
| 2022/0322160 A1* | 10/2022 | Baek | H04W 76/40 |
| 2022/0322355 A1 | 10/2022 | Sebire et al. | |
| 2023/0269828 A1* | 8/2023 | Shrivastava | H04W 48/08 370/312 |
| 2023/0319905 A1* | 10/2023 | Zhang | H04W 76/20 370/329 |
| 2023/0354465 A1 | 11/2023 | Fujishiro et al. | |
| 2023/0370905 A1 | 11/2023 | Babaei | |
| 2024/0155437 A1 | 5/2024 | Xie | |
| 2024/0214988 A1 | 6/2024 | Shrivastava et al. | |
| 2024/0224209 A1* | 7/2024 | Lee | H04W 76/30 |
| 2025/0039745 A1* | 1/2025 | Chen | H04W 36/0064 |

FOREIGN PATENT DOCUMENTS

| | | |
|---|---|---|
| EP | 4 311 371 A1 | 1/2024 |
| EP | 4 322 559 A1 | 2/2024 |
| GB | 2620980 A | 1/2024 |
| GB | 2620995 A | 1/2024 |
| GB | 2621109 A | 2/2024 |
| WO | 2022/031127 A1 | 2/2022 |
| WO | 2022/033168 A1 | 2/2022 |
| WO | 2022/054876 A1 | 3/2022 |
| WO | 2022/086109 A1 | 4/2022 |
| WO | 2023/123408 A1 | 7/2023 |
| WO | 2023/194206 A1 | 10/2023 |
| WO | 2023/197152 A1 | 10/2023 |
| WO | 2023/217773 A1 | 11/2023 |
| WO | 2023/230854 A1 | 12/2023 |
| WO | 2023/230855 A1 | 12/2023 |
| WO | 2023/230856 A1 | 12/2023 |
| WO | 2023/236014 A1 | 12/2023 |
| WO | 2024/000384 A1 | 1/2024 |
| WO | 2024/011353 A1 | 1/2024 |
| WO | 2024/011491 A1 | 1/2024 |
| WO | 2024/016335 A1 | 1/2024 |
| WO | 2024/034478 A1 | 2/2024 |

OTHER PUBLICATIONS

3GPP TR 23.700-47 V0.3.0 (May 2022); Technical Report; 3rd Generation Partnership Project; Technical Specification Group Services and System Aspects; Study on architectural enhancements for 5G multicast-broadcast services; Phase 2; (Release 18).
R3-223991; 3GPP TSG-RAN WG3 #116-e; Online, May 9-19, 2022; was R3-223383; Change Request; 37.483; CR 0009; rev 1; Current version: 17.0.0.
R3-224065; 3GPP TSG-RAN WG3#116-e; E-meeting, May 9-19, 2022; was R3-223980; Change Request; 37.483; CR 0013; rev 3; Current version: 17.0.0.
R3-223842; 3GPP TSG-RAN WG3 Meeting #116-e; E-meeting, May 9-May 19, 2022; Change Request; 37.483; CR 0015; rev 1; Current version: 17.0.0.
R2-2206726; 3GPP TSG-RAN WG2 Meeting #118-e; E-meeting, May 9-May 20, 2022; was R3-223824; Change Request; 38.300; CR 0483; rev -; Current version: 17.0.0.
R2-2206815; 3GPP TSG-RAN WG2 Meeting #118-e; Online, May 9-May 20, 2022; Change Request; 38.300; CR 0492; rev -; Current version: 17.0.0.
R2-2206771; 3GPP TSG-RAN WG2 Meeting #118 electronic; Online, May 9-May 20, 2022; Change Request; 38.321; CR 1301; rev 1; Current version: 17.0.0.
R2-2206610; 3GPP TSG RAN2#118-e; E-meeting, May 9-20, 2022; Change Request; 38.331; CR 3138; rev 1; Current version: 17.0.0.
R3-224064; 3GPP TSG-RAN WG3#116-e; E-Meeting, May 9-May 19, 2022; Change Request; 38.401; CR 0214; rev 2; Current version: 17.0.0.
R3-223827; 3GPP TSG-RAN WG3 Meeting #116-e; E-meeting, May 9-May 19, 2022; Change Request; 38.410; CR 0040; rev 1; Current version: 17.0.0.
3GPP TS 38.413 V17.0.0 (Apr. 2022); Technical Specification; 3rd Generation Partnership Project; Technical Specification Group Radio Access Network; NG-RAN; NG Application Protocol (NGAP); (Release 17).
R3-223971; 3GPP TSG-RAN WG3 Meeting #116-e; Online, May 9-19, 2022; Change Request; 38.413; CR 0764; rev 2; Current version: 17.0.0.
R3-224078; 3GPP TSG-RAN WG3 #116-e; Online, May 9-19, 2022; was R3-223834; Change Request; 38.413; CR 0801; rev 2; Current version: 17.0.0.
R3-223828; 3GPP TSG-RAN WG3 Meeting #116-e; E-meeting, May 9-May 19, 2022; Change Request; 38.413; CR 0843; rev 1; Current version: 17.0.0.
R3-223817; 3GPP TSG-RAN Meeting # 116-e; May 9-May 19, 2022; Change Request; 38.420; CR 0028; rev 1; Current version: 17.0.0.
3GPP TS 38.423 V17.0.0 (Apr. 2022); Technical Specification; 3rd Generation Partnership Project; Technical Specification Group Radio Access Network; NG-RAN; Xn application protocol (XnAP); (Release 17).
R3-224077; 3GPP TSG-RAN WG3#116-e; E-meeting, May 9-19, 2022; Change Request; 38.423; CR 0815; rev 2; Current version: 17.0.0.
R3-223606; 3GPP TSG-RAN WG3 Meeting #116-e; May 9-19, 2022; Online; Change Request; 38.423; CR 0834; rev -; Current version: 17.0.0.
R3-223823; 3GPP TSG-RAN WG3 Meeting #116-e; May 9-19, 2022; Online; Change Request; 38.423; CR 0835; rev 1; Current version: 17.0.0.
R3-223829; 3GPP TSG-RAN WG3 Meeting #116-e; E-meeting, May 9-May 19, 2022; Change Request; 38.470; CR 0088; rev 1; Current version: 17.0.0.
R3-223830; 3GPP TSG-RAN WG3 Meeting #116-e; E-meeting, May 9-May 19, 2022; Change Request; 38.473; CR 0865; rev 1; Current version: 17.0.0.
R3-223080; 3GPP TSG-RAN WG3 Meeting #116-e; E-meeting, May 9-May 19, 2022; Change Request; 38.473; CR 0866; rev -; Current version: 17.0.0.
R3-223286; 3GPP TSG-RAN WG3#116-e; E-Meeting, May 9-May 19, 2022; Change Request; 38.473; CR 0897; rev; Current version: 17.0.0.
R3-223837; 3GPP RAN WG3 Meeting #116-e; Online, May 9-19, 2022; Change Request; TS 38.473; CR 0938; rev 1; Current version: 17.0.0.
R2-2007014; 3GPP TSG-RAN WG2 Meeting #111 electronic; Online, Aug. 17-28, 2020; Title: Some consideration for IDLE mode and In_Active mode UE; Source: NEC; Agenda item: 8.1.3; Document for: Discussion and Approval.
R2-2007029; 3GPP TSG-RAN WG2 Meeting #111-e; Electronic meeting, Aug. 17 - 28, 2020; Agenda item: 8.1.3; Source: Huawei, HiSilicon; Title: Idle/Inactive UE support for NR MBS; Document for: Discussion and Decision.
R2-2007037; 3GPP TSG-RAN WG2 Meeting #111 electronic; E-Meeting, Aug. 17-Aug. 28, 2020; Source: vivo; Title: Discussion on idle and inactive mode UEs; Agenda Item: 8.1.3; Document for: Discussion and Decision.

(56) References Cited

OTHER PUBLICATIONS

R2-2009611; 3GPP TSG-RAN WG2 Meeting #112 electronic; Online, Nov. 2-13, 2020; Title: Idle/In_Active UE support of MBS; Source: NEC; Agenda item: 8.1.3; Document for: Discussion and Approval.

R2-2103178; 3GPP TSG-RAN WG2 Meeting #113bis-e; E-Meeting: Apr. 12-19, 2021; Revision of R2-2100320; Agenda item: 8.1.3; Source: Qualcomm Inc.; Title: NR MBS control signalling aspects for UEs in different RRC states; WI Code: NR_MBS; Document for: Discussion and Decision.

R2-2104937; 3GPP TSG-RAN WG2 Meeting #114 electronic; Online, May 19-May 27, 2021; revision of R2-2102894; Agenda Item: 8.1.3; Source: OPPO; Title: Discussion on MBS interesting indication and service continuity for delivery mode 2; Document for: Discussion and decision.

R2-2105099; 3GPP TSG-RAN WG2 Meeting #114-e; E-meeting, May 19-May 27, 2021; Agenda Item: 8.1.3; Source: Apple; Title: Access Control for the MBS Service Reception; Document for: Discussion and Decision.

R2-2105669; 3GPP TSG-RAN WG2 Meeting #114 Electronic; Elbonia, May 19-27, 2021; Agenda item: 8.1.3; Source: Nokia, Nokia Shanghai Bell; Title: MBS Session Activation and Group Paging; WID/SID: NR_MBS-Core—Release 17; Document for: Discussion and Decision.

R3-206309; 3GPP TSG-RAN WG3 #110 electronic; Online, Nov. 2-12, 2020; Agenda Item: 22.2.4; Source: CATT; Title: MBS reception of Idle and In-active UEs; Document for: Discussion, Decision.

RP-213568; 3GPP TSG RAN Meeting #94-e; E-meeting, Dec. 6-17, 2021; (revision of RP-212714); Source: CATT; Title: New WID: Enhancements of NR Multicast and Broadcast Services; Document for: Approval; Agenda Item: 8A.2.

RP-221458; 3GPP TSG RAN Meeting #96; Budapest, Hungary, Jun. 6-9, 2022 (revision of RP-213568); Source: Catt, Cbn; Title: Revised WID: Enhancements of NR Multicast and Broadcast Services; Document for: Approval; Agenda Item: 9.3.2.8.

RP-221626; 3GPP TSG-RAN Meeting #96; Budapest, Hungary, Jun. 6-9, 2022; Agenda Item: 9.3.2.8; Source: Ericsson; Title: Proposed Updates on Rel-18 MBS WID along open topics from Rel-17; Document for: Discussions & Approval.

RP-221627; 3GPP TSG RAN Meeting #96; Budapest, Hungary, Jun. 6-9, 2022; (revision of RP-213568); Source: Ericsson; Title: Proposed WID update: Enhancements of NR Multicast and Broadcast Services; Document for: Approval; Agenda Item: 9.3.2.8.

S2-2203935; 3GPP SA WG2 Meeting #151E; May 16-20, 2022, Elbonia; (Revision of); Source: Ericsson; Title: KI#1, Sol#5: update to clarify RAN specific aspects; Document for: Approval; Agenda Item: 9.18; Work Item / Release: FS_5MBS_Ph2/ Rel-18.

S2-2203972; SaA WG2 Meeting #151E; May 16-20, 2022, Elbonia; Source:Nokia, Nokia Shanghai Bell; Title: solution proposal for key issue 1 (inactive reception); Document for: Approval; Agenda Item: 9.18; Work Item / Release: FS_MBS2 / Rel-18.

S2-2204265; 3GPP TSG-WG SA2 Meeting #151E e-meeting; Elbonia, May 16-20, 2022; (revision of S2-220xxxx); Source: Huawei, HiSilicon; Title: KI #1, Sol #1: Update of Solution 1 of 23700-47; Document for: Approval; Agenda Item: 9.18; Work Item / Release: FS_5MBS_Ph2 / Rel-18.

S2-2204309; 3GPP TSG-WG SA2 Meeting #151E e-meeting; Elbonia, May 16-20, 2022; (revision of S2-220xxxx); Source: Huawei, HiSilicon; Title: KI#1, update Solution #5: Mobility Procedures for UE supporting RRC Inactive MBS data reception; Document for: Approval; Agenda Item: 9.18; Work Item / Release: FS_5MBS_Ph2/ Rel-18.

S2-2204320; SA WG2 Meeting #151E (e-meeting); May 16-20, 2022; Source: CATT; Title: Solution for KI#1#6: MM procedure enhancements for multicast reception; Document for: Approval; Agenda Item: 9.18; Work Item / Release: FS_5MBS_Ph2 / Rel-18.

S2-2204323; SA WG2 Meeting #151E (e-meeting); May 16-20, 2022; Source: CATT; Title: Update to Solution#5 for KI#1; Document for: Approval; Agenda Item: 9.18; Work Item / Release: FS_5MBS_Ph2 / Rel-18.

S2-2204565; SA WG2 Meeting #S2-151E; May 16-20, 2022, Electronic, Elbonia; (revision of S2-220xxxx); Source: ZTE; Title: KI#1 add solution on MBS session activation for RRC Inactive MBS data receiving UE; Document for: Approval; Agenda Item: 9.18; Work Item / Release: FS_MBS2 / Rel-18.

International Search Report and Written Opinion of the International Searching Authority mailed Nov. 29, 2023, in International Application No. PCT/US2023/028849.

R3-220746; 3GPP TSG-RAN WG3 Meeting #114bis-e; Jan. 17-26, 2022; Change Request; 38.423; CR rev; Current version: 16.8.0.

R2-2200880; 3GPP TSG-RAN WG2 Meeting #115 Electronic; Elbonia, Jan. 17-25, 2022; Agenda item: 8.1.3.1; Source: Nokia, Nokia Shanghai Bell; Title: Broadcast Service Continuity; WID/ SID: NR MBS-Core—Release 17; Document for: Discussion and Decision.

3GPP TS 38.300 V17.1.0 (Jun. 2022); Technical Specification; 3rd Generation Partnership Project; Technical Specification Group Radio Access Network; NR; NR and NG-RAN Overall Description; Stage 2; (Release 17).

3GPP TS 38.331 V17.1.0 (Jun. 2022); Technical Specification; 3rd Generation Partnership Project; Technical Specification Group Radio Access Network; NR. Radio Resource Control (RRC) protocol specification; (Release 17).

3GPP TS 38.423 V17.1.0 (Jun. 2022); Technical Specification; 3rd Generation Partnership Project; Technical Specification Group Radio Access Network; NG-RAN; Xn application protocol (XnAP); (Release 17).

3GPP TS 38.413 V17.1.1 (Jun. 2022); Technical Specification; 3rd Generation Partnership Project; Technical Specification Group Radio Access Network; NG-RAN; NG Application Protocol (NGAP); (Release 17).

* cited by examiner

Figures 14A, 14B, 14C, 14D:
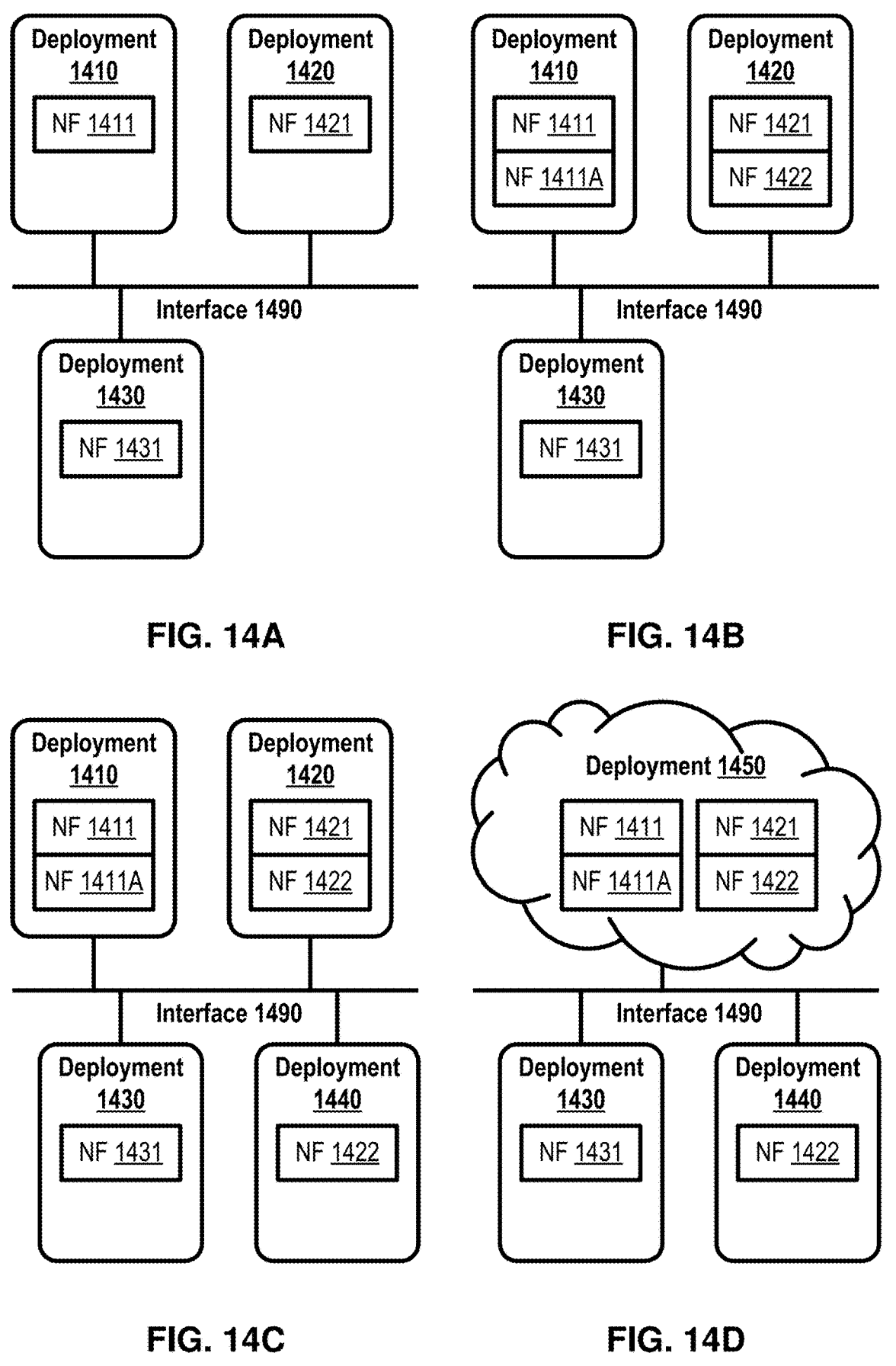

Deployment 1410

NF 1411

Deployment 1420

NF 1421

Interface 1490

Deployment 1430

Deployment 1410

NF 1411

NF 1411A

Deployment 1420

NF 1421

NF 1422

Interface 1490

Deployment 1430

Deployment 1410

NF 1411

NF 1411A

Deployment 1420

NF 1421

NF 1422

Interface 1490

Deployment 1430

NF 1431

Deployment 1440

Deployment 1450

NF 1411

NF 1411A

NF 1421

NF 1422

Interface 1490

Deployment 1430

NF 1431

Deployment 1440

Content from multicast server is transmitted by multiple base stations.

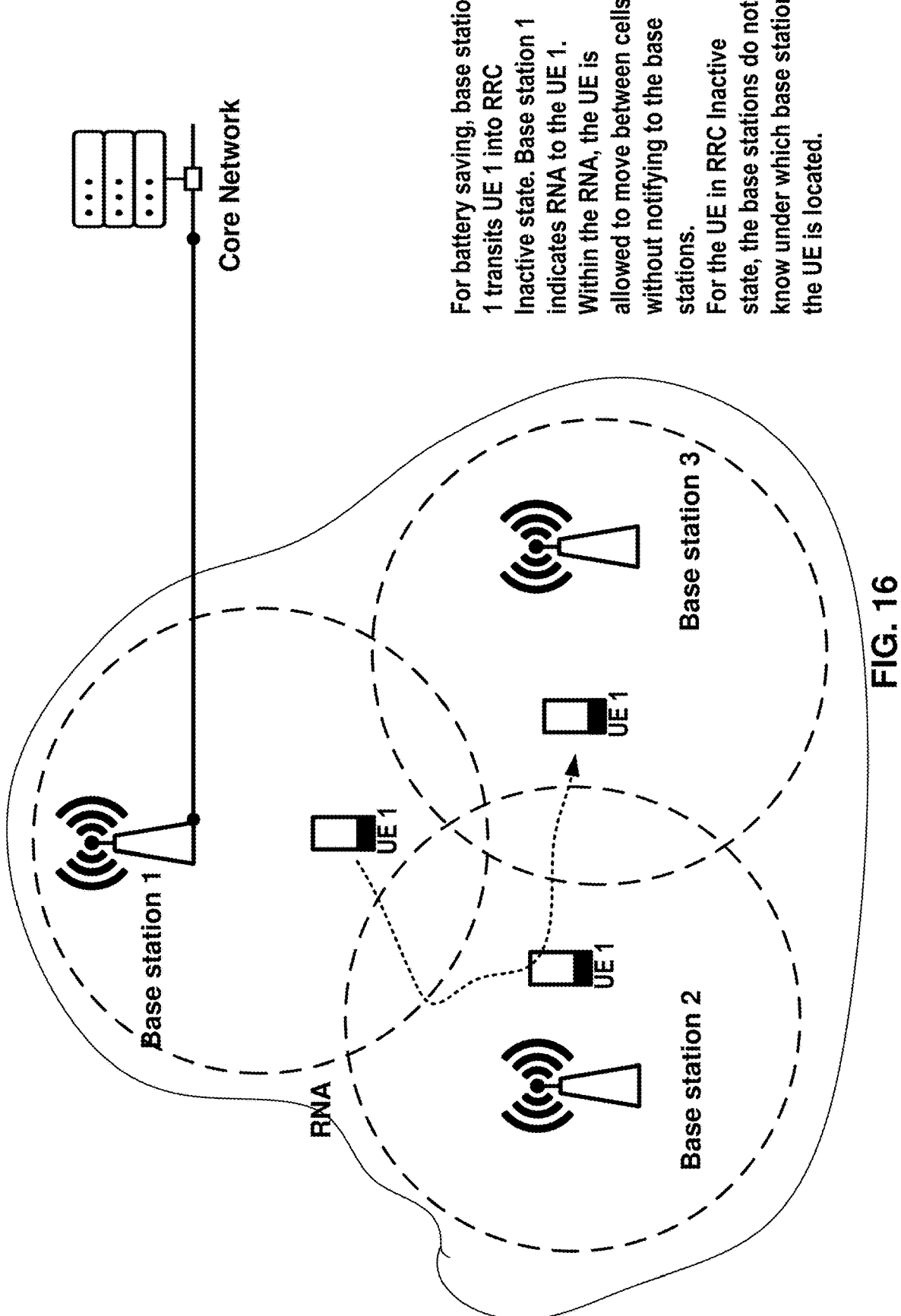

For battery saving, base station 1 transits UE 1 into RRC Inactive state. Base station 1 indicates RNA to the UE 1. Within the RNA, the UE is allowed to move between cells without notifying to the base stations.

For the UE in RRC Inactive state, the base stations do not know under which base station the UE is located.

Core Network

Base station 1

Base station 2

Base station 3

RNA

MULTICAST BROADCAST SERVICE CONTROL

CROSS-REFERENCE TO RELATED APPLICATIONS

This application is a continuation of International Application No. PCT/US2023/028849, filed Jul. 27, 2023, which claims the benefit of U.S. Provisional Application No. 63/393,675, filed Jul. 29, 2022, all of which are hereby incorporated by reference in their entireties.

BRIEF DESCRIPTION OF THE DRAWINGS

Examples of several of the various embodiments of the present disclosure are described herein with reference to the drawings.

FIG. 7A, FIG. 7B, and FIG. 7C illustrate a user plane protocol stack, a control plane protocol stack, and services provided between protocol layers of the user plane protocol stack.

FIG. 14A, FIG. 14B, FIG. 14C, and FIG. 14D illustrate various examples of physical core network deployments, each having one or more network functions or portions thereof.

FIG. 16 is an example diagram of an aspect of an embodiment of the present disclosure.

DETAILED DESCRIPTION

Figures 1A, 1B:
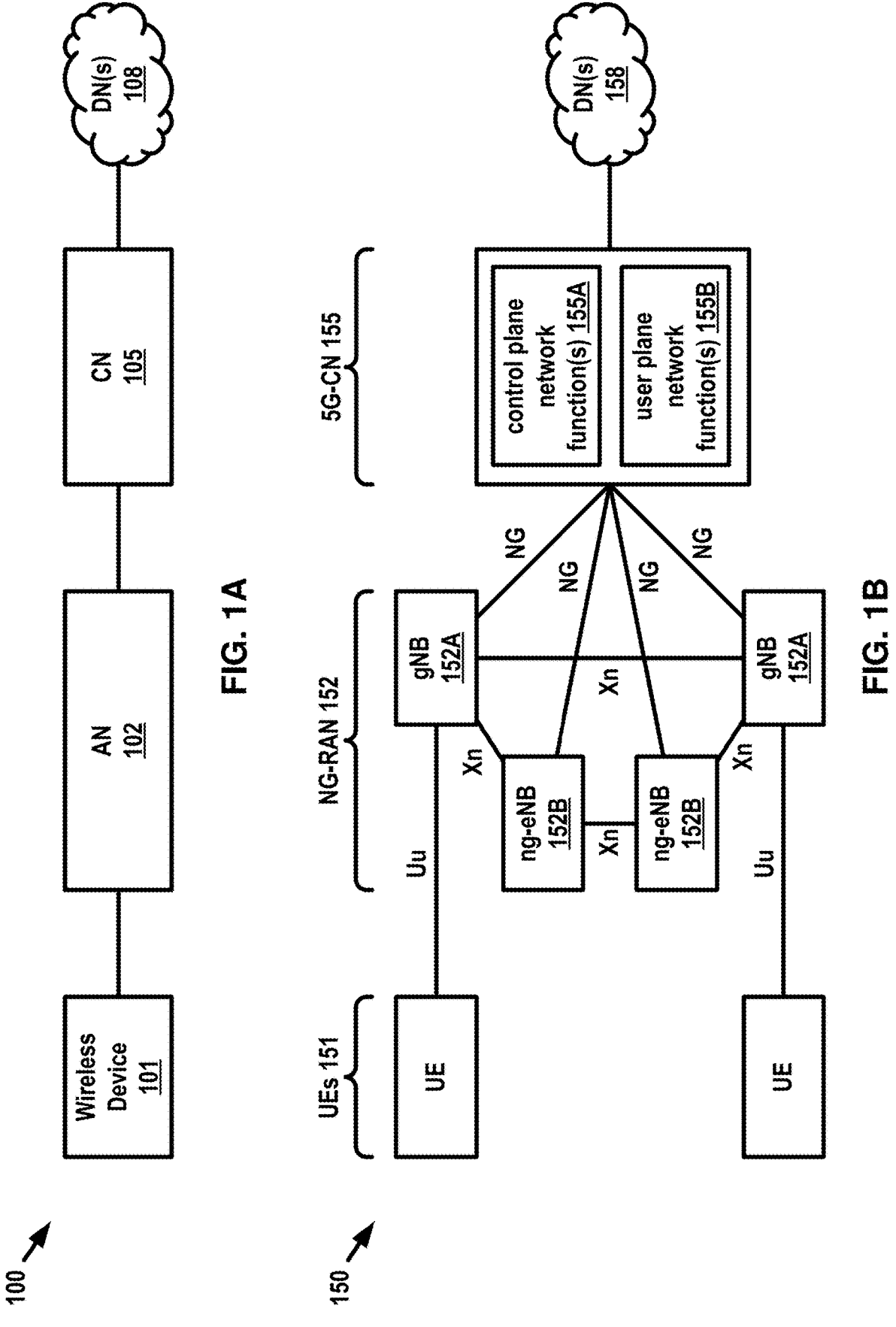
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations.

For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, Wi-Fi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNS (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such a service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figures 2A, 2B, 2C, 2D:
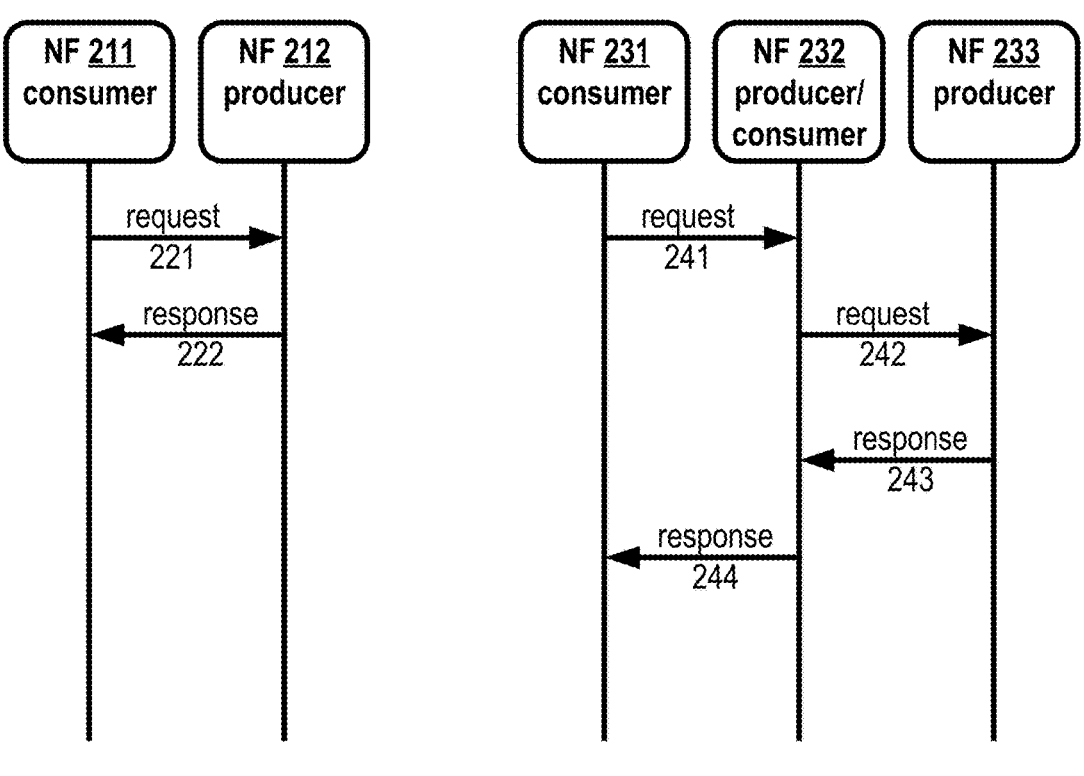
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
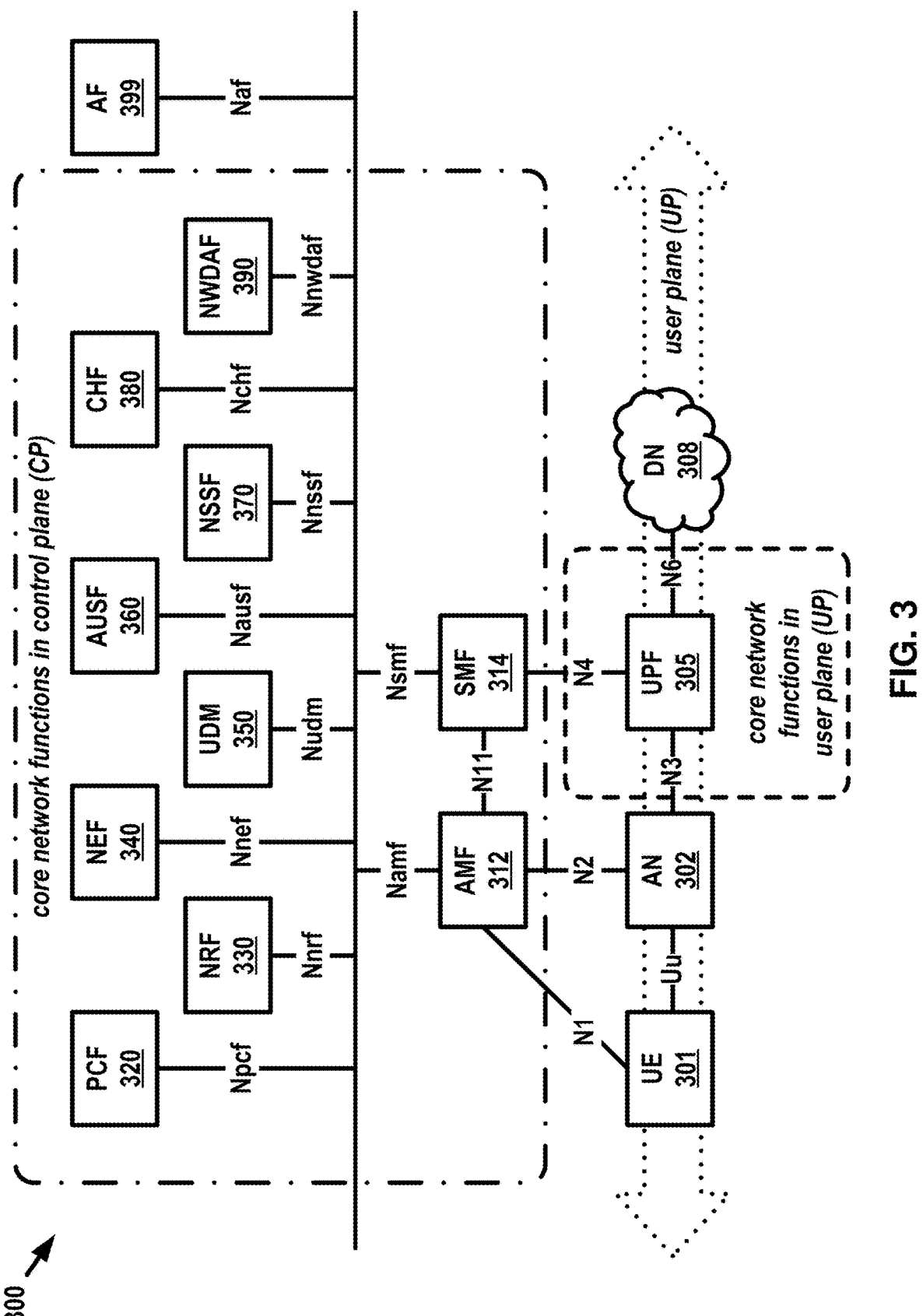
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network.

For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QOS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
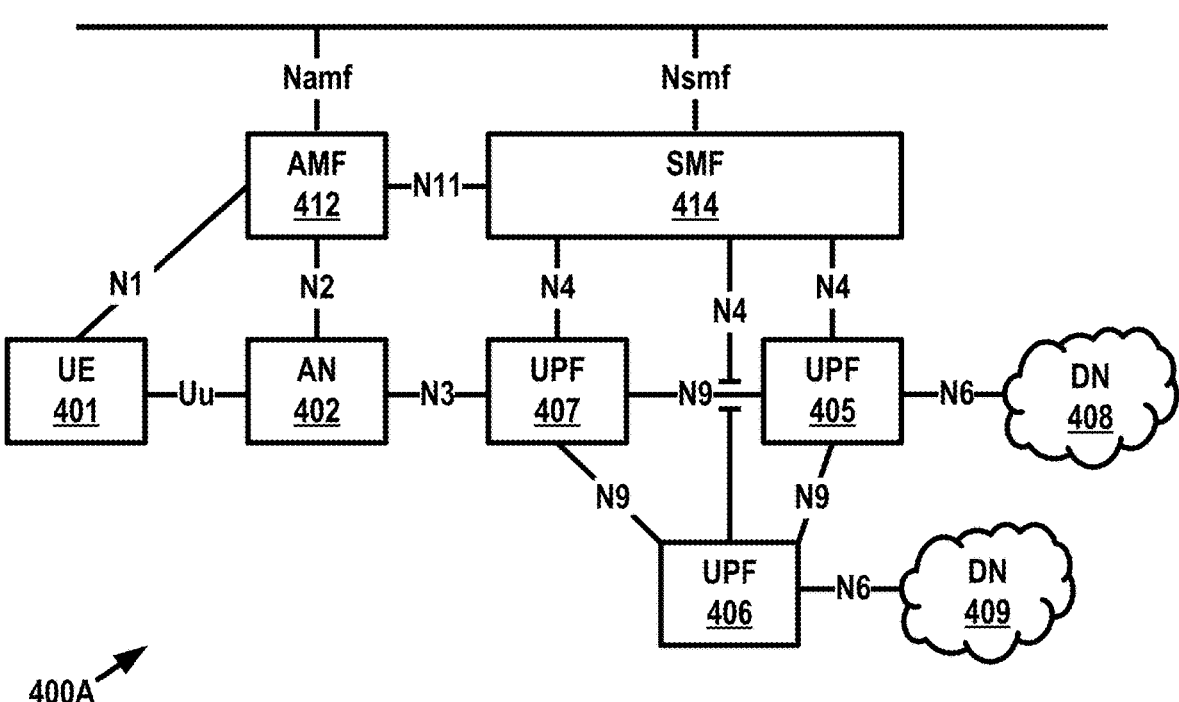
FIG. 4A and FIG. 4B illustrate example of core network architecture with multiple user plane functions and untrusted access.
Figure 4B:
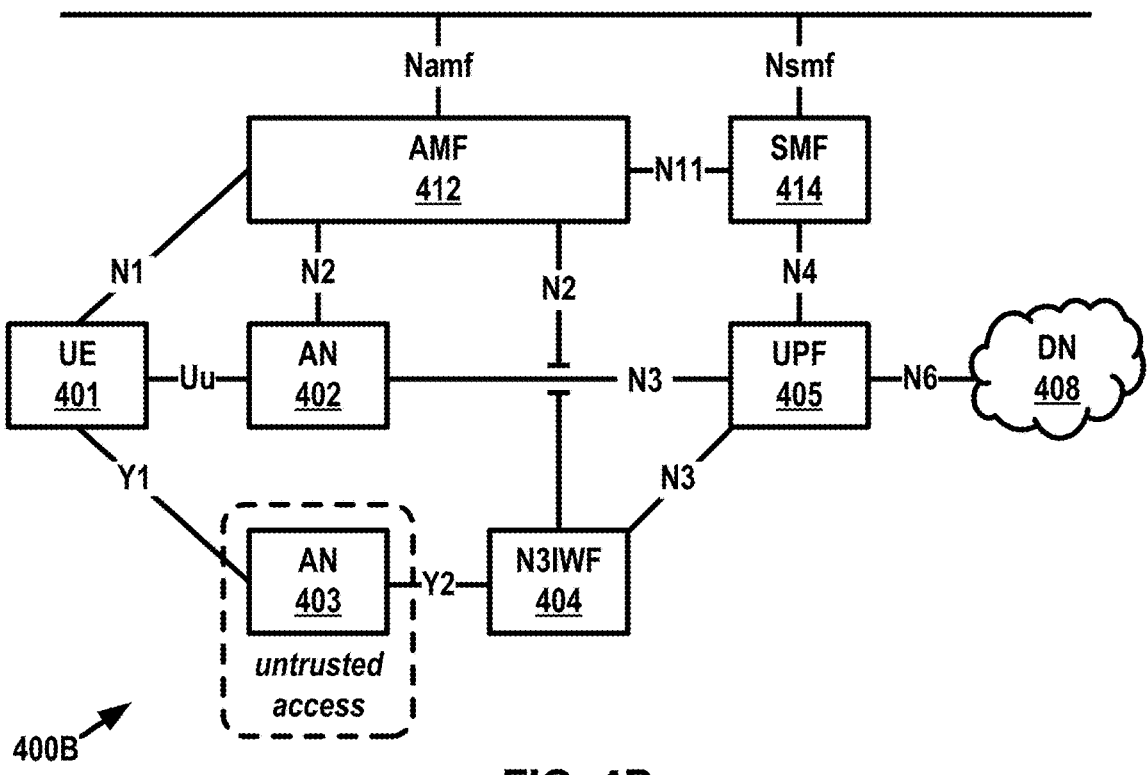
Figure 5:
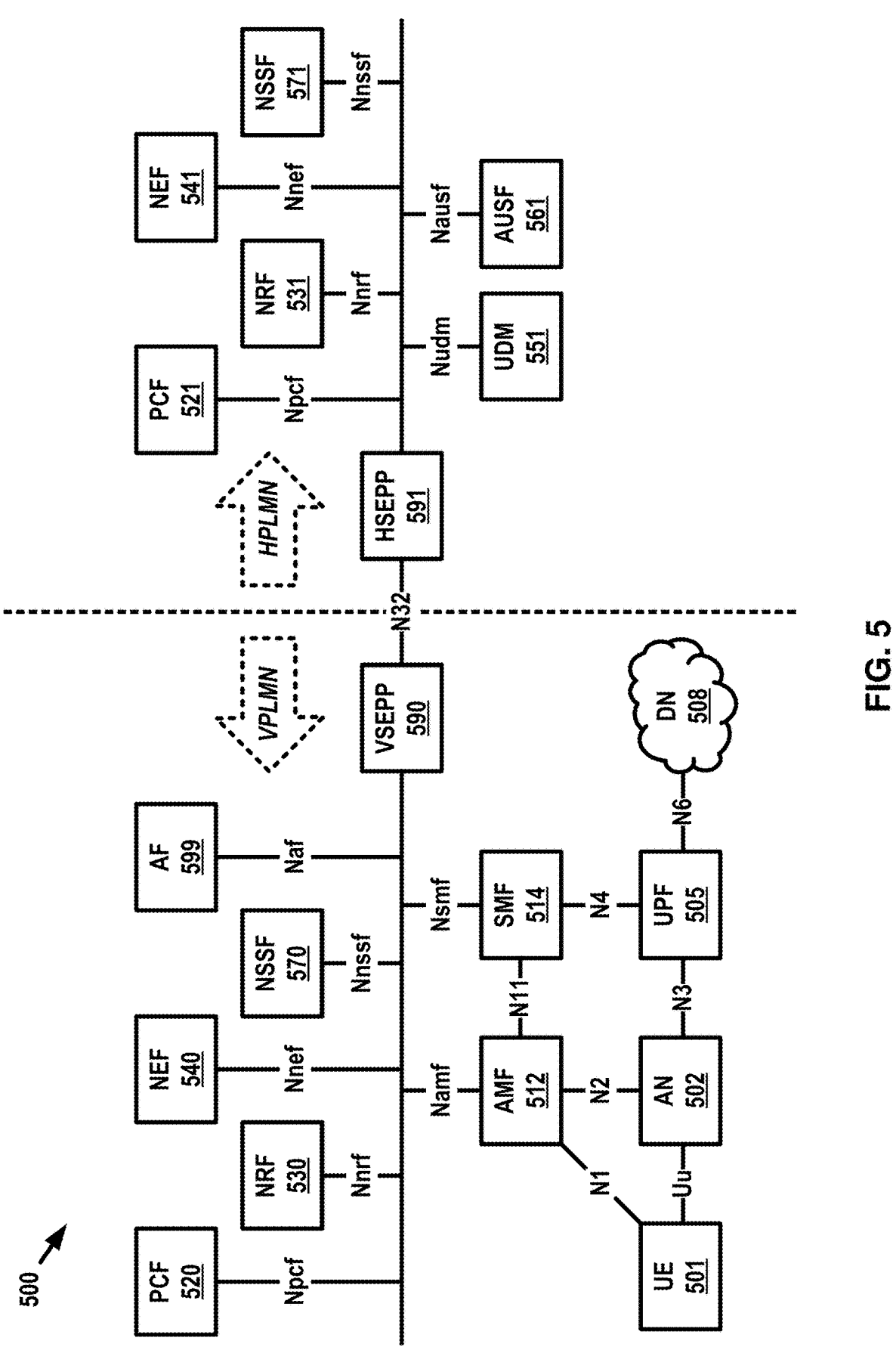
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QOS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number of downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNS (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4A) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
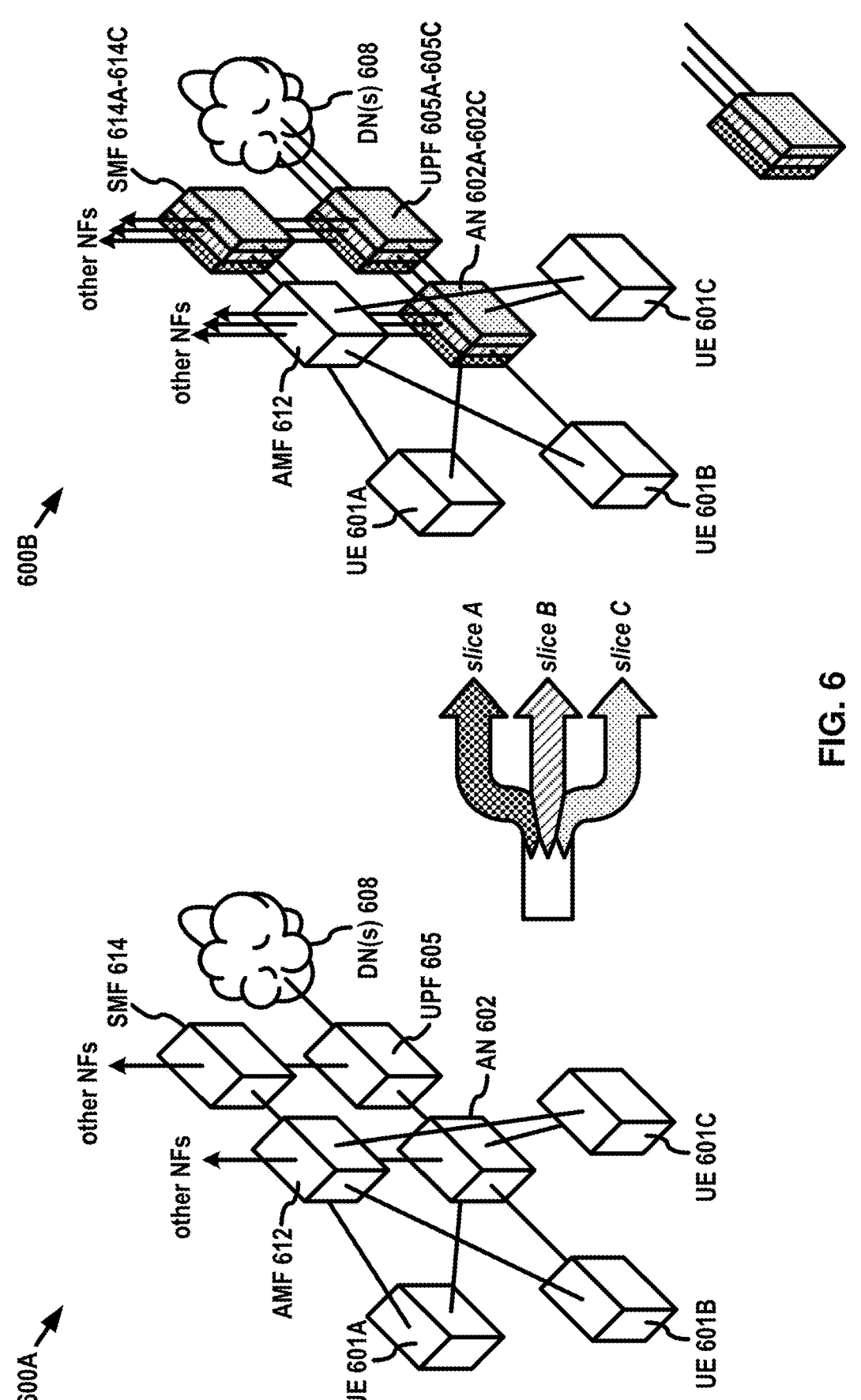
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). As an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figures 7A, 7B, 7C:
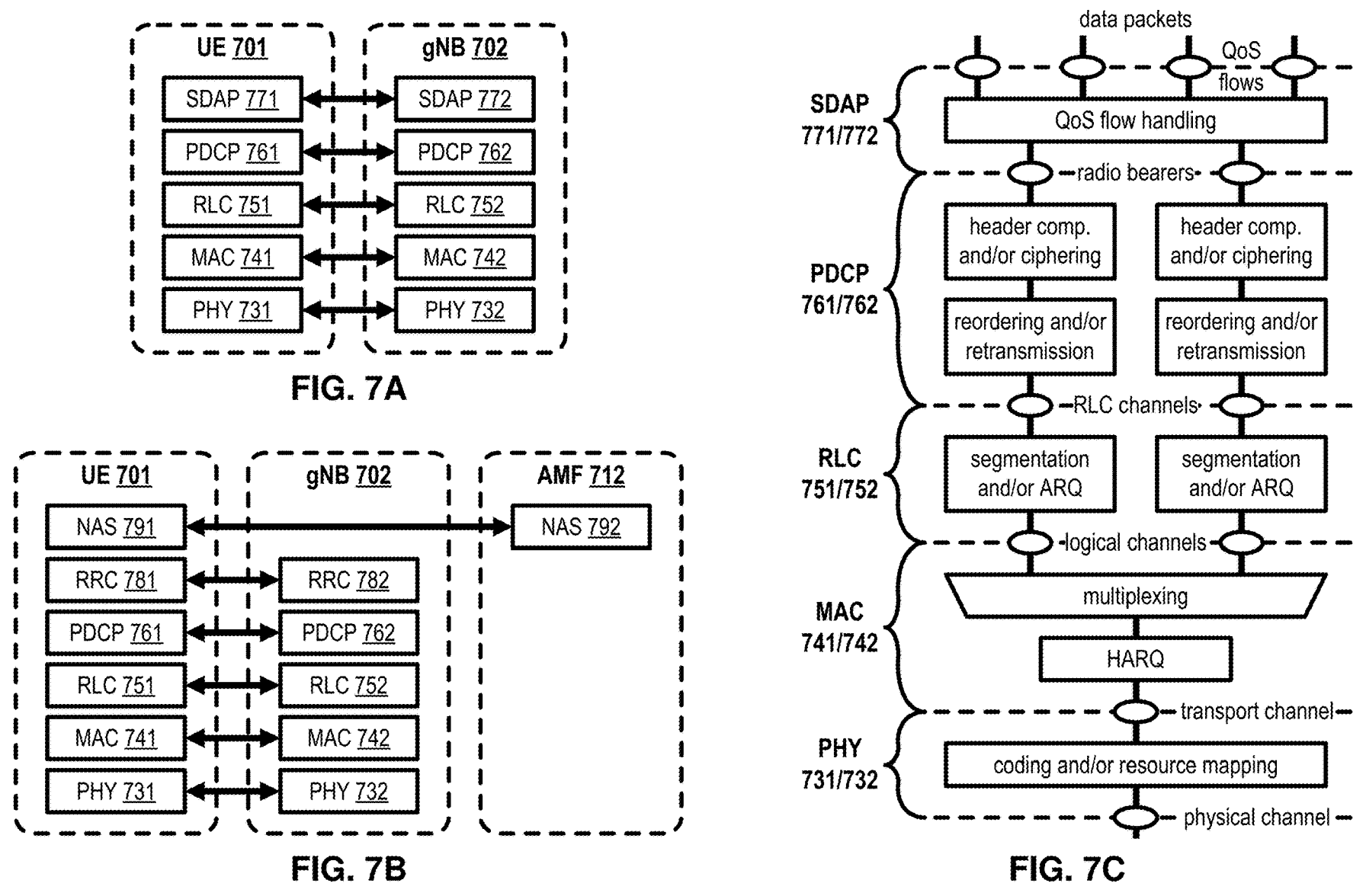

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QOS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
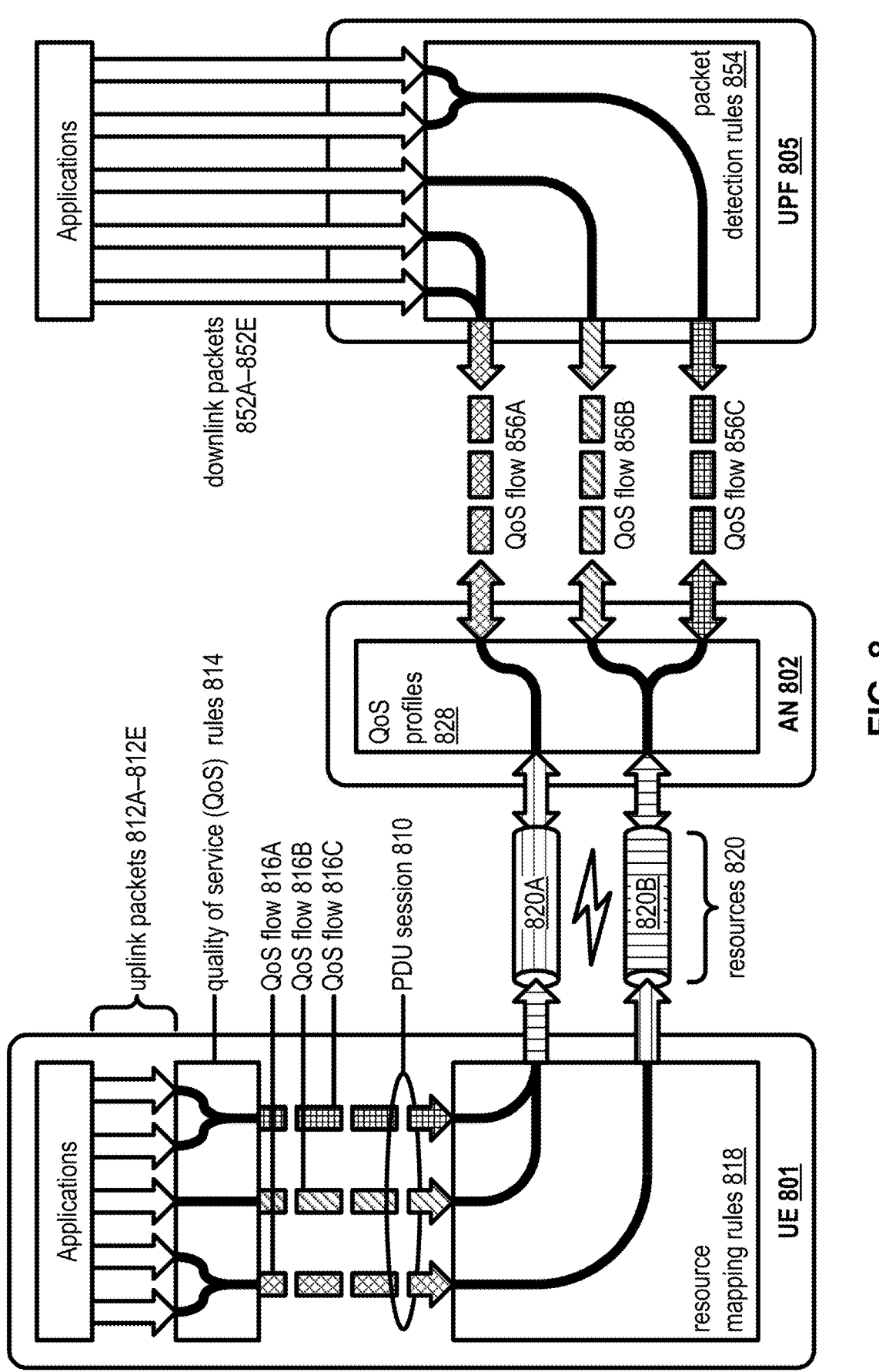
FIG. 8 illustrates an example of a quality of service model for data exchange.

FIG. 8 illustrates an example of a quality of service (QOS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which has one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
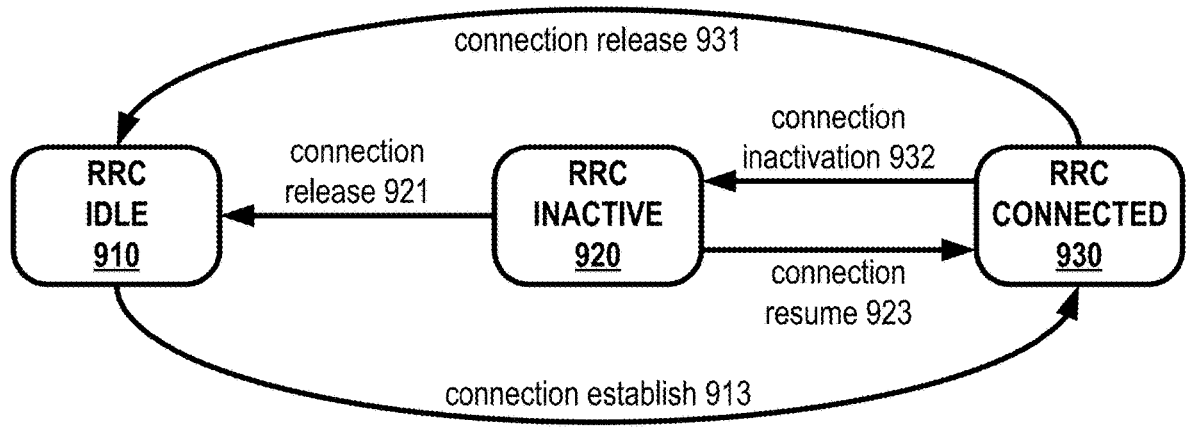
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
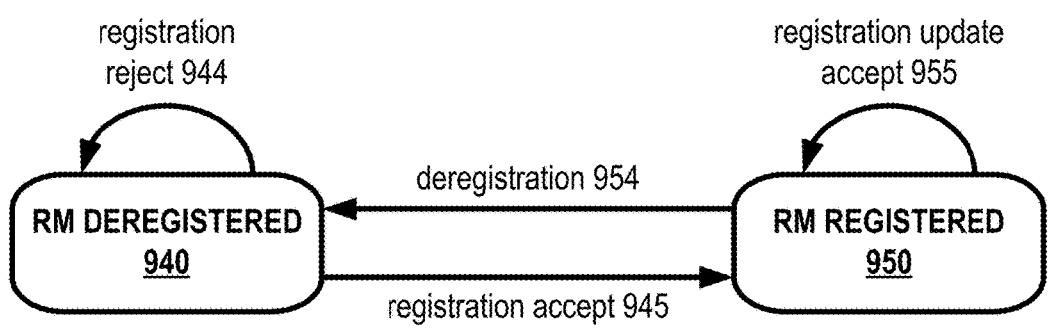

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and, if necessary, use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
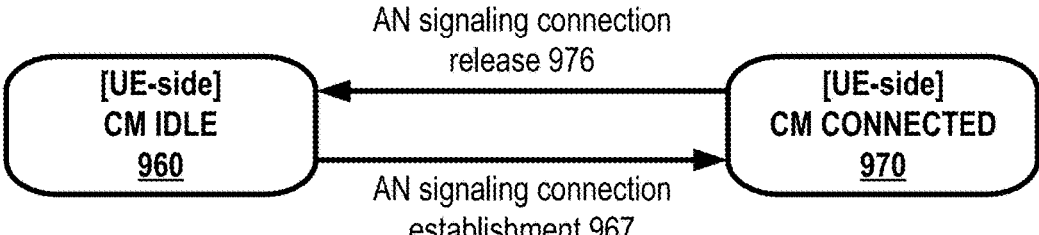

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non-access stratum (NAS) signaling connection with the network. As a result, the UE cannot communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
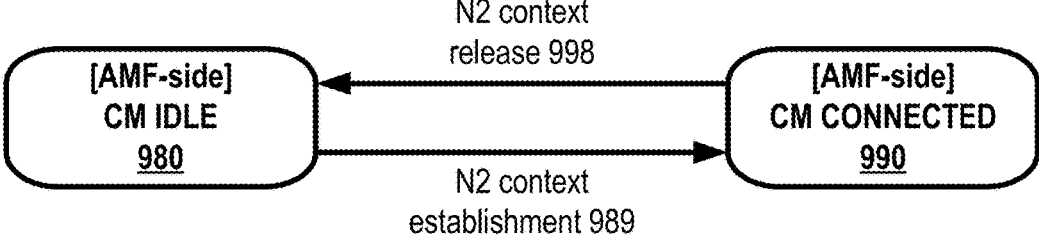

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF may establish an N2 context of the UE (N2 context establishment 989). When the UE transitions from CM connected 990 to CM idle 980, the AMF may release the N2 context of the UE (N2 context release 998).

Figure 10:
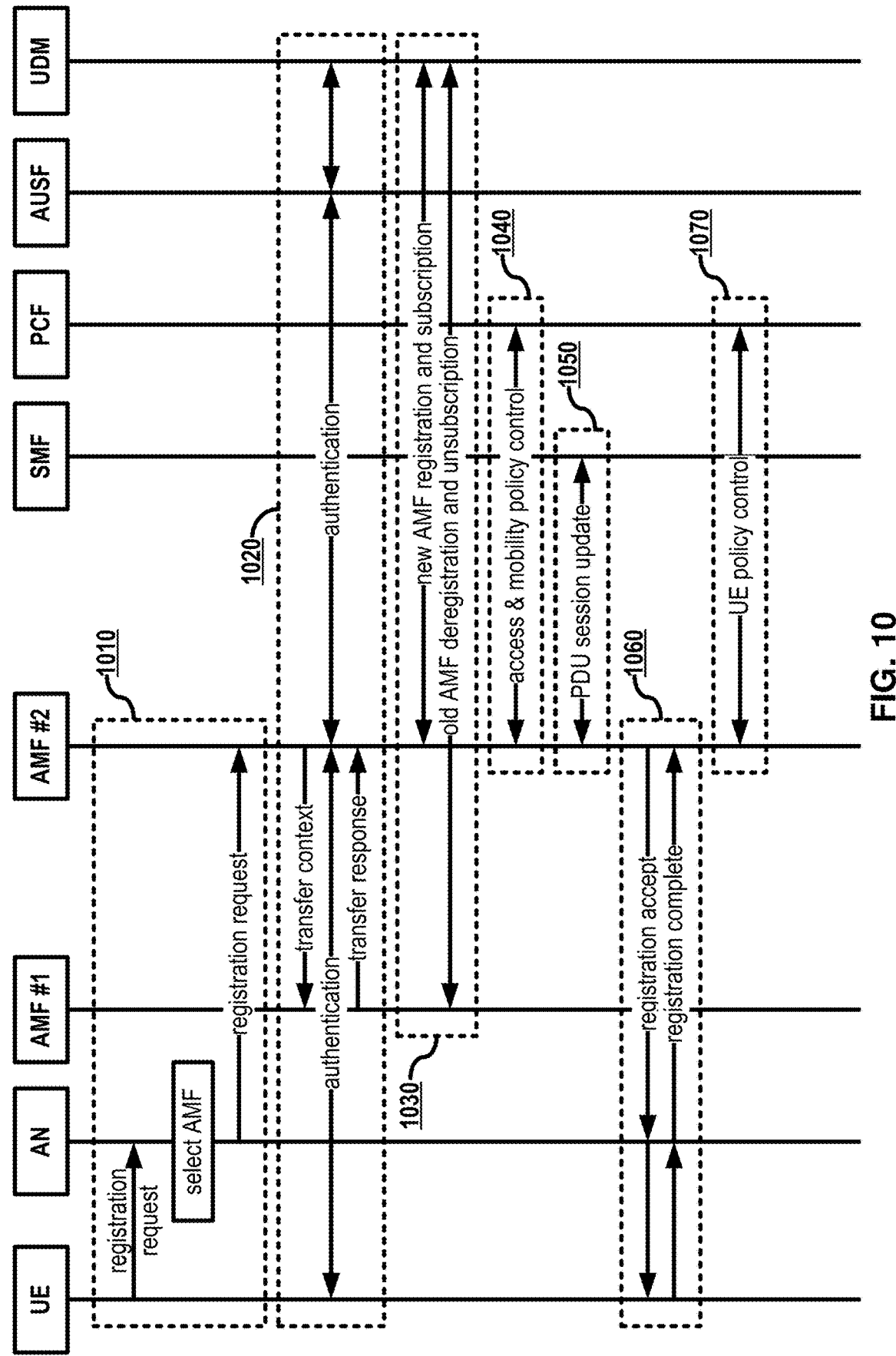
FIG. 10 illustrates an example of a registration procedure for a wireless device.
Figure 11:
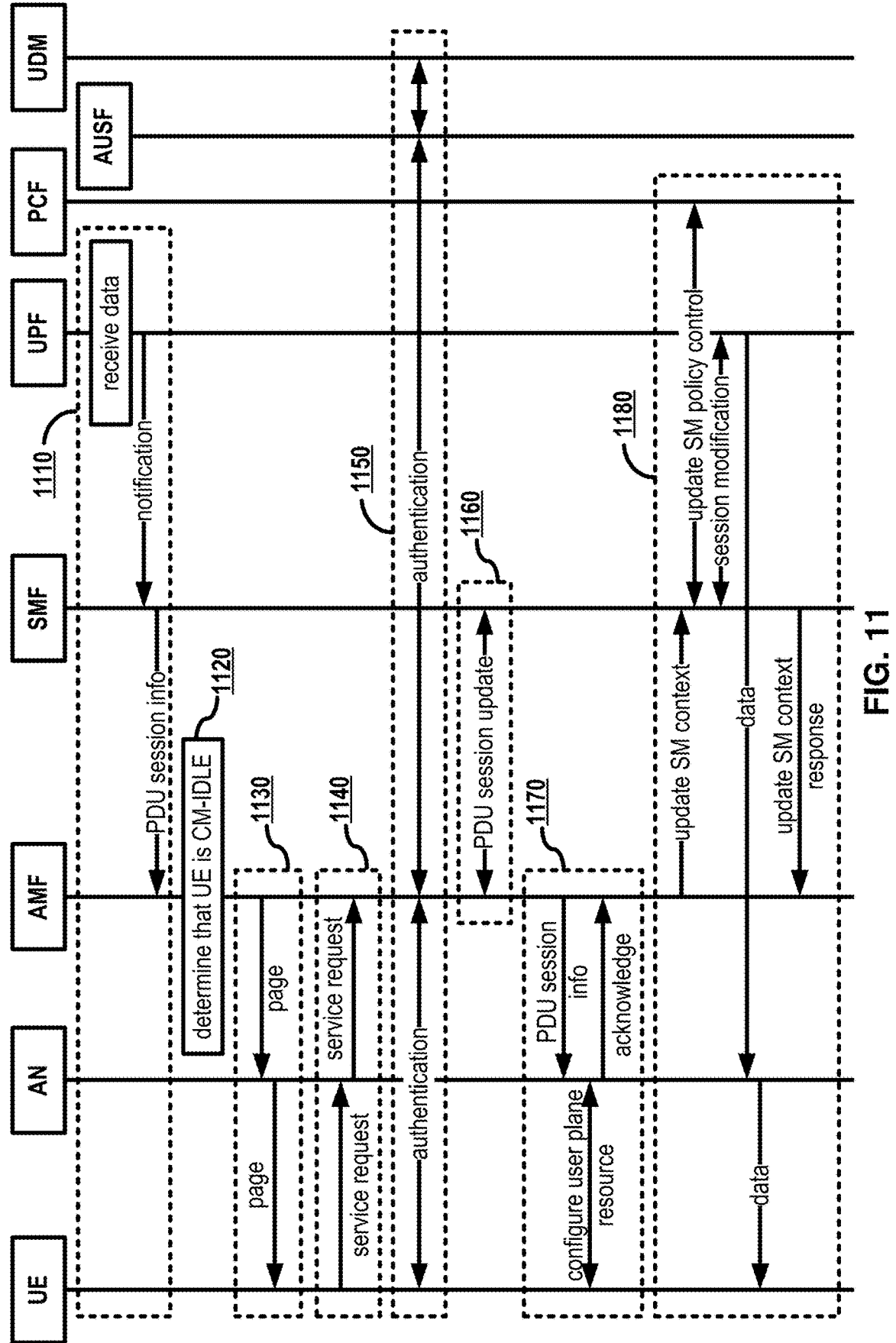
FIG. 11 illustrates an example of a service request procedure for a wireless device.
Figure 12:
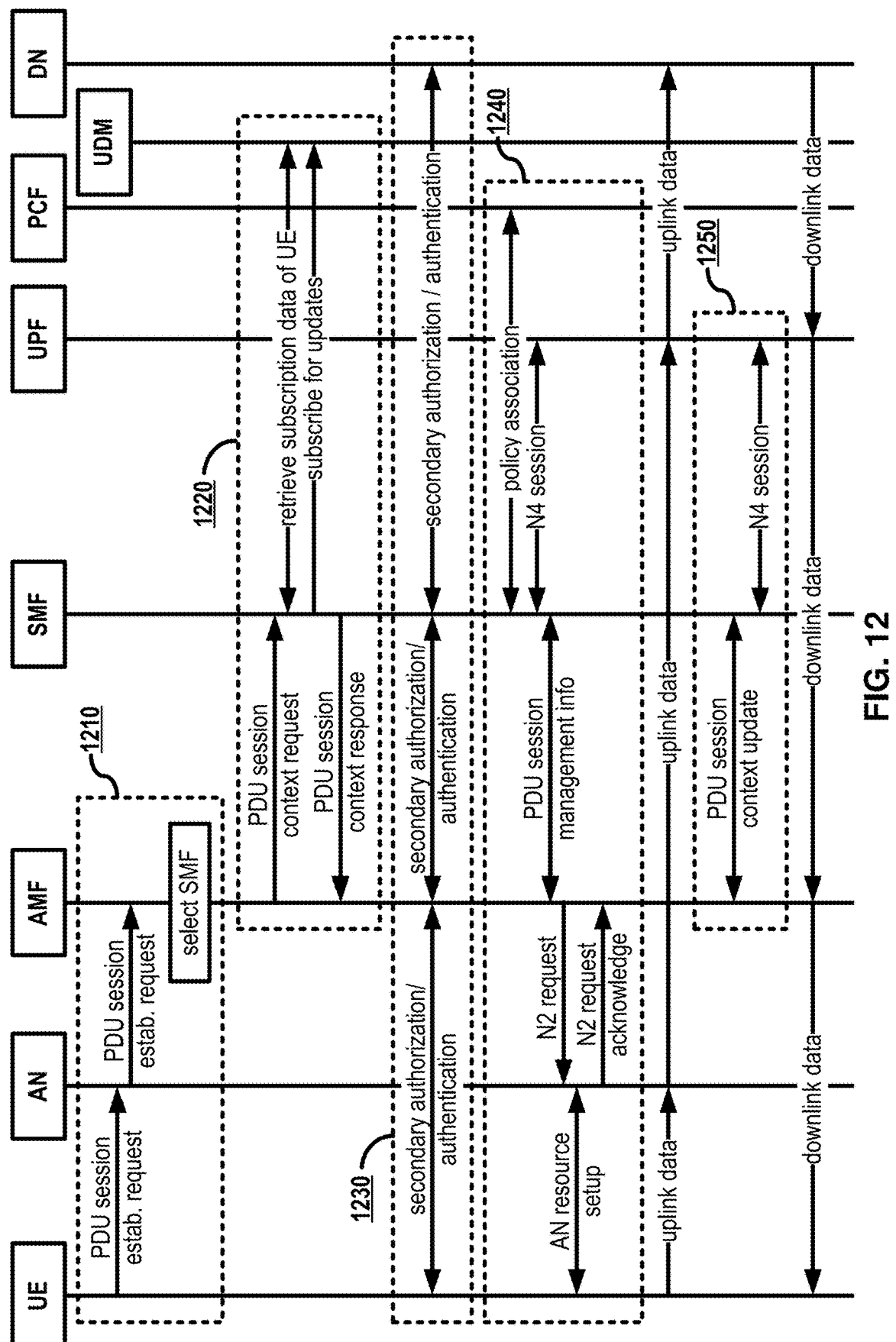
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context.

This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_Up-dateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location. Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPV4, IPV6, or dual stack IPV4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QOS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-DUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
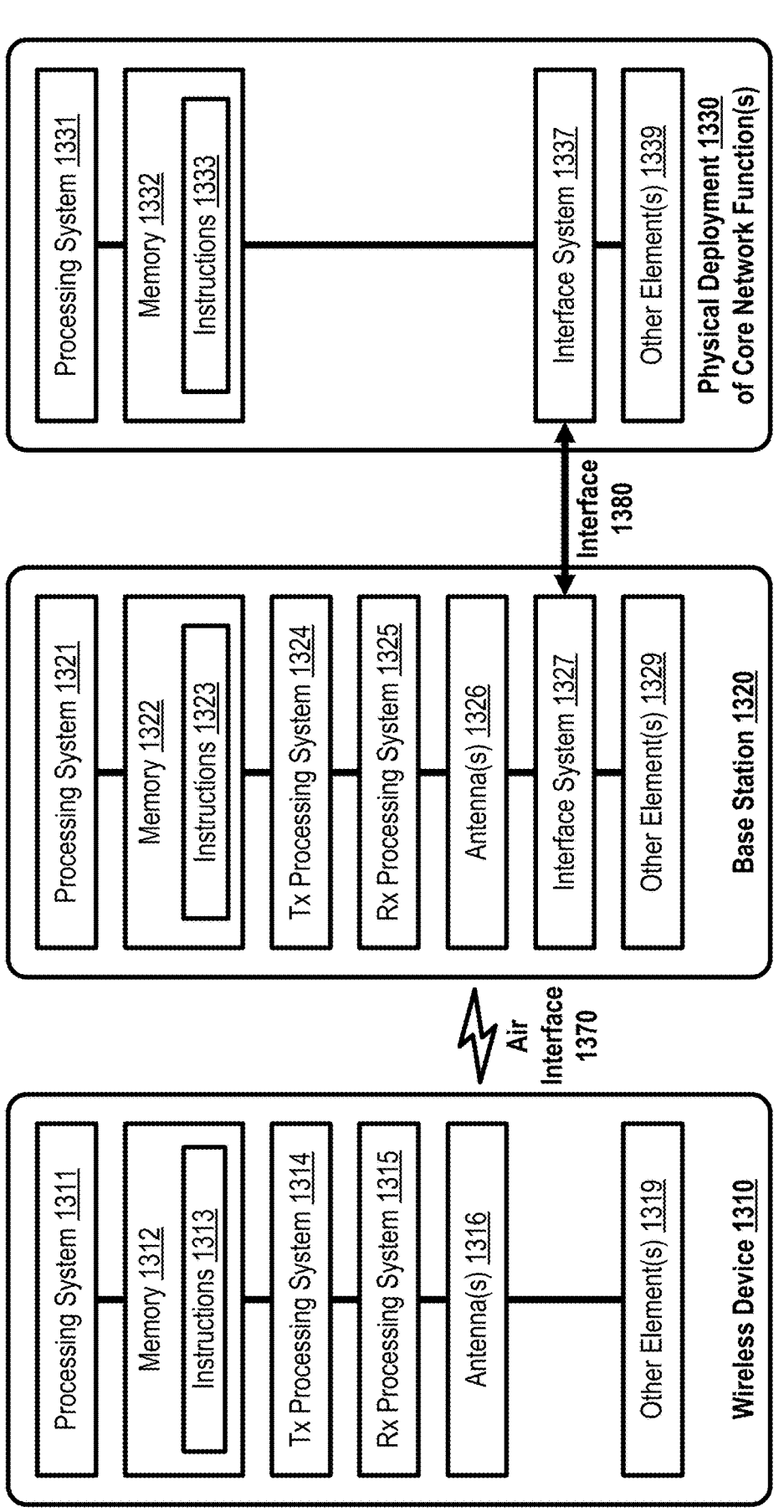
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNS), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15:
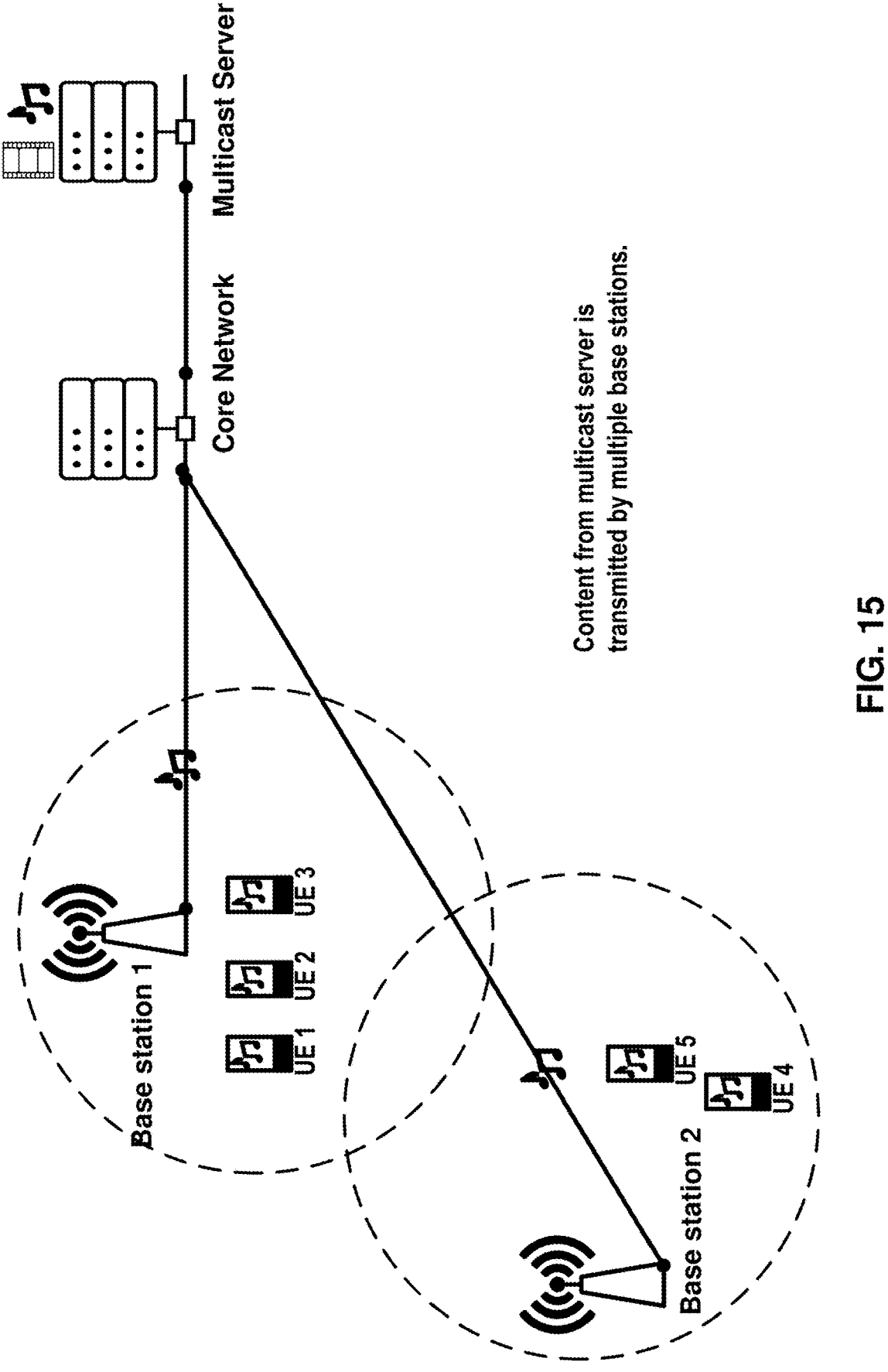
FIG. 15 is an example diagram of an aspect of an embodiment of the present disclosure

FIG. 15 depicts an example implementation in which a network provides a multicast broadcast service (MBS) to one or more UEs. The MBS is a framework/functionality in which some data from a multimedia application is delivered to plurality of UEs in resource efficient way. In an example, one or more data packets generated from a multicast server are delivered to a core network. The core network distributes the one or more data packets to one or more base stations. The one or more base stations transmit the one or more data packets in a cell. A base station may determine a transmission mechanism used over Uu interface based on a number of UEs in the cell. For example, in FIG. 15, base station 1 determines to use a point-to-point (PTP) bearer over the Uu interface because there are enough resources for a plurality of UEs in the cell. Base station 2 determines to use a point-to-multipoint (PTM) bearer over the Uu interface because there are a larger number of UEs in the cell (e.g., two or more) and/or because there is a shortage of resources in the cell.

FIG. 16 depicts an example implementation in which a UE (UE 1) in RRC Inactive state moves within a RAN notification area (RNA). In an example, for battery saving of the UE, a base station 1 may determine to move the UE into an RRC Inactive state and assign an RNA for the UE. The RNA for the UE may comprise one or more areas of base station 1, base station 2 and/or base station 3. The UE in the RRC Inactive state may move into a new cell. For example, when the new cell does not belong to the RNA for the UE, the UE may perform RRC Resume procedure, to indicate that the UE moves out of the RNA. However, when the new cell does belong to the RNA for the UE (i.e., the UE stays in the RNA), the UE may camp on the new cell without notifying the one or more base stations. Because the UE does not notify the new cell to the one or more base stations, so long as the UE moves within the cells of the RNA, the base station 1 does not know in which cell (or base station coverage area) the UE is located. If an MBS service for which the UE subscribes starts while the UE is in the RRC Inactive state, this can lead to inefficient radio resource usage, as shown in the example of FIG. 17.

Figure 17:
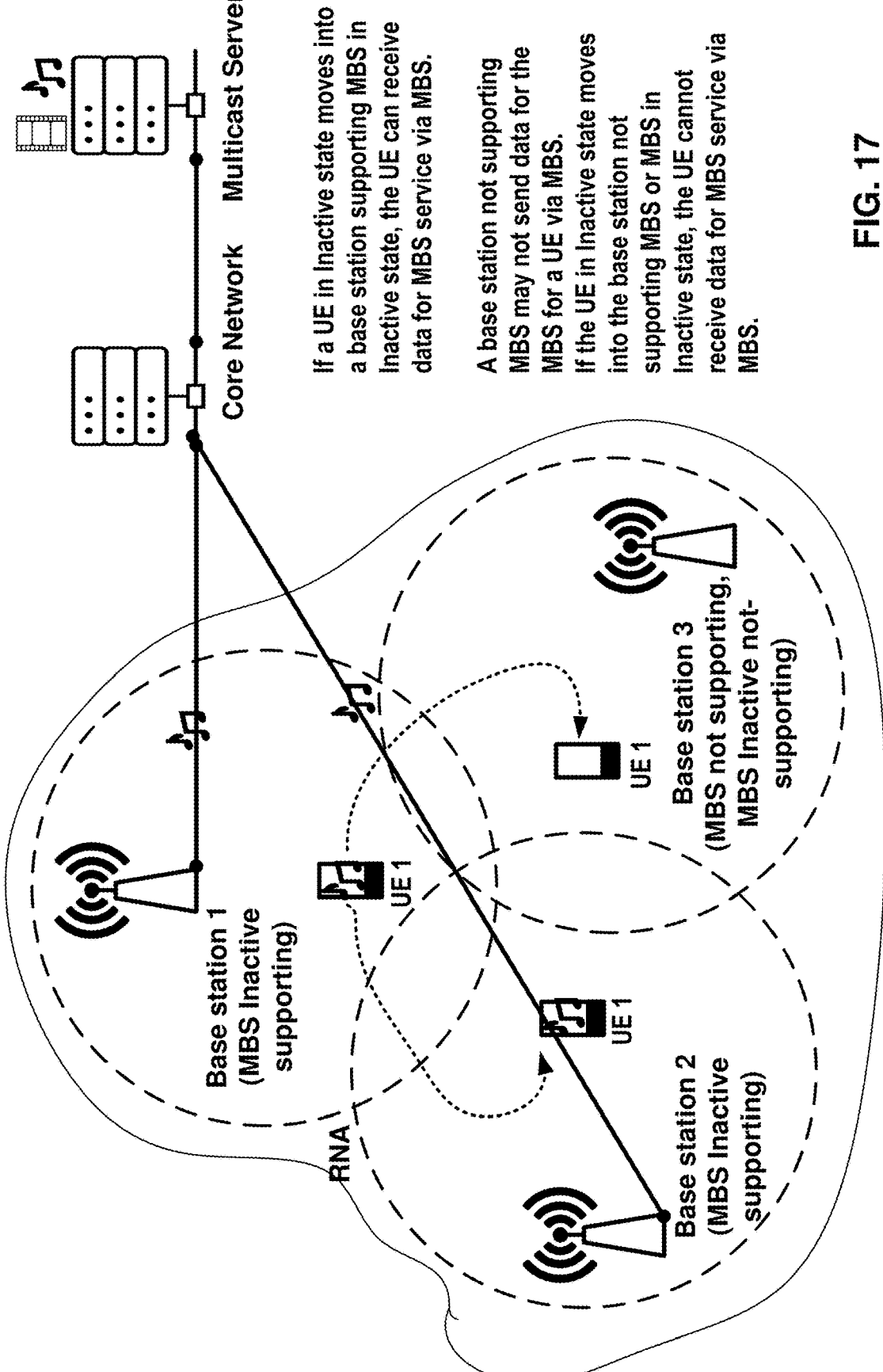
FIG. 17 is an example diagram of an aspect of an embodiment of the present disclosure.

FIG. 17 depicts an example implementation where an MBS service is delivered for one or more UEs in an RRC Inactive state. When the MBS service starts, a multicast server for the MBS service may send one or more data packets to a core network. The core network may send the one or more data packets to one or more base stations. In the figure, the one or more base stations comprise base station 1, base station 2 and/or base station 3. The RNA of the UE 1 may comprise areas served by the base station 1, the base station 2 and/or the base station 3. In the figure, the base station 1 and/or the base station 2 may support MBS and/or may support MBS for RRC inactive state. The base station 3 may not support MBS and/or may not support MBS for RRC inactive state.

Initially, UE 1 may be in a coverage area of base station 1 (not shown). The base station 1 may have a context for UE 1. The base station 1 may transition the UE 1 into RRC Inactive state. After transitioning to the RRC inactive state, UE 1 may move to another coverage area (e.g., the coverage area of base station 2). While the UE 1 move in areas served by these base stations, none of these base stations may be able to determine whether the UE 1 is in the area where each base station serves.

To ensure that the UE 1 receives the MBS service, when the MBS service starts, the base station 1 and/or the base station 2 may start activation of the MBS service. For example, because the base station 1 and/or the base station 2 supports MBS and/or MBS for RRC inactive state, the base station 1 and/or the base station 2 may configure radio resources for the MBS service, for the UE 1. For example, because the base station 3 does not support MBS and/or does not support MBS for RRC inactive state, the base station 1 and/or the base station 2 may not configure radio resources for the MBS service, for the UE 1.

In one example, the UE 1 may move into the coverage of the base station 2. Based on that the coverage of the base station 2 is within the RNA, the UE may not notify to the base station 1 or the base station 2 that the UE is in the coverage of the base station 2. Because the base station 2 provides the MBS service, the UE 1 may receive one or more data packets for the MBS service. In another example, the UE 1 may move into the coverage of the base station 3. Based on the fact that the coverage of the base station 3 is within the RNA, the UE may not notify the base station 1 or the base station 3 that the UE is in the coverage of the base station 3. Because the base station 3 does not provides the MBS service, the UE 1 may not receive one or more data packets for the MBS service. The existing technologies may not support data packet delivery for the MBS service, for the UE in the RRC inactive state. For example, when the UE stays within a cell belonging to the RNA, if the cell does not support MBS and/or if the cell does not support MBS for RRC inactive state, the UE cannot receive data for the MBS service for which the UE subscribes to.

In an example, to prevent situation where the UE is not served with the MBS service, an example implementation may try to reduce areas within the RNA. However, this may still cause waste of radio resource by additional signaling and may cause radio resource congestion.

Figure 18:
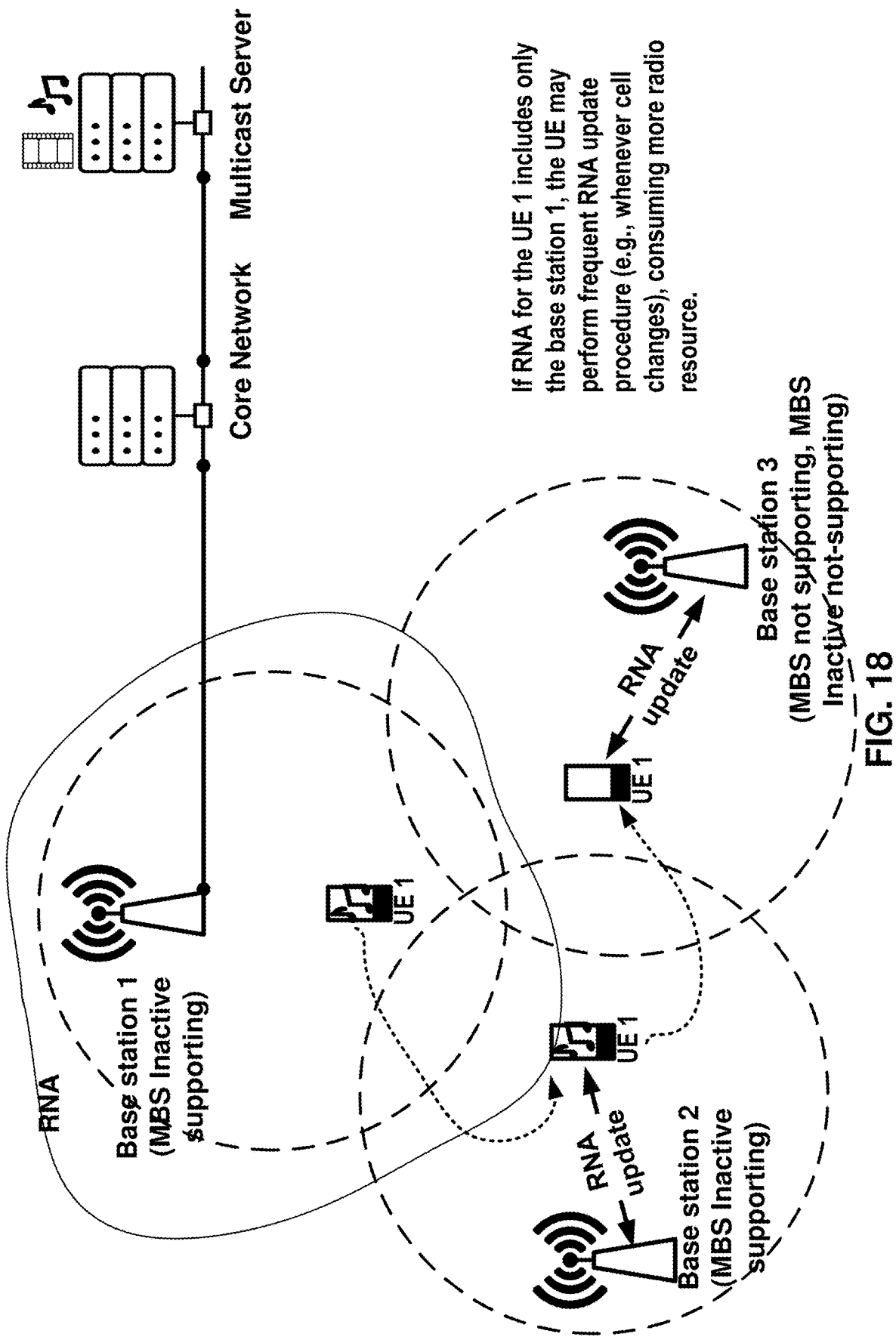
FIG. 18 is an example diagram of an aspect of an embodiment of the present disclosure.

For example, as shown in FIG. 18, when the base station 1 transits the UE to RRC inactive state, the base station 1 may determine not to include coverage of other base stations in the RNA. For example, the base station 1 may construct the RNA using one or more cells which the base station 1 manages and/or the base station 1 may not include one or more cells of other base stations (e.g., the base station 2, the base station 3) into the RNA. This may help the base station 1 to identify that the UE is under the coverage of other base stations as soon as the UE moves into the coverage of the other base stations. Based on the identification that the UE is in the coverage of the other base stations, the base station 1 may request other base stations (e.g., base station 3) to send one or more data packets for the UE.

However, as shown in the example implementation of FIG. 18, the existing technologies may require the UE to perform frequent RNA update procedure, leading to more use of radio resources, more consumption of battery resource. The existing technologies may cause unnecessary RNA update procedure, when the MBS service is not ongoing.

Example embodiments of the present disclosure improve system efficiency by providing signaling enhancements for RRC connection management for MBS. For example, by extension of the RRC message exchange between the UE and the NG-RAN, the UE may assist the NG-RAN to determine whether the UE needs to be controlled by other NG-RAN. This may enable establishment of one or more individual bearers of the MBS service for the UE, and may allow reliable data delivery for the MBS service in an area where the other NG-RAN may have limited capability. For example, by extension of Xn message exchange between one or more NG-RANs, the NG-RAN may set configuration parameters adjusted for the MBS service and/or may assist context relocation decision. This may reduce a number of RRC connection procedures that the UE needs to perform, while saving radio resources and UE battery power. This may help the network to provide the MBS service reliably to the UE.

In the specification, a term of a NG-RAN may be interpreted as a base station, which may comprise at least one of a gNB, an eNB, a ng-eNB, a NodeB, an access node, an access point, an N3IWF, a relay node, a base station, a base station central unit (e.g., gNB-CU), a base station distributed unit (e.g., gNB-DU), and/or the like.

In the specification, a term of a core network node may be interpreted as a core network device, which may comprise at least one of an AMF, a SMF, a NSSF, a UPF, a NRF a UDM, a PCF, a SoR-AF, an AF, an DDNMF, an MB-SMF, an MB-UPF and/or the like. A term of core network may be interpreted as a core network node. In the specification, a term of an access node may be interpreted as a base station, which may comprise a NG-RAN, and/or the like. In the specification, a term of a network node may be interpreted as a core network node, an access node, a UE, and/or the like. A network may comprise one or more network nodes.

In the specification, a term of a broadcast communication service may be interpreted as a communication service provided by a 5G system, in which same service data of a multimedia application is provided almost simultaneously to plurality of UEs in a geographic area. The plurality of UEs may comprise any UEs in the geographic area and are allowed to receive the service data.

In the specification, a term of a multicast communication service may be interpreted as a communication service provided by a 5G system, in which same service data of a multimedia application is provided almost simultaneously to a dedicated set of one or more UEs in a geographic area. In the geographic area, the dedicated set of one or more UEs are allowed to receive the service data.

In the specification, a term of an MBS session may be interpreted as comprising a multicast MBS session and/or a broadcast MBS session. In the specification, a term of the multicast MBS session may be interpreted as an MBS session to deliver a multicast communication service. In the specification, a term of a broadcast MBS session may be interpreted as an MBS session to deliver a broadcast communication service. In the specification, a term of an MBS service may be interpreted as the MBS session. The MBS session may be delivered using individual MBS traffic delivery, and/or shared MBS traffic delivery.

In the specification, a term of an MBS (multicast and broadcast service) may be interpreted as a framework supporting a broadcast communication service and/or a multicast communication service. The MBS may be a point-to-multipoint service in which data is transmitted from a single source entity to multiple recipients. The MBS may support one or more MBS sessions, and/or may deliver one or more packets of the one or more MBS sessions. For example, a first NG-RAN may support MBS. To deliver one or more packets of the one or more MBS session, the first NG-RAN may use functionalities of MBS (e.g., groupcast, PTM delivery, counting, MBS subscription, and so on). For example, based on resource availability, the first NG-RAN may use individual MBS traffic delivery and/or shared MBS traffic delivery for the MBS session. For example, the first NG-RAN may be capable of handling an MBS context associated with the MBS session. For example, the first NG-RAN may be aware that the data delivered to a UE is for the MBS session. For example, a third NG-RAN may not support MBS, may not implement one or more functionalities to support MBS, and/or may not support an MBS context associated with the MBS session. To deliver one or more packets of the one or more MBS session, the third NG-RAN may not use functionalities of MBS, and/or may use individual MBS traffic delivery for the MBS session. For example, the third NG-RAN may not be aware that the data delivered to a UE is for the MBS session or not. For example, the UE subscribing to the MBS session may receive one or more packets of the MBS session, via the first NG-RAN, using functionalities associated with MBS. For example, the UE subscribing to the MBS session may receive one or more packets of the MBS session, via the third NG-RAN, using functionalities not associated with MBS. For example, the third NG-RAN may deliver the one or more packets of the MBS session, using a delivery method applicable to a non-MBS session.

In the specification, a term of point-to-point (PTP) delivery may be interpreted as a mechanism in which a NG-RAN delivers separate copies of MBS data packets over radio interface to individual UE(s). For example, by using PTP delivery, the NG-RAN may use a first radio resource for a first UE and/or may use a second radio resource for a second UE.

In the specification, a term of point-to-multipoint (PTM) delivery may be interpreted as a mechanism in which a NG-RAN delivers a copy of MBS data packets over radio interface to plurality of UEs. For example, by using PTM delivery, the NG-RAN may use a third radio resource for the first UE and/or for the second UE. The third radio resource may comprise a shared radio bearer, a multicast radio bearer and/or a broadcast radio bearer.

In the specification, a term of individual MBS traffic delivery may be interpreted as a method in which 5G system receives a single copy of MBS data packets and delivers separate copies of those MBS data packets to individual UEs via per-UE PDU sessions. For example, the first UE and/or the second UE may subscribe to the MBS session, and/or may be in a coverage area of a third NG-RAN. A core network may establish a first PDU session for the first UE and/or may establish a second PDU session for the second UE. The first PDU session may comprise one or more unicast bearers for the first UE. The second PDU session may comprise one or more unicast bearers for the second UE. The core network may receive a first packet for the MBS session from an application server. The core network may send a first copy of the first packet to the first UE via the first PDU session, and via the third NG-RAN. The core network may send a second copy of the first packet to the second UE via the second PDU session, and via the third NG-RAN. The individual MBS traffic delivery may be used for a multicast MBS session. For example, the individual MBS traffic delivery may be used to deliver one or more packets of the MBS session to the one or more UEs, when the one or more UEs are in the third NG-RAN which does not support functionalities (e.g., use of group RNTI for MBS, use of PTM bearer, multicast radio bearer, etc.) of MBS.

In the specification, a term of shared MBS traffic delivery may be interpreted as a method in which 5G system receives a single copy of MBS data packets and delivers a single copy of those MBS data packets to a NG-RAN, and the NG-RAN delivers the single copy of those MBS data packet to one or multiple UEs. For example, a third UE and/or a fourth UE may subscribe to the MBS session, and/or may be in a coverage area of a first NG-RAN. The core network may receive a second packet for the MBS session from the application server. The core network may send a copy of the second packet to the first NG-RAN. The first NG-RAN may deliver the packet to the third UE and/or to the fourth UE, by using functionalities of MBS.

In the specification, a term interested in receiving an MBS service may be interpreted as having an intention to receive the MBS session, receiving the MBS session, and/or consuming contents of the MBS service.

Figure 19:
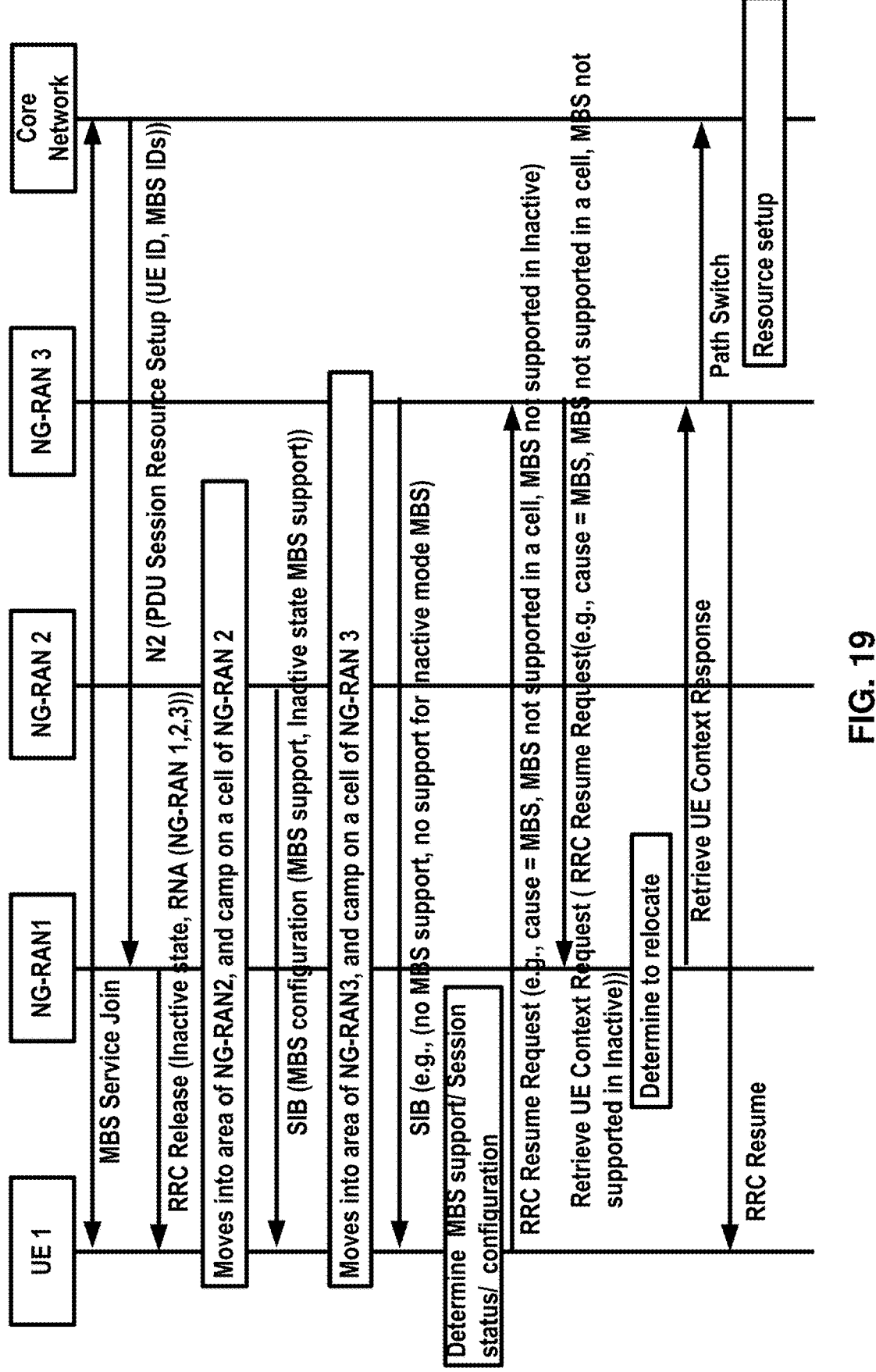
FIG. 19 is an example diagram of an aspect of an embodiment of the present disclosure.

FIG. 19 depicts one example embodiment of the present disclosure. In an example, a UE may move into area of a third NG-RAN (NG-RAN 3) which may not support MBS. The UE may send RRC resume request, and/or may inform that the UE is in a coverage area of the third NG-RAN which may not support MBS (or MBS for RRC inactive). Based on the RRC resume request, a first NG-RAN (NG-RAN 1) may efficiently determine whether to relocate a context of the UE from the first NG-RAN to the third NG-RAN. This may enable the third NG-RAN to deliver one or more packets to the UE, via individual MBS traffic delivery. This may assist the first NG-RAN, to efficiently identify whether the UE is an area where MBS is not supported.

In an example, the first NG-RAN may have the context for the UE (UE 1). When the first NG-RAN has an RRC connection with the UE, the first NG-RAN may have the context for the UE. For example, the UE may use the RRC connection to join an MBS session which the UE is interested in receiving. By joining the MBS session, the UE may have authorization to receive one or more packets of the MBS session. If the UE is authorized for the MBS session, the first NG-RAN may receive from an AMF, a N2 (e.g., PDU Session Resource Setup Request) message for the UE. The N2 message may indicate to the first NG-RAN, at least one of one or more MBS sessions that the UE is allowed to receive, and/or whether the UE is allowed to receive the one or more MBS sessions in the RRC inactive state.

In an example, the context of the UE in the first NG-RAN may be a block of information in the first NG-RAN associated with the UE. The block of information may comprise one or more necessary information required to maintain the first NG-RAN service to the UE. When the UE hands over to other NG-RAN, the context of the UE may be transferred from the first NG-RAN to other NG-RAN. The context of the UE may comprise at least one of:

Information of UE: This may indicate the UE. For example, this may comprise at least one of AMF UE NGAP ID, RAN UE NGAP ID, and/or the like.

Information of Bearers: This may indicate one or more configurations for one or more bearers established for the UE.

Information of PDU sessions: This may indicate one or more PDU sessions established for the UE.

Information of network slices: This may indicate one or more network slices that the UE is allowed to use, and/or relationship between one or more PDU sessions and one or more network slices Information of MBS: This may indicate whether the UE is allowed to use MBS, list of one or more MBS sessions allowed for the UE, one or more PDU sessions associated with the one or more MBS sessions, and/or the like.

For example, the N2 (e.g., PDU Session Resource Setup Request) message may comprise at least one of:

Identifier of UE: This may indicate the UE. For example, this may comprise at least one of AMF UE NGAP ID, RAN UE NGAP ID, and/or the like.

Identifier of PDU session: This may indicate a PDU session associated with the N2 message. For example, this may comprise PDU Session ID.

Identifier of MBS session: This may indicate one or more MBS sessions for which the PDU session is associated. For example, this may comprise MBS Session Setup Request List, and/or one or more MBS Session IDs.

Authorization of Inactive state for the MBS session: This may indicate whether the UE is allowed to receive the MBS session in the RRC Inactive state.

Capability of UE for MBS for Inactive state: This may indicate whether the UE can receive the MBS session in the RRC Inactive state. For example, when a cell supports the MBS session for RRC Inactive state and when the UE is not capable of receiving the MBS session in the RRC Inactive state, the NG-RAN may transit the UE into RRC Connected state.

For example, based on the N2 message (e.g., PDU Session Resource Setup Request), the first NG-RAN may identify one or more MBS sessions to which the UE joins or subscribes.

In an example, the first NG-RAN may determine to transition the UE into RRC Inactive state. For example, to reduce power consumption of the UE, the first NG-RAN may determine to move the UE into RRC Inactive state. To move the UE into RRC Inactive state, the first NG-RAN may send an RRC Release message to the UE. The RRC Release message may comprise an indication to move into RRC Inactive state. The RRC Release message may comprise information of a RAN notification area (RNA). For example, the information of RNA may comprise at least one of information of one or more cells, information of one or more tracking areas, information of one or more RAN area codes. For example, the RNA for the UE may comprise areas managed by the first NG-RAN, a second NG-RAN (NG-RAN 2), and/or the third NG-RAN.

In an example, the UE may receive the RRC Release message sent by the first NG-RAN. Based on the received RRC Release message, the UE may transition into RRC Inactive state. The UE may move into a new cell, while the UE is in RRC Inactive state.

In an example, the UE may move into coverage of the second NG-RAN. To determine whether the UE moves into the coverage of the second NG-RAN, and/or to determine whether the UE needs to (re) select a cell, the UE may perform measurement of one or more cells. Based on the measurement of the one or more cells, the UE may (re) select a second cell of the one or more cells. For example, the UE may select the second cell, based on that the signal strength (e.g., 1 dBm) of the second cell is strongest among the one or more cells (e.g., less than 1 dBm). For example, the UE may reselect the second cell from a first cell (of the first NG-RAN), based on that the signal strength (e.g., 3 dBm) of the second cell is stronger than the first cell (e.g., 2 dBm). Based on the determination of (re) selecting the second cell, the UE may camp on the second cell. The camping on the second cell may comprise monitoring one or more control channels (e.g., PDCCH, PBCCH, PCH, and so on) of the second cell, and/or receiving one or more system information blocks (SIBs) of the second cell. For example, the second NG-RAN may manage the second cell. The second cell and/or the second NG-RAN may be authorized to send one or more packets of the MBS session. The second cell and/or the second NG-RAN may support MBS. The second cell and/or the second NG-RAN may support MBS for RRC inactive state. That the second NG-RAN supports for MBS for RRC inactive state may be that the second NG-RAN may be capable of sending one or more packets of the MBS session to one or more UEs in the RRC inactive state. That the second NG-RAN supports for MBS for RRC inactive state may be that the second NG-RAN may be capable of sending one or more packets of the MBS multicast session to one or more UEs not in the RRC connected state. That a UE is not in the RRC connected state may be that the UE is in the RRC inactive state and/or that the UE is in the RRC idle state.

In an example, the UE may receive one or more second RRC messages from the second cell. The one or more second RRC messages may be the one or more SIBs, one or more second multicast control channel (MCCH) messages, and/or the like. The one or more second RRC messages may be sent via BCH, MCCH, and/or the like. For example, the second cell may send one or more configuration for one or more MBS sessions via MCCH. Based on the received one or more second RRC messages, the UE may determine whether the MBS session is configured in the second cell. To determine whether the MBS session is configured in the second cell may be to determine whether MBS is configured in the second cell. For example, the UE may determine whether the MBS session is configured in the second cell, based on at least one of following:

whether the one or more second RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, MBS configuration information for RRC inactive state, an indication of whether MBS for RRC inactive state is supported, and/or the like.

whether the one or more second RRC messages comprise the one or more information associated with the MBS session. For example, the one or more information associated with the MBS session may be one or more identifiers of the MBS session, and/or MBS session configuration information for RRC inactive state.

For example, if the one or more second RRC messages comprises the one or more information associated with MBS, if the one or more second RRC message comprises one or more information associated with the MBS session, if the UE receives the one or more second RRC messages comprising the one or more information associated with MBS, and/or if the UE receives the one or more second RRC messages comprising the one or more information associated with the MBS session, the UE may determine that the MBS session is configured in the second cell. For example, if the one or more second RRC messages does not comprise the one or more information associated with MBS, if the one or more second RRC message does not comprise the one or more information associated with the MBS session, if the UE does not receive the one or more second RRC messages comprising the one or more information associated with MBS, and/or if the UE does not receive the one or more second RRC messages comprising the one or more information associated with the MBS session, the UE may determine that the MBS session is not configured in the second cell. That MBS is not configured in the second cell may be that MBS is not supported in the second cell. That MBS is not configured in the second cell may be that MBS is not supported for the RRC inactive state in the second cell.

In an example, the second NG-RAN may support MBS, the MBS session, and/or MBS for RRC inactive state. For example, the second NG-RAN may send the one or more second RRC messages comprising at least one of the one or more information associated with MBS and/or the one or more information associated with the MBS session.

In an example, the UE may receive the one or more second RRC messages sent by the second NG-RAN. Based on the one or more second RRC messages, the UE may determine that the MBS session is configured in the second NG-RAN and/or in the second cell. Based on the determination that the MBS session is configured in the second NG-RAN (e.g., the second cell) and/or that the second cell is within the RNA, the UE may determine not to send RRC resume request.

In an example, the UE may move into coverage of the third NG-RAN and/or the UE may camp on a third cell of the third NG-RAN. To determine whether the UE moves into the coverage of the third NG-RAN, and/or to determine whether the UE needs to (re) select a third cell, the UE may perform measurement of one or more cells. Based on the measurement of the one or more cells, the UE may (re) select the third cell of the one or more cells. For example, the UE may select the third cell, based on that the signal strength (e.g., 1 dBm) of the third cell is strongest among the one or more cells (e.g., less than 1 dBm). For example, the UE may reselect to the third cell from the first (or the second) cell, based on that the signal strength (e.g., 3 dBm) of the third cell is stronger than the first (or the second) cell (e.g., 2 dBm). Based on the determination of (re) selecting the third cell, the UE may camp on the third cell. The camping on the third cell may comprise monitoring one or more third control channels (e.g., PDCCH, PBCCH, PCH, and so on) of the third cell, and/or receiving one or more third system information blocks (SIBs) of the third cell. For example, the third NG-RAN may manage the third cell. The third cell and/or the third NG-RAN may not support MBS. The third cell and/or the third NG-RAN may not support MBS for RRC inactive state. That the third NG-RAN does not support for MBS for RRC inactive state may be that the third NG-RAN may not be capable of sending one or more packets of the MBS session to one or more UEs in the RRC inactive state. That the third NG-RAN does not support for MBS for RRC inactive state may be that the third NG-RAN may not be capable of sending one or more packets of the MBS multicast session to one or more UEs not in the RRC connected state.

In an example, the UE may receive one or more third RRC messages from the third cell. The one or more third RRC messages may be the one or more third SIBs, one or more third multicast control channel (MCCH) messages, and/or the like. The one or more third RRC messages may be sent via BCH, MCCH, and/or the like. Based on the received one or more third RRC messages, the UE may determine whether the MBS session is configured in the third cell. To determine whether the MBS session is configured in the third cell may be to determine whether MBS is configured in the third cell. For example, the UE may determine whether the MBS session is configured in the third cell, based on at least one of following:

whether the one or more third RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, and indication of whether MBS is supported for RRC inactive state, an indication of whether MBS for RRC inactive state is supported, and/or the like.

whether the RRC messages comprise one or more information associated with the MBS session. For example, the one or more information associated with the MBS session may be one or more identifiers of the MBS session, MBS session configuration information for RRC inactive state, and/or information of whether the MBS session is supported for RRC inactive state.

For example, if the one or more third RRC messages comprise the one or more information associated with MBS, if the one or more third RRC messages comprise one or more information associated with the MBS session, if the UE receives the one or more third RRC messages comprising the one or more information associated with MBS, and/or if the UE receives the one or more third RRC messages comprising the one or more information associated with the MBS session, the UE may determine that the MBS session is configured in the third cell. For example, if the one or more third RRC messages do not comprise the one or more information associated with MBS, if the one or more third RRC message do not comprise the one or more information associated with the MBS session, if the UE does not receive the one or more third RRC messages comprising the one or more information associated with MBS, if the UE does not receive indication that MBS for RRC inactive state is supported, if the UE does not receive MBS session configuration for RRC inactive state, if the UE does not receive MBS configuration for RRC inactive state, and/or if the UE does not receive the one or more third RRC messages comprising the one or more information associated with the MBS session, the UE may determine that the MBS session is not configured in the third cell.

In an example, the third NG-RAN may not support MBS, the MBS session, and/or MBS for RRC inactive state. For example, the third NG-RAN may not send one or more RRC messages comprising at least one of the one or more information associated with MBS and/or may send one or more RRC messages not comprising the one or more information associated with the MBS session.

In an example, the UE may not receive the one or more third RRC messages sent by the third NG-RAN, the UE may receive the one or more third RRC messages not comprising the one or more information associated with the MBS session, and/or the UE may receive the one or more third RRC messages not comprising the one or more information associated with MBS. Based on not receiving the one or more third RRC messages, based on receiving the one or more RRC messages not comprising the one or more information associated with the MBS session, and/or based on receiving the one or more RRC messages not comprising the one or more information associated with MBS, the UE may determine that the MBS session is not configured in the third NG-RAN and/or in the third cell. Based on the determination that the MBS session is not configured in the third NG-RAN (or the third cell), the UE may determine that MBS is not supported in the third cell, and/or that MBS for RRC inactive state is not supported in the cell. Based on the determination that the MBS session is not configured in the third NG-RAN (or the third cell), that the third cell is within the RNA, that MBS is not supported in the third cell, and/or that MBS for RRC inactive state is not supported in the cell, the UE may determine to send RRC resume request.

In an example, based on determining to send the RRC resume request, the UE may send the RRC resume request to the third NG-RAN. Based on the MBS session not configured in the third NG-RAN (or the third cell) and/or based on that MBS (MBS for RRC inactive state) is not supported in the third NG-RAN (or the third cell), the UE may send an indication that the RRC resume request is associated with the MBS. For example, the RRC resume request may comprise at least one of:

an identifier associated with the UE: This may indicate an identity of the UE. For example, the identifier associated with the UE may comprise at least one of radio network temporary identifier (RNTI), cell RNTI (C-RNTI), inactive RNTI (I-RNTI), short I-RNTI, subscription concealed identifier (SUCI), and subscription permanent identifier (SUPI)

a message authentication code for integrity (MAC-I): This may be a value to confirm that the UE owns the identifier associated with the UE. For example, the UE and the NG-RAN may share a secret key. When the UE send a message to the NG-RAN, the UE may generate the MAC-I, based on the secret key. When the NG-RAN receives the message comprising the MAC-I, the NG-RAN may check whether the MAC-I is valid. If the MAC-I is valid, the NG-RAN may determine that the UE is the owner of the identifier.

the indication that the RRC resume request is associated with the MBS: This may comprise at least one of a cause value associated with the MBS and/or the identifier of the MBS service. For example, the cause value associated with the MBS may indicate at least one of that the RRC resume request is associated with MBS, that the UE is in the cell which does not support MBS, that the UE is in the cell which does not support MBS for RRC inactive state, that the cell does not configure the MBS service, that the UEs does not receive information associated with MBS from the cell, that the cell does not configure the MBS, that the UEs does not receive information associated with MBS service from the cell, that context relocation is required for the UE, that the UE requests the MBS service, and/or the like.

In an example, the third NG-RAN may receive the RRC resume request from the UE. Based on the identifier associated with the UE, the third NG-RAN may determine that the context of the UE is in other NG-RAN. For example, the third NG-RAN may check whether the identifier associated with the UE is in its memory. If the identifier associated with the UE is not within its memory, the third NG-RAN may determine that the context of the UE is in other NG-RAN. Based on the determination that the context of the UE is in other NG-RAN, the third NG-RAN may send a Xn request message (e.g., Retrieve UE context request) to the first NG-RAN which holds the context of the UE. The Xn request message (e.g., Retrieve UE context request) may comprise at least one of the RRC resume request, RRC resume cause, MBS capability indicator, new cell identifier and/or the like. For example, the RRC resume request may be the message received by the third NG-RAN from the UE. For example, the RRC resume cause may be the cause value associated with the MBS of the RRC resume request. For example, the new cell identifier may indicate the third cell from which the third NG-RAN receives the RRC resume request from the UE.

In an example, the first NG-RAN may receive from the third NG-RAN, the Xn request message (e.g., Retrieve UE context request). Based on the Xn request message (e.g., Retrieve UE context request), the first NG-RAN may determine whether the first NG-RAN needs to relocate the context of the UE. For example, based on the RRC resume request, and/or the RRC resume cause, the first NG-RAN may determine that the UE is in the third NG-RAN (or the third cell) which does not support MBS and/or which does not support MBS for RRC inactive state. For example, when the RRC resume request comprise the indication that the RRC resume request is associated with the MBS, and/or when Xn request message (e.g., Retrieve UE context request) comprises the cause value associated with MBS, the first NG-RAN may determine that the UE is in the third NG-RAN (or the third cell) which does not support MBS and/or which does not support MBS in the RRC inactive state. For example, when the RRC resume request comprise the indication that the RRC resume request is associated with the MBS, and/or when Xn request message (e.g., Retrieve UE context request) comprises the cause value associated with MBS, the first NG-RAN may determine to relocate the context of the UE to the third NG-RAN. For example, the indication that the RRC resume request is associated with the MBS and/or the cause value associated with MBS will assist the first NG-RAN to decide when to perform relocation of the context of UE.

In an example, based on the determination of relocating the context of the UE to the third NG-RAN, the first NG-RAN may send Xn response message (e.g., Retrieve UE context response) to the third NG-RAN. The Xn response message (e.g., Retrieve UE context response) may comprise the context of the UE. For example, the context may comprise at least one of GUAMI, information of PDU Session Resources, RRC context, mobility restriction list, and/or the like. GUAMI may indicate information of an AMF to which the UE is connected. For example, the information of PDU Session Resources may indicate one or more PDU sessions for which the UE establishes for data communication. For example, the mobility restriction list may indicate one or more RATs which the UE is not allowed to use, and/or one or more areas which the UE is not allowed to be handed over.

In an example, the third NG-RAN may receive from the first NG-RAN, the Xn response message (e.g., Retrieve UE context response). Based on the Xn response message (e.g., Retrieve UE context response), the third NG-RAN may send path switch request to the AMF. For example, the third NG-RAN may send the path switch request to the AMF indicated by the GUAMI of the Xn response message (e.g., Retrieve UE context response). For example, the path switch request may comprise at least one of an information of PDU session resources to be switched/setup, RRC resume cause, and/or the like. For example, the RRC resume cause may be the cause value associated with MBS. Based on the Xn response message, the third NG-RAN may send an RRC resume message. The RRC resume message may indicate the UE to transit into RRC connected state.

In an example, the AMF may receive the path switch request from the third NG-RAN. Based on the path switch request, the AMF may initiate a procedure to set up resource for the UE, and/or a procedure to deliver one or more packet of the MBS session via individual MBS traffic delivery. To set up resource for the UE for the MBS, and/or to deliver one or more packet of the MBS session via individual MBS traffic delivery, the example depicted in FIG. 20 may apply.

Figure 20:
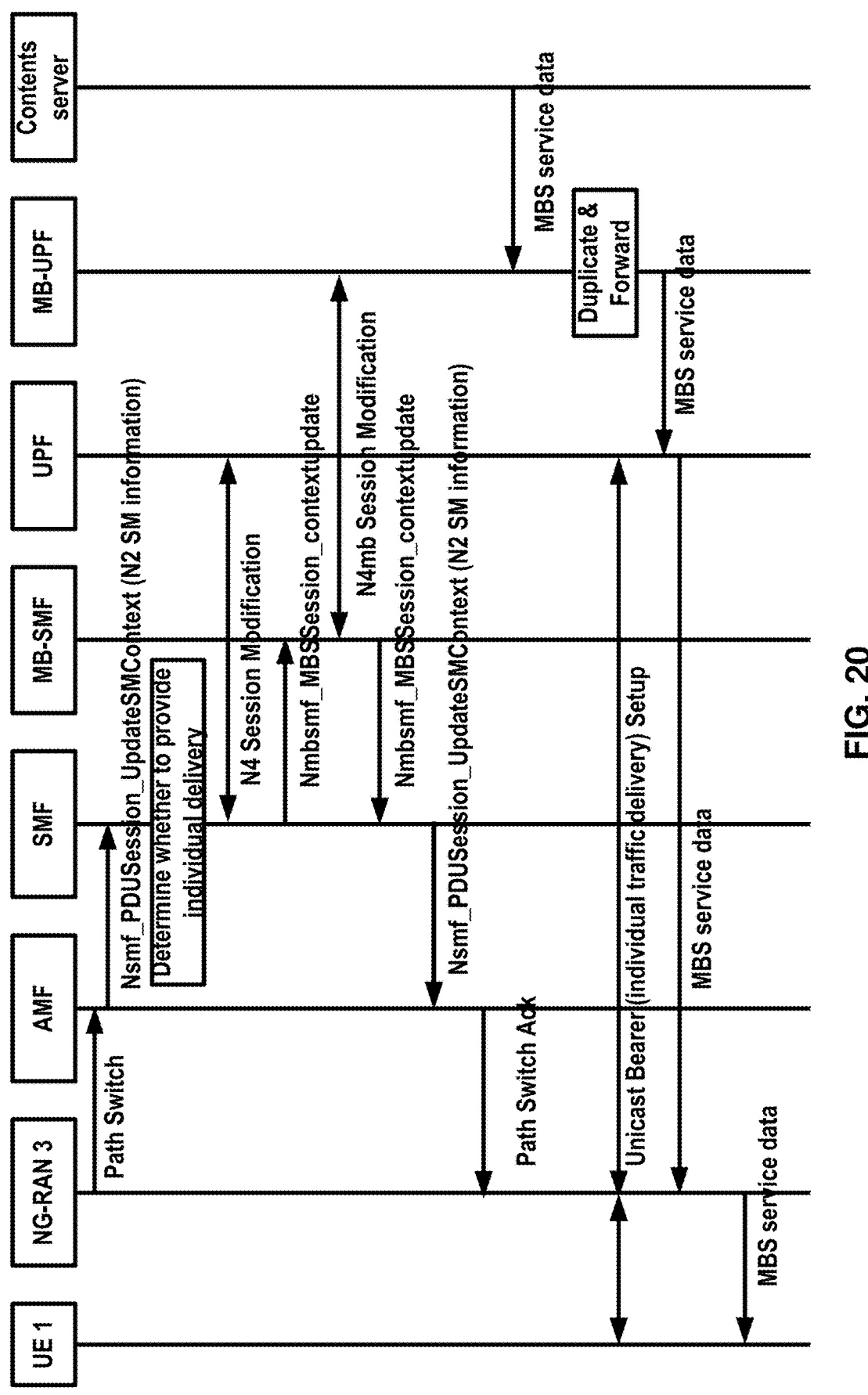
FIG. 20 is an example diagram of an aspect of an embodiment of the present disclosure.

FIG. 20 depicts one example embodiment of the present disclosure. In an example, an AMF may initiate a resource setup procedure for a UE, which is located in the third NG-RAN (the third cell) not supporting MBS and/or MBS for RRC inactive state.

In an example, the AMF may receive the path switch request from the third NG-RAN. Based on the path switch request, the AMF may determine that the path switch request is initiated for MBS. For example, if the RRC resume cause of the path switch request is the cause value associated with MBS, the AMF may determine that the path switch request is initiated for MBS. In another example, based on the path switch request, the AMF may determine that the third NG-RAN does not support MBS and/or does not support MBS for RRC inactive state. For example, if the path switch request does not comprise information that the third NG-RAN supports MBS and/or MBS for RRC inactive state, the AMF may determine that the third NG-RAN does not support MBS and/or does not support MBS for RRC inactive state. For example, if the RRC resume cause of the path switch request is the cause value associated with MBS, the AMF may determine that the third NG-RAN does not support MBS and/or does not support MBS for RRC inactive state.

In an example, the AMF may send a Nsmf service request to a SMF. The Nsmf service request may be Nsmf_PDUSession_UpdateSMContext request message and/or the like. The Nsmf service request may comprise N2 SM information and/or information of NG-RAN. For example, the N2 SM information may comprise the information of PDU session resources to be switched/setup of the path switch request. The information of NG-RAN may comprise information of whether the Nsmf service request is associated with MBS and/or whether the third NG-RAN supports MBS and/or MBS for RRC inactive state. For example, based on the determination that the path switch request is initiated for MBS, based on the determination that the third NG-RAN does not support MBS, and/or based on the determination that the third NG-RAN does not support MBS for RRC inactive state, the AMF may include the information of NG-RAN in the Nsmf service request.

In an example, the SMF may receive the Nsmf service request from the AMF. Based on the Nsmf service request, the SMF may determine to provide the MBS session to the UE via individual MBS traffic delivery. For example, based on the information of NG-RAN in the Nsmf service request, the SMF may determine that the third NG-RAN does not support MBS and/or MBS for RRC inactive state. For example, based on that the Nsmf service request does not comprise indication that the third NG-RAN supports MBS and/or MBS for RRC inactive state, the SMF may determine that the third NG-RAN does not support MBS and/or MBS for RRC inactive state. For example, based on determination that the third NG-RAN does not support MBS and/or MBS for RRC inactive state, the SMF may determine to provide the MBS session to the UE via individual MBS traffic delivery.

In an example, based on the determination to provide the MBS session via individual MBS traffic delivery, the SMF may send N4 session modification request to a UPF. The N4 session modification request may comprise information of the MBS session, request for creation of a tunnel. For example, the tunnel may be used for the UPF to receive one or more packets of the MBS session from a multicast broadcast UPF (MB-UPF), via individual MBS traffic delivery.

In an example, the UPF may receive the N4 session modification request from the SMF. Based on the request for creation of the tunnel, the UPF may allocate resources for individual MBS traffic delivery for the UE. For example, the UPF may allocate a port, an IP address to receive one or more packet for the MBS session from the MB-UPF. In response to the N4 session modification request, the UPF may send N4 session modification response to the SMF. For example, the N4 session modification response may comprise information of the resources for individual MBS traffic delivery.

In an example, the SMF may receive the N4 session modification response from the UPF. Based on the N4 session modification response, the SMF may send Nmbsmf service request to a multicast broadcast SMF (MB_SMF), to establish the tunnel between the MB-UPF and the UPF. For example, the Nmbsmf service request may be Nmbsmf_MBSSession_contextupdate request, and/or the like.

The Nmbsmf service request may comprise information of the resources for individual MBS traffic delivery received from the UPF.

In an example, the MB-SMF may receive the Nmbsmf service request from the SMF. Based on the Nmbsmf service request, the MB-SMF may determine to configure individual MBS traffic delivery. Based on the determination, the MB-SMF may send N4mb service request to the MB-UPF, to request the MB-UPF to send the one or more packets of the MBS session to the UPF. The N4mb service request may be N4mb_Session_Modification request, and/or the like. In response to the Nmbsmf service request from the MB-SMF, the MB-UPF may send the Nmbsmf service response to the MB-SMF. In response to the Nmbsmf service request, the MB-SMF sends the Nmbsmf service response (e.g., Nmb-smf_MBSSession_contextupdate response) to the SMF. For example, the Nmbsmf service response may indicate to the SMF that the individual MBS traffic delivery is configured for the UE. In response to the received Nmbsmf service response, the SMF may send to the AMF, Nsmf service response. The Nsmf service response may comprise a second N2 SM information. The second N2 SM information may comprise information of a PDU session associated with the MBS session. For example, the PDU session may be used to deliver the one or more packets of the MBS session to the UE, via the individual MBS traffic delivery. In an example, the AMF may receive from the SMF, the Nsmf service response. In response to the Nsmf service response, and/or the path switch request, the AMF may send to the third NG-RAN, path switch acknowledge. The path switch acknowledge may comprise the second N2 SM information received from the SMF. The third NG-RAN may receive the path switch acknowledge. Based on the second N2 SM information of the path switch acknowledge, the third NG-RAN may configure radio resources (e.g., radio bearer configuration) for the UE to provide the MBS session. For example, the third NG-RAN may set up one or more unicast (individual) bearers between the NG-RAN and the UE. For example, the one or more unicast bearers may comprise one or more radio bearers established between the NG-RAN and the UE, for individual MBS traffic delivery. The third NG-RAN may use the one or more radio bearers to deliver the one or more packets of the MBS session. The one or more radio bearers may not be used by other UEs than the UE. For example, the one or more unicast bearers may be used for the individual MBS traffic delivery, and/or may not use functionalities of MBS.

In an example, the MB-UPF may receive the one or more packets for the MBS session from the content server. Based on that the individual MBS delivery method is configured and/or based on that the tunnel for the UE is established between the MB-UPF and the UPF, the MB-UPF may copy the received one or more packets of the MBS session, and/or may send the copy of the received one or more packets of the MBS session to the UPF. The UPF may deliver the copy of the received one or more packets of the MBS session, to the third NG-RAN. The NG-RAN may receive the copy of the one or more packets of the MBS session from the UPF, and/or may send the copy of the one or more packets of the MBS session to the UE, via the one or more unicast bearer established to the UE.

Figure 21:
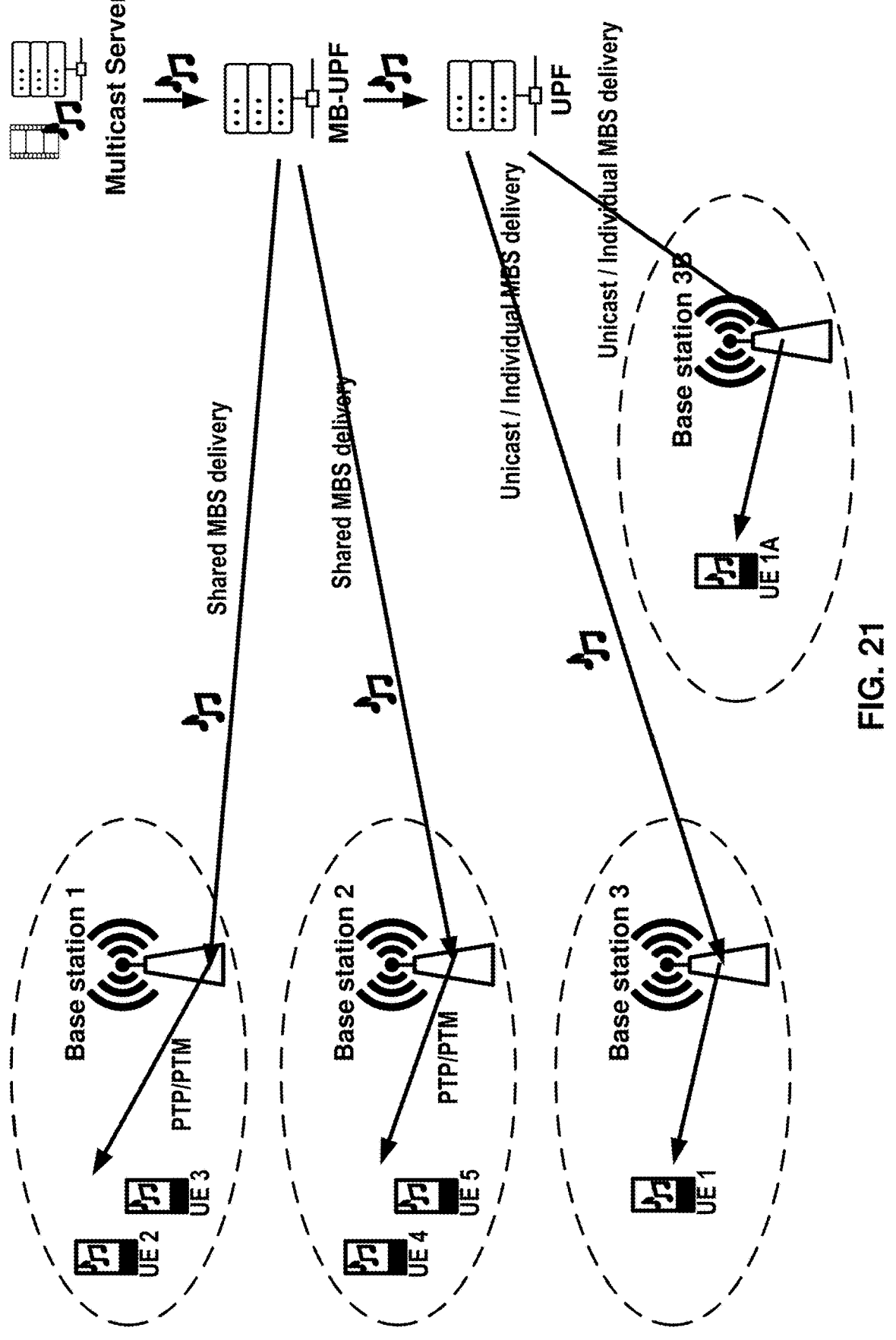
FIG. 21 is an example diagram of an aspect of an embodiment of the present disclosure.

FIG. 21 depicts one example embodiment of the present disclosure. In an example, one or more second UEs (UE 2, UE 3, UE 4, UE 5) in one or more second NG-RANs (base station 1, base station 2) supporting MBS and/or MBS for RRC inactive state may receive one or more packets of the MBS session via shared MBS traffic delivery. In an example, one or more first UEs (UE 1, UE 1A) in one or more first NG-RANs (base station 3, base station 3A) not supporting MBS and/or MBS for RRC inactive state may receive one or more packets of the MBS session via individual MBS traffic delivery.

In an example, the one or more second NG-RANs may support MBS and/or MBS for RRC inactive state. The one or more second UEs supporting MBS for RRC inactive state may camp on one or more second cells of the one or more second NG-RANs. Because the one or more second NG-RANs support MBS for RRC inactive state, the one or more second UEs in the RRC inactive state may receive one or more packets of an MBS session from the one or more second NG-RANs. Because the one or more second NG-RANs support MBS and/or MBS for RRC inactive state, the one or more second NG-RANs and/or one or more core network nodes may use shared MBS traffic delivery for the MBS session. For example, when an MB-UPF for the MBS session receives the one or more packets of the MBS session from a multicast server, the MB-UPF may use a shared tunnel to deliver the one or more packets to the one or more second NG-RANs. For example, a base station 1 (of the one or more second NG-RANs) may receive the one or more packets for the MBS session via a shared tunnel from the MB-UPF. For example, a base station 2 (of the one or more second NG-RANs) may receive the one or more packets for the MBS session via a shared tunnel from the MB-UPF. Because the base station 1 and/or the base station 2 support MBS, the base station 1 and/or the base station 2 may send the one or more packets of the MBS session, via a multicast radio bearer. For example, for the multicast radio bearer, the base station 1 and/or the base station 3 may use functionality of MBS (e.g., group RNTI for MBS, PTM bearer, PTP bearer).

In an example, the one or more first NG-RANs may not support MBS and/or may not support MBS for RRC inactive state. The one or more first UEs supporting MBS for RRC inactive state may camp on one or more first cells of the one or more first NG-RANs. Because the one or more first NG-RANs do not support MBS and/or MBS for RRC inactive state, the one or more first UEs may transit to RRC connected state, and/or the one or more first NG-RANs and/or one or more core network nodes may use individual MBS traffic delivery for the MBS session. For example, when an MB-UPF for the MBS session receives the one or more packets of the MBS session from the multicast server, the MB-UPF may duplicate the one or more packets of the MBS session. The MB-UPF may send the duplicated one or more packets of the MBS session, to one or more UPFs associated with the one or more first UEs. The one or more UPFs may receive the duplicated one or more packets of the MBS session, from the MB-UPF. Based on the received one or more packets of the MBS session, the one or more UPFs may copy the received one or more packets of the MBS session, and/or may send the copied one or more packets of the MBS session to the one or more first NG-RANs. For example, a first UPF (of the one or more UPFs) may receive a first packet of the MBS session from the MB-UPF. The first UPF may be associated with the UE 1 and/or the UE 1A. The first UPF may copy the first packet and send the copy of the first packet to the base station 3. The base station 3 may receive the copy of the first packet and may send the copy of the first packet to the UE 1, via a radio bearer (unicast bearer) of the UE 1. The first UPF may copy the first packet and send the copy of the first packet to the base station 3A. The base station 3A may receive the copy of the first packet and may send the copy of the first packet to the UE 1A, via a radio bearer (unicast bearer) of the UE 1A. Because the base station 3 and/or the base station 3A do not support MBS, the base station 3 and/or the base station 3A may send the one or more packets of the MBS session to the one or more first UEs, via one or more radio bearer, without using functionality of MBS (e.g., group RNTI for MBS, PTM bearer, multicast radio bearer, shared radio bearer).

Figure 22:
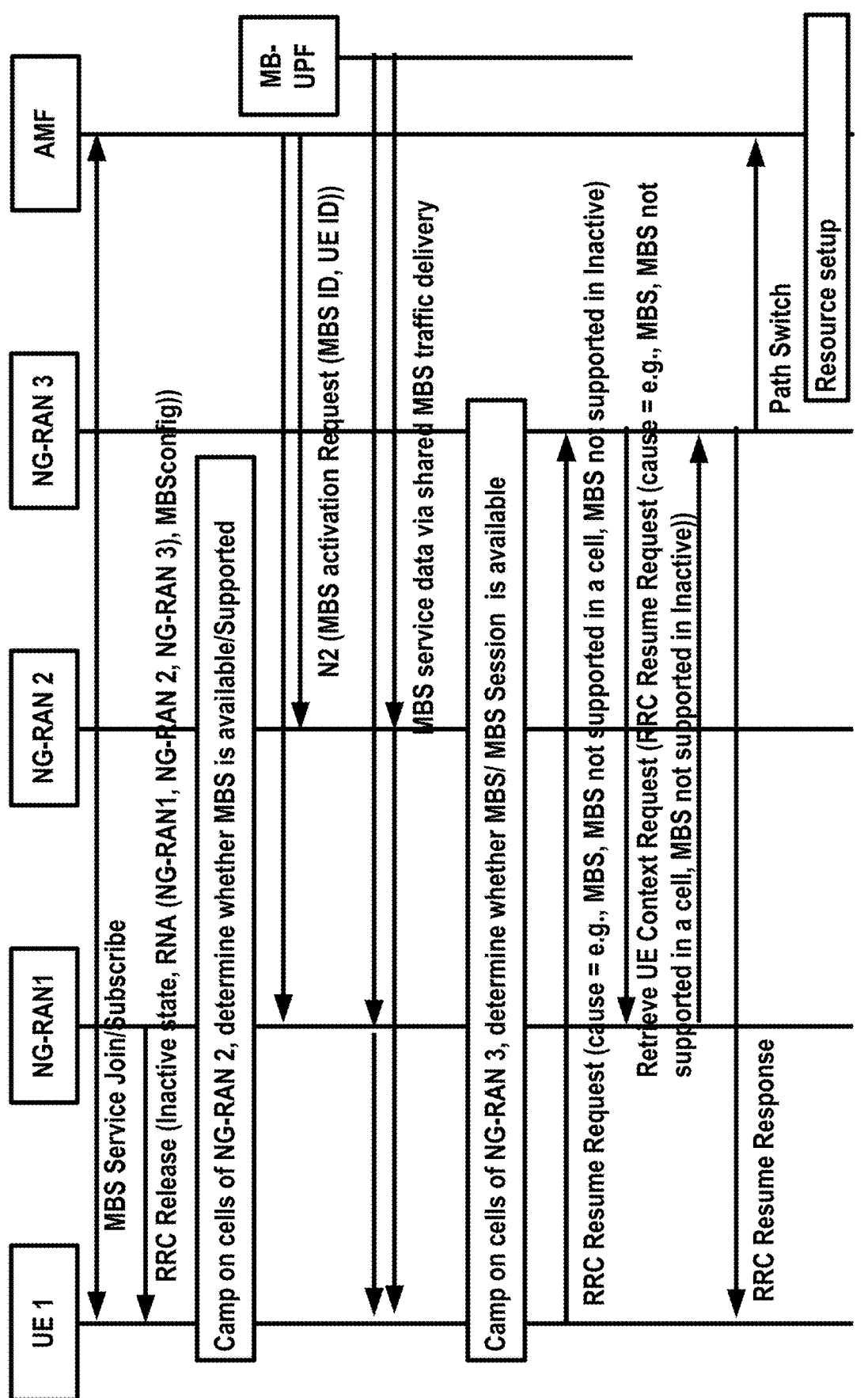
FIG. 22 is an example diagram of an aspect of an embodiment of the present disclosure.

FIG. 22 depicts one example embodiment of the present disclosure. In an example, a UE may join to an MBS session, and/or may receive one or more first packets of the MBS session from a first NG-RAN (NG-RAN 1) and/or a first cell of the first NG-RAN. The UE may move into area of a third NG-RAN (NG-RAN 3) which may not support MBS and/or MBS for RRC inactive state. The UE may send RRC resume request, and/or may inform that the UE (UE 1) is located in a coverage area of the third NG-RAN which may not support MBS and/or MBS for RRC inactive state. Based on the RRC resume request, the first NG-RAN may determine to relocate a context of the UE from the first NG-RAN to the third NG-RAN. This may enable the third NG-RAN to deliver one or more second packets of the MBS session to the UE.

In an example, the first NG-RAN may have the context for the UE. When the first NG-RAN has an RRC connection with the UE, the first NG-RAN may have the context for the UE. For example, the UE may use the RRC connection to join the MBS session which the UE is interested in receiving. By joining the MBS session, the UE may get authorization to receive one or more packets of the MBS session.

In an example, the context of the UE in the first NG-RAN may be a block of information in the first NG-RAN associated with the UE. The block of information may comprise one or more necessary information required to maintain the first NG-RAN service to the UE. When the UE hands over to other NG-RAN, the context of the UE may be relocated from the first NG-RAN to other NG-RAN.

In an example, the first NG-RAN may determine to transition the UE into RRC inactive state. For example, to reduce power consumption of the UE, the first NG-RAN may determine to move the UE into RRC Inactive state. To move the UE into RRC Inactive state, the first NG-RAN may send an RRC Release message to the UE. The RRC Release message may comprise an indication to move into RRC Inactive state. The RRC Release message may comprise information of a RAN notification area (RNA). For example, the information of RNA may comprise at least one of information of one or more cells, information of one or more tracking areas, information of one or more RAN area codes. For example, the RNA for the UE may comprise areas managed by the first NG-RAN, a second NG-RAN (NG-RAN 2), and/or the third NG-RAN.

In an example, the UE may receive the RRC Release message sent by the first NG-RAN. Based on the received RRC Release message, the UE may transition into RRC Inactive state.

In an example, the UE may move into coverage of the second NG-RAN. To determine whether the UE moves into the coverage of the second NG-RAN, and/or to determine whether the UE needs to (re) select a cell, the UE may perform measurement of one or more cells. Based on the measurement of the one or more cells, the UE may (re) select a second cell of the one or more cells. For example, the UE may select the second cell, based on the fact that the signal strength (e.g., 1 dBm) of the second cell is strongest among the one or more cells (e.g., less than 1 dBm). For example, the UE may reselect to the second cell from the first cell, based on that the signal strength (e.g., 3 dBm) of the second cell is stronger than the first cell (e.g., 2 dBm). Based on the determination of (re) selecting the second cell, the UE may camp on the second cell. The camping on the second cell may comprise monitoring one or more control channels (e.g., PDCCH, PBCCH, PCH, and so on) of the second cell, and/or receiving one or more system information blocks (SIBs) of the second cell. For example, the second NG-RAN may manage the second cell. The second cell and/or the second NG-RAN may be authorized to send one or more packets of the MBS session. The second cell and/or the second NG-RAN may support MBS. The second cell and/or the second NG-RAN may support MBS for RRC inactive state. That the second NG-RAN supports for MBS for RRC inactive state may be that the second NG-RAN may be capable of sending one or more packets of the MBS session to one or more UEs in the RRC inactive state. That the second NG-RAN supports for MBS for RRC inactive state may be that the second NG-RAN may be capable of sending one or more packets of the MBS multicast session to one or more UEs not in the RRC connected state.

In an example, the UE may receive one or more second RRC messages from the second cell. The one or more second RRC messages may be the one or more second SIBs, one or more second multicast control channel (MCCH) messages, and/or the like. The one or more second RRC messages may be sent via BCH, MCCH, and/or the like. Based on the received one or more second RRC messages, the UE may determine whether the MBS session is configured in the second cell. To determine whether the MBS session is configured in the second cell may be to determine whether MBS is configured in the second cell. For example, the UE may determine whether the MBS session is configured in the second cell, based on at least one of following:

whether the one or more second RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, an indication of whether MBS for RRC inactive state is supported, and/or the like.

whether the RRC messages comprise one or more information associated with the MBS session. For example, the one or more information associated with the MBS session may be one or more identifiers of the MBS session.

For example, if the one or more second RRC messages comprises the one or more information associated with MBS, if the one or more second RRC message comprises one or more information associated with the MBS session, if the UE receives the one or more second RRC messages comprising the one or more information associated with MBS, and/or if the UE receives the one or more second RRC messages comprising the one or more information associated with the MBS session, the UE may determine that the MBS session is configured in the second cell. For example, if the one or more second RRC messages does not comprise the one or more information associated with MBS, if the one or more second RRC message does not comprise the one or more information associated with the MBS session, if the UE does not receive the one or more second RRC messages comprising the one or more information associated with MBS, and/or if the UE does not receive the one or more second RRC messages comprising the one or more information associated with the MBS session, the UE may determine that the MBS session is not configured in the second cell.

In an example, the second NG-RAN may support MBS, the MBS session, and/or MBS for RRC inactive state. For example, the second NG-RAN may send one or more second RRC messages comprising at least one of the one or more information associated with MBS and/or the one or more information associated with the MBS session.

In an example, the UE may receive the one or more second RRC messages sent by the second NG-RAN. Based on the one or more second RRC messages, the UE may determine that the MBS session is configured in the second NG-RAN and/or in the second cell. Based on the determination that the MBS session is configured in the second NG-RAN (e.g., the second cell), the UE may receive the first one or more packets of the MBS session, from the second cell (or the second NG-RAN). For example, because the second cell (or the second NG-RAN) supports MBS and/or MBS for RRC inactive state, the second cell (or the second NG-RAN) may send the one or more packets of the MBS session via shared MBS traffic delivery.

In an example, the UE may move into coverage of the third NG-RAN and/or the UE may camp on a third cell of the third NG-RAN. To determine whether the UE moves into the coverage of the third NG-RAN, and/or to determine whether the UE needs to (re) select a cell, the UE may perform measurement of one or more cells. Based on the measurement of the one or more cells, the UE may (re) select the third cell of the one or more cells. For example, the UE may select the third cell, based on the fact that the signal strength (e.g., 1 dBm) of the third cell is strongest among the one or more cells (e.g., less than 1 dBm). For example, the UE may select to the third cell from the first (or the second) cell, based on that the signal strength (e.g., 3 dBm) of the second cell is stronger than the first (or the second) cell (e.g., 2 dBm). Based on the determination of (re) selecting the third cell, the UE may camp on the third cell. The camping on the third cell may comprise monitoring one or more control channels (e.g., PDCCH, PBCCH, PCH, and so on) of the third cell, and/or receiving one or more system information blocks (SIBs) of the third cell. For example, the third NG-RAN may manage the third cell. The third cell and/or the third NG-RAN may not support MBS. The third cell and/or the third NG-RAN may not support MBS for RRC inactive state. That the third NG-RAN does not support for MBS for RRC inactive state may be that the third NG-RAN may not be capable of sending one or more packets of the MBS session to one or more UEs in the RRC inactive state. That the third NG-RAN does not support for MBS for RRC inactive state may be that the third NG-RAN may not be capable of sending one or more packets of the MBS multicast session to one or more UEs not in the RRC connected state. That the third NG-RAN does not support MBS may be that the third NG-RAN may not support functionalities (e.g., using group RNTI for MBS, using PTM bearer, using multicast radio bearer, using MBS context, shared MBS traffic delivery, and/or the like) of MBS.

In an example, the UE may receive one or more third RRC messages from the third cell. The one or more third RRC messages may be one or more third SIBs, one or more third multicast control channel (MCCH) messages, and/or the like. The one or more third RRC messages may be sent via BCH, MCCH, and/or the like. Based on the received one or more third RRC messages, the UE may determine whether the MBS session is configured in the third cell. To determine whether the MBS session is configured in the third cell may be to determine whether MBS is configured in the third cell.

For example, the UE may determine whether the MBS session is configured in the third cell, based on at least one of following:

whether the one or more third RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, an indication of whether MBS for RRC inactive state is supported, and/or the like.

whether the one or more third RRC messages comprise one or more information associated with the MBS session. For example, the one or more information associated with the MBS session may be one or more identifiers of the MBS session.

For example, if the one or more third RRC messages comprise the one or more information associated with MBS, if the one or more third RRC messages comprise one or more information associated with the MBS session, if the UE receives the one or more third RRC messages comprising the one or more information associated with MBS, and/or if the UE receives the one or more third RRC messages comprising the one or more information associated with the MBS session, the UE may determine that the MBS session is configured in the third cell. For example, if the one or more third RRC messages do not comprise the one or more information associated with MBS, if the one or more third RRC message do not comprise the one or more information associated with the MBS session, if the UE does not receive the one or more third RRC messages comprising the one or more information associated with MBS, and/or if the UE does not receive the one or more third RRC messages comprising the one or more information associated with the MBS session, the UE may determine that the MBS session is not configured in the third cell.

In an example, the third NG-RAN may not support MBS, the MBS session, and/or MBS for RRC inactive state. For example, the third NG-RAN may not send one or more third RRC messages comprising at least one of the one or more information associated with MBS and/or may send one or more third RRC messages not comprising the one or more information associated with the MBS. For example, the third NG-RAN may not send one or more third RRC messages comprising at least one of the one or more information associated with MBS session and/or may send one or more third RRC messages not comprising the one or more information associated with the MBS session.

In an example, the UE may not receive the one or more third RRC messages sent by the third NG-RAN, the UE may receive the one or more third RRC messages not comprising the one or more information associated with MBS session and/or the UE may receive the one or more third RRC messages not comprising the one or more information associated with MBS. Based on not receiving the one or more third RRC messages, based on the one or more third RRC messages not comprising the one or more information associated with MBS session, and/or based on the one or more third RRC messages not comprising the one or more information associated with MBS, the UE may determine that the MBS session is not configured in the third NG-RAN and/or in the third cell. Based on the determination that the MBS session is not configured in the third NG-RAN (or the third cell), that the UE receives MBS activation in the previous cell (e.g., the second cell, the first cell), and/or that the UE receives one of more packets of the MBS session in the previous cell, the UE may determine to send a third RRC resume request.

In an example, based on determining to send the third RRC resume request, the UE may send the third RRC resume request to the third NG-RAN. Based on the MBS session not configured in the NG-RAN (or the third cell), the UE may send an indication that the third RRC resume request is associated with the MBS. For example, the third RRC resume request may comprise at least one of:

an identifier associated with the UE: This may indicate an identity of the UE. For example, the identifier associated with the UE may comprise at least one of radio network temporary identifier (RNTI), cell RNTI (C-RNTI), inactive RNTI (I-RNTI), short I-RNTI, subscription concealed identifier (SUCI), and subscription permanent identifier (SUPI)

a message authentication code for integrity (MAC-I): This may be a value to confirm that the UE owns the identifier associated with the UE. For example, the UE and the NG-RAN may share a secret key. When the UE send a message to the NG-RAN, the UE may generate the MAC-I, based on the secret key. When the NG-RAN receives the message comprising the MAC-I, the NG-RAN may check whether the MAC-I is valid. If the MAC-I is valid, the NG-RAN may determine that the UE is the owner of the identifier.

the indication that the third RRC resume request is associated with the MBS: This may comprise at least one of a cause value associated with the MBS and/or the identifier of the MBS session. For example, the cause value associated with the MBS may indicate at least one of that the third RRC resume request is associated with MBS, that the UE is in the cell which does not support MBS, that the UE is in the cell which does not support MBS for RRC inactive state, that the cell does not configure the MBS session, that the cell does not configure the MBS, that the UEs does not receive information associated with MBS from the cell, that context relocation is required for the UE, that the UE requests the MBS service, and/or the like.

In an example, the third NG-RAN may receive the third RRC resume request from the UE. Based on the identifier associated with the UE, the third NG-RAN may determine that the context of the UE is in other NG-RAN. For example, the third NG-RAN may check whether the identifier associated with the UE is in its memory. If the identifier associated with the UE is not within its memory, the third NG-RAN may determine that the context of the UE is in other NG-RAN. Based on the determination that the context of the UE is in other NG-RAN, the third NG-RAN may send a Xn request message (e.g., Retrieve UE context request) to the first NG-RAN which holds the context of the UE. The Xn request message (e.g., Retrieve UE context request) may comprise at least one of the third RRC resume request, RRC resume cause, MBS capability indicator, new cell identifier and/or the like. For example, the third RRC resume request may be the message received by the third NG-RAN from the UE. For example, the RRC resume cause may be the cause value associated with the MBS of the third RRC resume request. For example, the new cell identifier may indicate the cell from which the third NG-RAN receives the RRC resume request from the UE.

In an example, the first NG-RAN may receive from the third NG-RAN, the Xn request message (e.g., Retrieve UE context request). Based on the Xn request message (e.g., Retrieve UE context request), the first NG-RAN may determine whether the first NG-RAN needs to relocate the context of the UE. For example, based on the third RRC resume request, and/or the RRC resume cause, the first NG-RAN may determine that the UE is located in the third NG-RAN (or third cell) which does not support MBS and/or which does not support MBS for RRC inactive state. For example, when the third RRC resume request comprise the indication that the third RRC resume request is associated with the MBS, and/or when Xn request message (e.g., Retrieve UE context request) comprises the cause value associated with MBS, the first NG-RAN may determine that the UE is located in the third NG-RAN (or the third cell) which does not support MBS and/or which does not support MBS in the RRC inactive state. For example, when the third RRC resume request comprise the indication that the third RRC resume request is associated with the MBS, and/or when Xn request message (e.g., Retrieve UE context request) comprises the cause value associated with MBS, the first NG-RAN may determine to relocate the context of the UE to the third NG-RAN.

In an example, based on the determination of relocating the context of the UE to the third NG-RAN, the first NG-RAN may send Xn response message (e.g., Retrieve UE context response) to the third NG-RAN. The Xn response message (e.g., Retrieve UE context response) may comprise the context of the UE. For example, the context may comprise at least one of GUAMI, information of PDU Session Resources, RRC context, mobility restriction list, and/or the like. GUAMI may indicate information of an AMF to which the UE is connected. For example, the information of PDU Session Resources may indicate one or more PDU sessions for which the UE establishes for data communication. For example, the mobility restriction list may indicate one or more RATs which the UE is not allowed to use, and/or one or more areas which the UE is not allowed to be handed over.

In an example, the third NG-RAN may receive from the first NG-RAN, the Xn response message (e.g., Retrieve UE context response). Based on the Xn response message (e.g., Retrieve UE context response), the third NG-RAN may send path switch request to the AMF. For example, the third NG-RAN may send the path switch request to the AMF indicated by the GUAMI of the Xn response message (e.g., Retrieve UE context response). For example, the path switch request may comprise at least one of an information of PDU session resources to be switched/setup, RRC resume cause, and/or the like. For example, the RRC resume cause may be the cause value associated with MBS.

In an example, the AMF may receive the path switch request from the third NG-RAN. Based on the path switch request, the AMF may initiate a procedure to set up resource for the UE and/or to deliver one or more packets of the MBS session to the UE. To set up resource for the UE, and/or to deliver one or more packets of the MBS session to the UE, the example depicted in FIG. 20 may apply.

Figure 23:
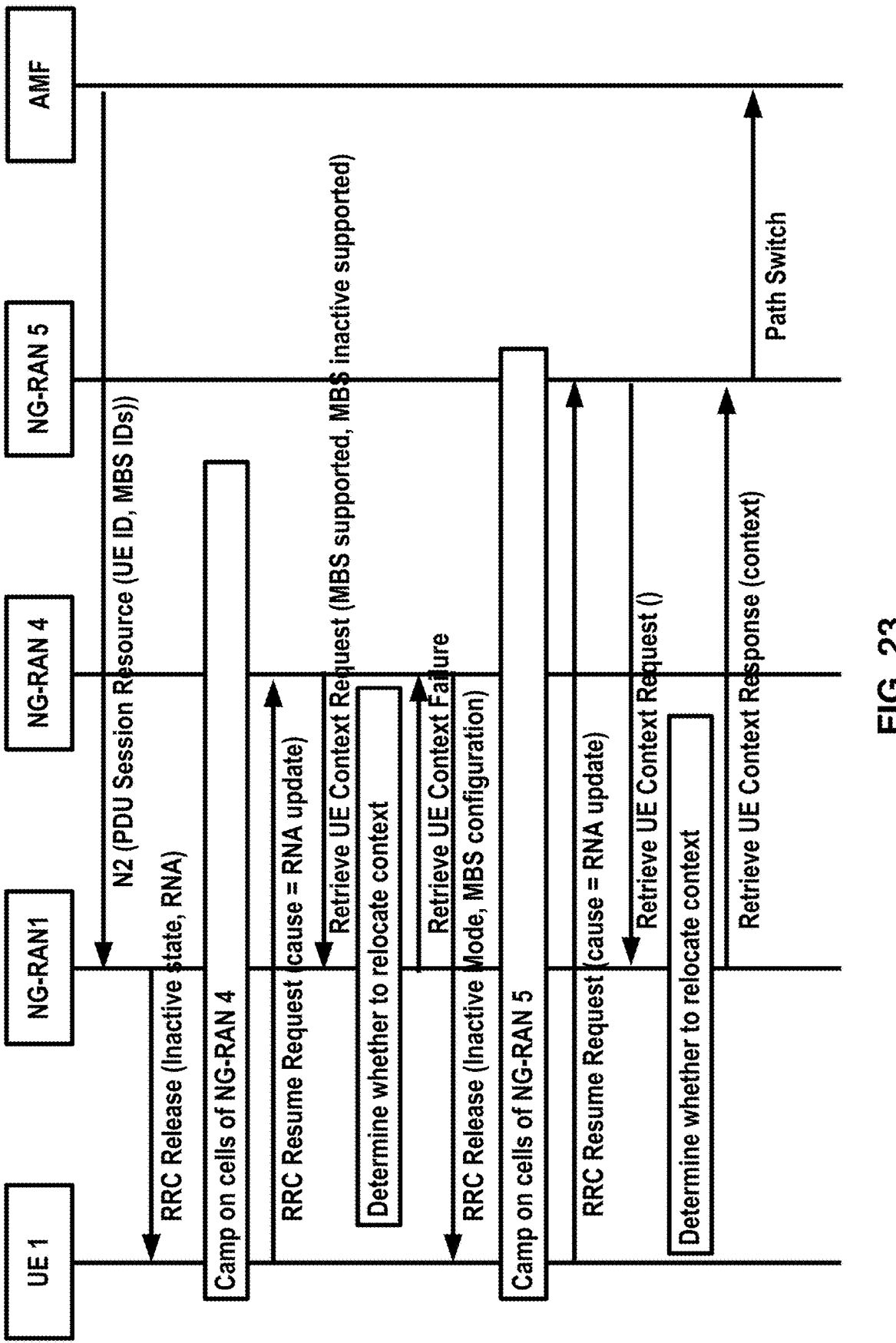
FIG. 23 is an example diagram of an aspect of an embodiment of the present disclosure.

FIG. 23 depicts one example embodiment of the present disclosure. In an example, when a fourth NG-RAN send retrieve UE context request to a first NG-RAN, the fourth NG-RAN (NG-RAN 4) may indicate whether the fourth NG-RAN supports MBS and/or MBS for RRC inactive. Based on whether the fourth NG-RAN supports MBS and/or MBS for RRC inactive, the first NG-RAN may determine whether relocation of a context of the UE is needed or not.

In an example, the first NG-RAN may have the context for the UE (UE 1). When the first NG-RAN has an RRC connection with the UE, the first NG-RAN may have the context for the UE. The UE may use the RRC connection to join an MBS session which the UE is interested in receiving. By joining the MBS session, the UE may get authorization to receive one or more packets of the MBS session. If the UE is authorized for the MBS session, the first NG-RAN may receive from an AMF, a N2 (e.g., PDU Session Resource Setup Request) message for the UE. The N2 message may comprise information of one or more MBS sessions that the UE is allowed to receive.

In an example, a context of the UE in the first NG-RAN may be a block of information in the first NG-RAN associated with the UE. The block of information may comprise one or more necessary information required to maintain the first NG-RAN service to the UE. When the UE hands over to other NG-RAN, the context of the UE may be transferred from the first NG-RAN to other NG-RAN.

In an example, the first NG-RAN may determine to transition the UE into RRC inactive state. For example, to reduce power consumption of the UE, the first NG-RAN may determine to move the UE into RRC inactive state. To move the UE into RRC inactive state, the first NG-RAN may send an RRC Release message to the UE. The RRC Release message may comprise an indication to move into RRC Inactive state. The RRC Release message may comprise information of a RAN notification area (RNA). For example, the information of RNA may comprise at least one of information of one or more cells, information of one or more tracking areas, information of one or more RAN area codes. For example, the RNA for the UE may comprise areas managed by the first NG-RAN, the fourth NG-RAN (NG-RAN 4), and/or the fifth NG-RAN (NG-RAN 5).

In an example, the UE may receive the RRC Release message sent by the first NG-RAN. Based on the received RRC Release message, the UE may transition into RRC inactive state.

In an example, the UE may move into coverage of the fourth NG-RAN. To determine whether the UE moves into the coverage of the fourth NG-RAN, and/or to determine whether the UE needs to (re) select a cell, the UE may perform measurement of one or more cells. Based on the measurement of the one or more cells, the UE may (re) select a fourth cell of the one or more cells. For example, the UE may select the fourth cell, based on the fact that the signal strength (e.g., 1 dBm) of the fourth cell is strongest among the one or more cells (e.g., less than 1 dBm). For example, the UE may reselect to the fourth cell from the first cell, based on that the signal strength (e.g., 3 dBm) of the fourth cell is stronger than the first cell (e.g., 2 dBm). Based on the determination of (re) selecting the fourth cell, the UE may camp on the fourth cell. The camping on the fourth cell may comprise monitoring one or more control channels (e.g., PDCCH, PBCCH, PCH, and so on) of the fourth cell, and/or receiving one or more system information blocks (SIBs) of the fourth cell. For example, the fourth NG-RAN may manage the fourth cell. The fourth cell and/or the fourth NG-RAN may be authorized to send one or more packets of the MBS session. The fourth cell and/or the fourth NG-RAN may support MBS. The fourth cell and/or the fourth NG-RAN may support MBS for RRC inactive state. That the fourth NG-RAN supports for MBS for RRC inactive state may be that the fourth NG-RAN may be capable of sending one or more packets of the MBS session to one or more UEs in the RRC inactive state. That the fourth NG-RAN supports for MBS for RRC inactive state may be that the fourth NG-RAN may be capable of sending one or more packets of the MBS multicast session to one or more UEs not in the RRC connected state.

In an example, the UE may receive one or more fourth RRC messages from the fourth cell. The one or more fourth RRC messages may be one or more SIBs, one or more multicast control channel (MCCH) messages, and/or the like. The one or more fourth RRC messages may be sent via BCH, MCCH, and/or the like. Based on the received one or more fourth RRC messages, the UE may determine whether the MBS session is configured in the fourth cell. To determine whether the MBS session is configured in the fourth cell may be to determine whether MBS is configured in the fourth cell. For example, the UE may determine whether the MBS session is configured in the fourth cell, based on at least one of following:

whether the one or more fourth RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, an indication of whether MBS for RRC inactive state is supported, and/or the like.

whether the one or more fourth RRC messages comprise one or more information associated with the MBS session. For example, the one or more information associated with the MBS session may be one or more identifiers of the MBS session.

For example, if the one or more fourth RRC messages comprises the one or more information associated with MBS, if the one or more fourth RRC message comprises one or more information associated with the MBS session, if the UE receives the one or more fourth RRC messages comprising the one or more information associated with MBS, and/or if the UE receives the one or more fourth RRC messages comprising the one or more information associated with the MBS session, the UE may determine that the MBS session is configured in the fourth cell. For example, if the one or more fourth RRC messages does not comprise the one or more information associated with MBS, if the one or more fourth RRC message does not comprise the one or more information associated with the MBS session, if the UE does not receive the one or more fourth RRC messages comprising the one or more information associated with MBS, and/or if the UE does not receive the one or more fourth RRC messages comprising the one or more information associated with the MBS session, the UE may determine that the MBS session is not configured in the fourth cell.

In an example, the fourth NG-RAN may support MBS, the MBS session, and/or MBS for RRC inactive state. For example, the fourth NG-RAN may send one or more fourth RRC messages comprising at least one of the one or more information associated with MBS and/or the one or more information associated with the MBS session.

In an example, the UE may receive the one or more fourth RRC messages sent by the fourth NG-RAN. Based on the one or more fourth RRC messages, the UE may determine that the MBS session is configured in the fourth NG-RAN and/or in the fourth cell. Based on the determination that the MBS session is configured in the fourth NG-RAN (e.g., the fourth cell), the UE may send to the fourth NG-RAN, a fourth RRC resume request.

In an example, the fourth NG-RAN may receive the fourth RRC resume request from the UE. Based on the identifier associated with the UE, the fourth NG-RAN may determine that the context of the UE is in other NG-RAN. For example, the fourth NG-RAN may check whether the identifier associated with the UE is in its memory. If the identifier associated with the UE is not within its memory, the fourth NG-RAN may determine that the context of the UE is in other NG-RAN. Based on the determination that the context of the UE is in other NG-RAN, the fourth NG-RAN may send a fourth Xn request message (e.g., Retrieve UE context request) to the first NG-RAN which holds the context of the UE. The fourth Xn request message (e.g., Retrieve UE context request) may comprise at least one of the fourth RRC resume request, RRC resume cause, MBS capability indicator, new cell identifier and/or the like. For example, the fourth RRC resume request may be the message received by the fourth NG-RAN from the UE. For example, the RRC resume cause may be the cause value associated with the MBS of the fourth RRC resume request. For example, the new cell identifier may indicate information of the fourth cell from which the fourth NG-RAN receives the fourth RRC resume request from the UE. For example, the MBS capability indicator may comprise at least one of:

information of whether the fourth NG-RAN supports MBS;

information of whether the fourth NG-RAN supports MBS for RRC inactive state;

information of list of one or more MBS sessions supported by the fourth NG-RAN.

In an example, the first NG-RAN may receive from the fourth NG-RAN, the fourth Xn request message (e.g., Retrieve UE context request). Based on the fourth Xn request message (e.g., Retrieve UE context request), the first NG-RAN may determine whether the first NG-RAN needs to relocate the context of the UE. For example, based on the fourth RRC resume request, the MBS capability, the context of the UE, and/or the RRC resume cause, the first NG-RAN may determine that the UE is located in the fourth NG-RAN (or fourth cell) which supports MBS and/or which supports MBS for RRC inactive state. Based on the determination that the UE is in the fourth NG-RAN which supports MBS and/or MBS for RRC inactive, the first NG-RAN may determine not to relocate the context of the UE, and/or may send a fourth Xn response message (e.g., Retrieve UE context failure). The fourth Xn response message (e.g., Retrieve UE context failure) may comprise a second RRC release message. The fourth NG-RAN may send the second RRC release message to the UE.

In an example, the UE may move into coverage of the fifth NG-RAN and/or the UE may camp on a fifth cell of the fifth NG-RAN. To determine whether the UE moves into the coverage of the fifth NG-RAN, and/or to determine whether the UE needs to (re) select a cell, the UE may perform measurement of one or more cells. Based on the measurement of the one or more cells, the UE may (re) select the fifth cell of the one or more cells. For example, the UE may select the fifth cell, based on that the signal strength (e.g., 1 dBm) of the fifth cell is strongest among the one or more cells (e.g., less than 1 dBm). For example, the UE may select to the fifth cell from the first (or the second) cell, based on that the signal strength (e.g., 3 dBm) of the fifth cell is stronger than the first (or the second) cell (e.g., 2 dBm). Based on the determination of (re) selecting the fifth cell, the UE may camp on the fifth cell. The camping on the fifth cell may comprise monitoring one or more control channels (e.g., PDCCH, PBCCH, PCH, and so on) of the fifth cell, and/or receiving one or more system information blocks (SIBs) of the fifth cell. For example, the fifth NG-RAN may manage the fifth cell. The fifth cell and/or the fifth NG-RAN may not support MBS. For example, the fifth cell and/or the fifth NG-RAN may not support MBS for RRC inactive state.

That the fifth NG-RAN does not support for MBS for RRC inactive state may be that the fifth NG-RAN may not be capable of sending one or more packets of the MBS session to one or more UEs in the RRC inactive state. That the fifth NG-RAN does not support for MBS for RRC inactive state may be that the fifth NG-RAN may not be capable of sending one or more packets of the MBS multicast session to one or more UEs not in the RRC connected state. That the fifth NG-RAN does not support MBS may be that the fifth NG-RAN may not support functionalities (e.g., using group RNTI for MBS, using PTM bearer, using multicast radio bearer, using MBS context, shared MBS traffic delivery, and/or the like) of MBS.

In an example, the UE may receive one or more fifth RRC messages from the fifth cell. The one or more fifth RRC messages may be one or more fifth SIBs, one or more fifth multicast control channel (MCCH) messages, and/or the like. The one or more fifth RRC messages may be sent via BCH, MCCH, and/or the like. Based on the received one or more fifth RRC messages, the UE may determine whether the MBS session is configured in the fifth cell. To determine whether the MBS session is configured in the fifth cell may be to determine whether MBS is configured in the fifth cell. For example, the UE may determine whether the MBS is configured in the fifth cell, based on at least one of following:

whether the one or more fifth RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, an indication of whether MBS for RRC inactive state is supported, and/or the like.

whether the one or more fifth RRC messages comprise one or more information associated with the MBS session. For example, the one or more information associated with the MBS session may be one or more identifiers of the MBS session.

For example, if the one or more fifth RRC messages comprise the one or more information associated with MBS, if the one or more fifth RRC messages comprise one or more information associated with the MBS session, if the UE receives the one or more fifth RRC messages comprising the one or more information associated with MBS, and/or if the UE receives the one or more fifth RRC messages comprising the one or more information associated with the MBS session, the UE may determine that the MBS session is configured in the fifth cell. For example, if the one or more fifth RRC messages do not comprise the one or more information associated with MBS, if the one or more fifth RRC message do not comprise the one or more information associated with the MBS session, if the UE does not receive the one or more fifth RRC messages comprising the one or more information associated with MBS, and/or if the UE does not receive the one or more fifth RRC messages comprising the one or more information associated with the MBS session, the UE may determine that the MBS session is not configured in the fifth cell.

In an example, the fifth NG-RAN may not support MBS, the MBS session, and/or MBS for RRC inactive state. For example, the fifth NG-RAN may not send one or more fifth RRC messages comprising the one or more information associated with MBS, the fifth NG-RAN may not send one or more fifth RRC messages comprising the one or more information associated with MBS session, may send one or more fifth RRC messages not comprising the one or more information associated with the MBS session and/or may send one or more fifth RRC messages not comprising the one or more information associated with the MBS.

In an example, the UE may not receive the one or more fifth RRC messages sent by the fifth NG-RAN, and/or the UE may receive the one or more fifth RRC messages not comprising the one or more information associated with MBS (or MBS session). Based on not receiving the one or more fifth RRC messages, and/or based receiving the one or more fifth RRC messages not comprising the one or more information associated with MBS (or MBS session), the UE may determine that the MBS session is not configured in the fifth NG-RAN and/or in the fifth cell. Based on the determination that the MBS session is not configured in the fifth NG-RAN (or the fifth cell), that the UE receives MBS activation in the previous cell (e.g., the fourth cell, the first cell), and/or that the UE receives one of more packets of the MBS session in the previous cell, the UE may determine to send a fifth RRC resume request, to the fifth NG-RAN.

In an example, the fifth NG-RAN may receive the fifth RRC resume request from the UE. Based on the identifier associated with the UE, the fifth NG-RAN may determine that the context of the UE is in other NG-RAN. For example, the fifth NG-RAN may check whether the identifier associated with the UE is in its memory. If the identifier associated with the UE is not within its memory, the fifth NG-RAN may determine that the context of the UE is in other NG-RAN. Based on the determination that the context of the UE is in other NG-RAN, the fifth NG-RAN may send a fifth Xn request message (e.g., Retrieve UE context request) to the first NG-RAN which holds the context of the UE. The fifth Xn request message (e.g., Retrieve UE context request) may comprise at least one of the fifth RRC resume request, RRC resume cause, MBS capability indicator, new cell identifier and/or the like. For example, the fifth RRC resume request may be the message received by the fifth NG-RAN from the UE. For example, the RRC resume cause may be a cause value associated with the MBS of the fifth RRC resume request. For example, the new cell identifier may indicate the fifth cell from which the fifth NG-RAN receives the fifth RRC resume request from the UE. If the fifth NG-RAN does not support MBS and/or MBS for RRC inactive state, the fifth Xn request message (e.g., Retrieve UE context request) may not comprise the MBS capability indicator indicating at least one of:

information that the fifth NG-RAN supports MBS;
   information that the fifth NG-RAN supports MBS for RRC inactive state;
   information of list of one or more MBS sessions supported by the fifth NG-RAN.

In an example, the first NG-RAN may receive from the fifth NG-RAN, the fifth Xn request message (e.g., Retrieve UE context request). Based on the fifth Xn request message (e.g., Retrieve UE context request), the first NG-RAN may determine whether the first NG-RAN needs to relocate the context of the UE. For example, based on the fifth RRC resume request, the context of the UE, and/or the RRC resume cause, the first NG-RAN may determine that the UE is located in the fifth NG-RAN (or fourth cell) which does not support MBS and/or which supports MBS for RRC inactive state. For example, based on that the fifth Xn request message does not indicate that the fifth NG-RAN supports MBS and/or MBS for RRC inactive state, the first NG-RAN may determine that the UE is located in the fifth NG-RAN (or fourth cell) which does not support MBS and/or which does not support MBS for RRC inactive state.

Based on the determination that the UE is in the fifth NG-RAN which does not support MBS and/or MBS for RRC inactive, the first NG-RAN may determine to relocate the context of the UE, and/or may send a fifth Xn response message (e.g., Retrieve UE context response). For example, the fifth Xn response message may comprise the context of the UE. Based on the fifth Xn response message, the fifth NG-RAN may send the path switch request to the AMF. In an example, the AMF may receive the path switch request from the fifth NG-RAN. Based on the path switch request, the AMF may initiate a procedure to set up resource for the UE and/or to deliver one or more packets of the MBS session. To set up resource for the UE and/or to deliver one or more packets of the MBS session, the example depicted in FIG. 20 may apply.

Figure 24:
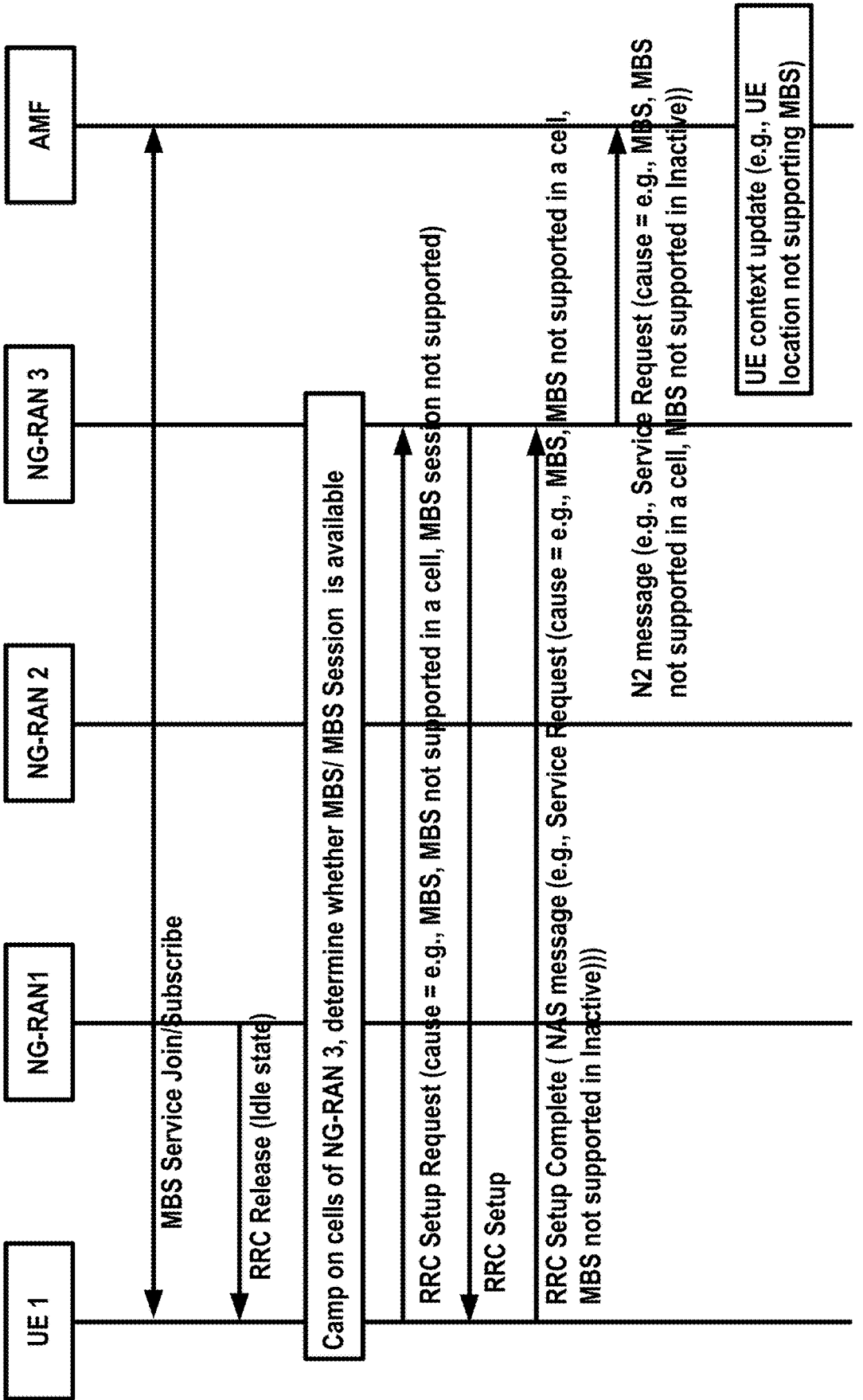
FIG. 24 is an example diagram of an aspect of an embodiment of the present disclosure.

FIG. 24 depicts one example embodiment of the present disclosure. In an example, a UE may join an MBS session, and may transit to RRC idle state. The UE may move into area of a third NG-RAN (NG-RAN 3) which may not support MBS. The UE may send RRC setup request to inform that the UE (UE 1) is in a coverage area of the third NG-RAN which may not support MBS.

In an example, the first NG-RAN has an RRC connection with the UE. For example, the UE may use the RRC connection to join the MBS session which the UE is interested in receiving. By joining the MBS session, the UE may get authorization to receive one or more packets of the MBS session.

In an example, the first NG-RAN may determine to transition the UE into RRC idle state. For example, to reduce power consumption of the UE, the first NG-RAN may determine to move the UE into RRC idle state. To move the UE into RRC idle state, the first NG-RAN may send an RRC Release message to the UE. The RRC Release message may comprise an indication to move into RRC idle state.

In an example, the UE may receive the RRC Release message sent by the first NG-RAN. Based on the received RRC Release message, the UE may transition into RRC idle state.

In an example, the UE may move into coverage of the third NG-RAN and/or the UE may camp on a third cell of the third NG-RAN. For example, the third NG-RAN may manage the third cell. The third cell and/or the third NG-RAN may not support MBS, and/or may not support the MBS session. That the third NG-RAN does not support MBS may be that the third NG-RAN may not support functionalities (e.g., using group RNTI for MBS, using PTM bearer, using multicast radio bearer, using MBS context, shared MBS traffic delivery, and/or the like) of MBS.

In an example, the UE may receive one or more third RRC messages from the third cell. The one or more third RRC messages may be one or more third SIBs, one or more third multicast control channel (MCCH) messages, and/or the like. The one or more third RRC messages may be sent via BCH, MCCH, and/or the like. Based on the received one or more third RRC messages, the UE may determine whether the MBS session is configured in the third cell. To determine whether the MBS session is configured in the third cell may be to determine whether MBS is configured in the third cell. For example, the UE may determine whether the MBS session is configured in the third cell, based on at least one of following:

whether the one or more third RRC messages comprise one or more information associated with MBS. For example, the one or more information associated with MBS may comprise at least one of a SIB for MBS, a SIB comprising information of MCCH, information of one or more RNTIs allocated for MBS, an indication of whether MBS is supported, and/or the like.

whether the one or more third RRC messages comprise one or more information associated with the MBS session. For example, the one or more information associated with the MBS session may be one or more identifiers of the MBS session.

For example, if the one or more third RRC messages comprise the one or more information associated with MBS, if the one or more third RRC messages comprise one or more information associated with the MBS session, if the UE receives the one or more third RRC messages comprising the one or more information associated with MBS, and/or if the UE receives the one or more third RRC messages comprising the one or more information associated with the MBS session, the UE may determine that the MBS session is configured in the third cell. For example, if the one or more third RRC messages do not comprise the one or more information associated with MBS, if the one or more third RRC message do not comprise the one or more information associated with the MBS session, if the UE does not receive the one or more third RRC messages comprising the one or more information associated with MBS, and/or if the UE does not receive the one or more third RRC messages comprising the one or more information associated with the MBS session, the UE may determine that the MBS session is not configured in the third cell.

In an example, the third NG-RAN may not support MBS, and/or the MBS session. For example, the third NG-RAN may not send one or more third RRC messages comprising at least one of the one or more information associated with MBS and/or may send one or more third RRC messages not comprising the one or more information associated with the MBS. For example, the third NG-RAN may not send one or more third RRC messages comprising one of the one or more information associated with MBS session and/or may send one or more third RRC messages not comprising the one or more information associated with the MBS session.

In an example, the UE may not receive the one or more third RRC messages sent by the third NG-RAN, the UE may receive the one or more third RRC messages not comprising the one or more information associated with MBS session and/or the UE may receive the one or more third RRC messages not comprising the one or more information associated with MBS. Based on not receiving the one or more third RRC messages, based on the one or more third RRC messages not comprising the one or more information associated with MBS session, and/or based on the one or more third RRC messages not comprising the one or more information associated with MBS, the UE may determine that the MBS session is not configured in the third NG-RAN and/or in the third cell. Based on the determination that the MBS session is not configured in the third NG-RAN (or the third cell), the UE may determine to send an RRC setup request.

In an example, the UE may send the RRC setup request to the third NG-RAN. Based on the MBS session not configured in the NG-RAN (or the third cell), the UE may send an indication that the RRC setup request is associated with the MBS. For example, the RRC setup request may comprise at least one of:

an identifier associated with the UE: This may indicate an identity of the UE. For example, the identifier associated with the UE may comprise at least one of radio network temporary identifier (RNTI), cell RNTI (C-RNTI), subscription concealed identifier (SUCI), and subscription permanent identifier (SUPI).

the indication that the RRC setup request is associated with the MBS: This may comprise at least one of a cause value associated with the MBS. For example, the cause value associated with the MBS may indicate at least one of that the RRC setup request is associated with MBS, that the UE is in the cell which does not support MBS, that the cell does not configure the MBS session, that the cell does not configure the MBS, that the UEs does not receive information associated with MBS from the cell, that the UE requests the MBS service, and/or the like.

In an example, the third NG-RAN may receive the RRC setup request from the UE. In response to the RRC setup request, the third NG-RAN may send RRC setup to the UE.

In an example, the UE may receive the RRC setup from the third NG-RAN. In response to the RRC setup from the third NG-RAN, the UE may send RRC setup complete to the third NG-RAN. The RRC setup complete may comprise a NAS request message. For example, the NAS request message may be a service request, a registration request, PDU session establish request, PDU session modification request, and/or the like. For example, the NAS request message may comprise at least one of:

an identifier of the UE.

an indication that the NAS request message is associated with the MBS: This may comprise at least one of a cause value associated with the MBS and/or the identifier of the MBS service. For example, the cause value associated with the MBS may indicate at least one of that the NAS request message is associated with MBS, that the UE is in the cell which does not support MBS, that the UE is in the cell which does not support MBS for RRC inactive state, that the cell does not configure the MBS service, that the UEs does not receive information associated with MBS from the cell, that the cell does not configure the MBS, that the UEs does not receive information associated with MBS service from the cell, that individual MBS traffic delivery is required for the UE, that the UE requests the MBS service, and/or the like.

an identifier of the MBS session.

In an example, the third NG-RAN may receive the RRC setup complete from the UE. In response to receiving the RRC setup complete, the third NG-RAN may send a N2 request message (e.g., Initial UE message) to the AMF. For example, the N2 request message may comprise at least one of the NAS request message received from the UE, and/or information of the third NG-RAN. For example, the information of the third NG-RAN may comprise information of whether the N2 request message is associated with MBS and/or whether the third NG-RAN supports MBS and/or MBS for RRC inactive state.

In an example, the AMF may receive the N2 request message from the third NG-RAN. For example, based on the N2 request message from the third NG-RAN, the AMF may determine that individual MBS traffic delivery is required for UE. For example, the AMF may send a Nsmf service request to a SMF. The Nsmf service request may indicate to the SMF that the UE is in the third NG-RAN (or the third cell) which does not support MBS and/or MBS service. This may assist for SMF to determine whether to initiate a procedure to configure individual MBS traffic delivery for the UE. For example, the example of FIG. 20 may be used.

Figure 25:
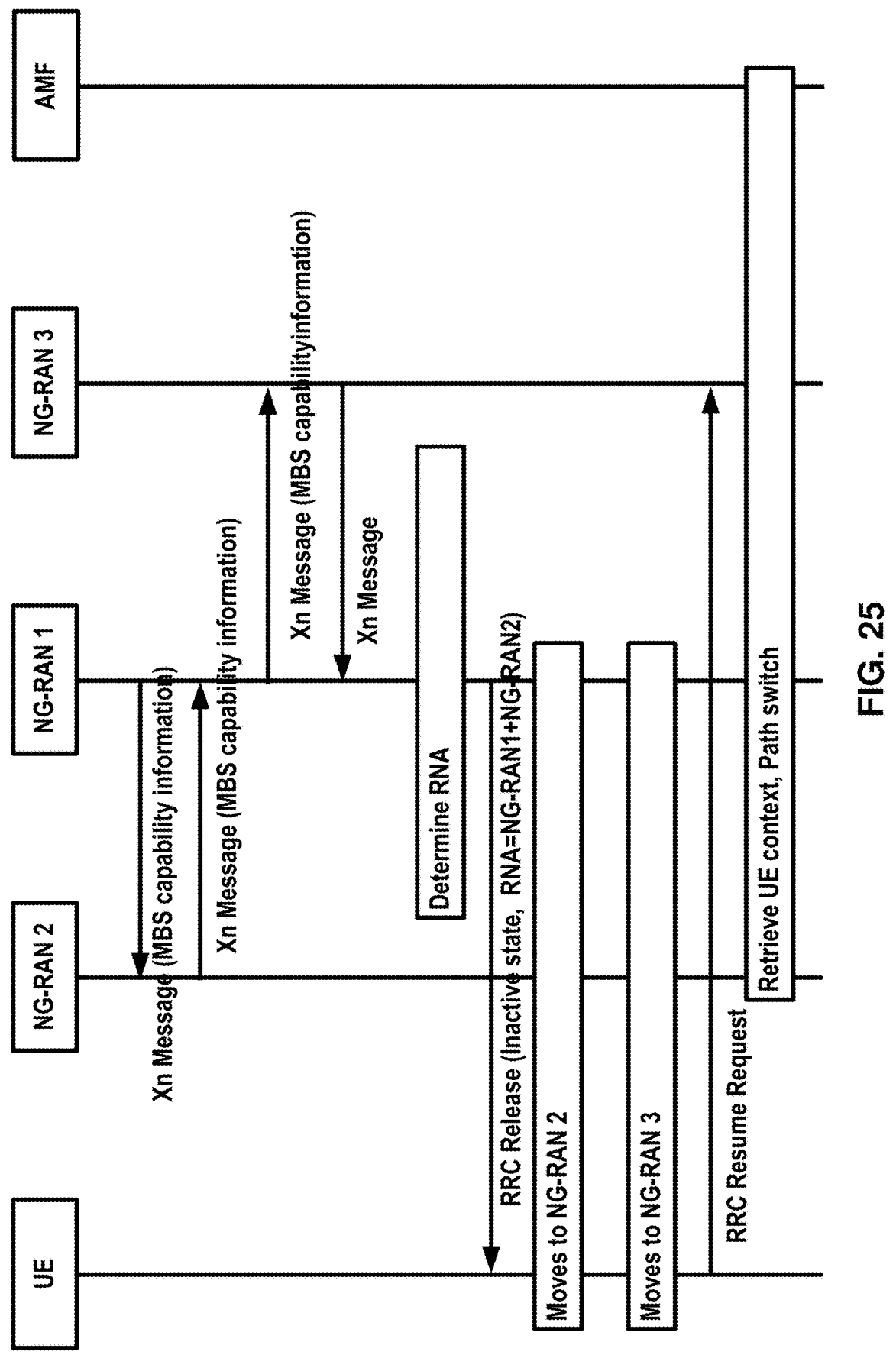
FIG. 25 is an example diagram of an aspect of an embodiment of the present disclosure.

FIG. 25 depicts one example embodiment of the present disclosure. In an example, a second NG-RAN (NG-RAN 2) may send to a first NG-RAN (NG-RAN 1), information of whether the second NG-RAN supports MBS and/or MBS for RRC inactive. Based on the information, the first NG-RAN may configure an RNA for a UE. This may assist the first NG-RAN to configure the RAN with one or more NG-RANs supporting MBS for RRC inactive state.

In an example, the first NG-RAN may send a first Xn request (e.g., Xn setup request) to the second NG-RAN. The first Xn request may comprise a first MBS capability information. For example, the first MBS capability information may comprise at least one of:

whether the first NG-RAN supports MBS.

whether the first NG-RAN supports MBS for RRC inactive state.

information of one or more MBS sessions supported by the first NG-RAN.

information of one or more MBS service areas of the first NG-RAN.

For example, based on the fact that the first NG-RAN supports MBS for RRC inactive state, the first MBS capability information may indicate that the first NG-RAN supports MBS for RRC inactive state.

In an example, the second NG-RAN may receive the first Xn request. In response to receiving the first Xn request, the second NG-RAN may send a first Xn response (e.g., Xn setup response) to the first NG-RAN. For example, the first Xn response may comprise a second MBS capability information. For example, the second MBS capability information may indicate that the second NG-RAN supports MBS for RRC inactive state.

In an example, the first NG-RAN may receive the first Xn response from the second NG-RAN. Based on the first Xn response, the first NG-RAN may determine that the second NG-RAN supports MBS and/or MBS for RRC inactive state.

In an example, the first NG-RAN may send a second Xn request (e.g., Xn setup request) to a third NG-RAN (NG-RAN 3). The second Xn request may comprise the first MBS capability information.

In an example, the third NG-RAN may receive the second Xn request. In response to receiving the second Xn request, the third NG-RAN may send a second Xn response (e.g., Xn setup response) to the first NG-RAN. For example, because the third NG-RAN does not support MBS and/or because the third NG-RAN does not support MBS for RRC inactive state, the second Xn response may not comprise a third MBS capability information. For example, because the third NG-RAN does not support MBS and/or because the third NG-RAN does not support MBS for RRC inactive state, the second Xn response may not comprise the third MBS capability information. For example, the third MBS capability information may indicate that the third NG-RAN does not support MBS for RRC inactive state.

In an example, the first NG-RAN may receive the second Xn response from the second NG-RAN. Based on the second Xn response, the first NG-RAN may determine that the third NG-RAN does not support MBS and/or MBS for RRC inactive state.

In an example, the first NG-RAN may determine to transition the UE into RRC inactive state. For example, to reduce power consumption of the UE, the first NG-RAN may determine to move the UE into RRC inactive state. To move the UE into RRC inactive state, the first NG-RAN may send an RRC Release message to the UE. The RRC Release message may comprise an indication to move into RRC Inactive state. The RRC Release message may comprise information of a RAN notification area (RNA). For example, the information of RNA may comprise at least one of information of one or more cells, information of one or more tracking areas, information of one or more RAN area codes. To determine the RNA for the UE, the first NG-RAN may use one or more MBS capability information from neighboring NG-RANs. For example, based on that the UE subscribes to the MBS session, based on that the second NG-RAN supports the MBS session, and/or based on that the second NG-RAN supports MBS for RRC inactive state, the first NG-RAN may determine to add the area of the second NG-RAN in the RNA. For example, based on the fact that the UE subscribes to the MBS session, and/or based on that the third NG-RAN does not support MBS for RRC inactive state, the first NG-RAN may determine not to add the area of the third NG-RAN in the RNA. Based on that the second NG-RAN supports MBS, and/or based on that the third NG-RAN does not support MBS, the RNA may comprise the area of the second NG-RAN, and/or may not comprise the area of the third NG-RAN.

In an example, the UE may receive the RRC Release message sent by the first NG-RAN. Based on the received RRC Release message, the UE may transition into RRC inactive state.

In an example, the UE may move into coverage of the second NG-RAN and/or the UE may camp on a second cell of the second NG-RAN. Based on that the second cell (second NG-RAN) is in the RNA, the UE may determine not to send RRC resume request to the second cell (second NG-RAN).

In an example, the UE may move into coverage of the third NG-RAN and/or the UE may camp on a third cell of the third NG-RAN. Based on that the third cell (third NG-RAN) is not in the RNA, the UE may determine to send RRC resume request to the third cell (third NG-RAN).

In an example, the third NG-RAN may receive the RRC resume request. Based on the RRC resume request, the third NG-RAN may retrieve the context of the UE from the first NG-RAN, may send the path switch request to the AMF, to provide individual MBS traffic delivery for the UE.

Figure 26:
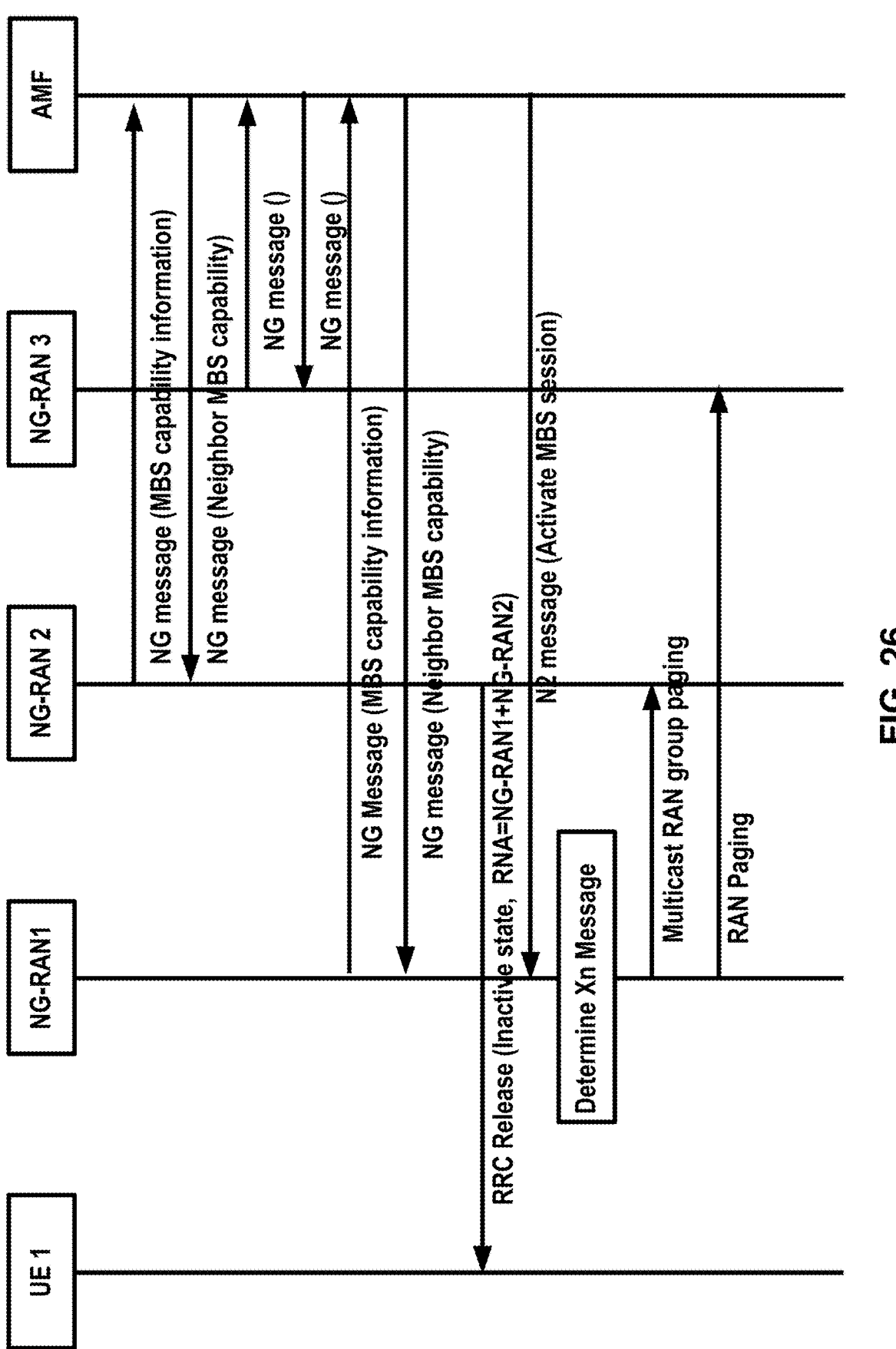
FIG. 26 is an example diagram of an aspect of an embodiment of the present disclosure.

FIG. 26 depicts one example embodiment of the present disclosure. In an example, a second NG-RAN (NG-RAN 2) may send to an AMF, information of whether the second NG-RAN supports MBS and/or MBS for RRC inactive. A first NG-RAN (NG-RAN 1) may receive from the AMF, information of whether the second NG-RAN supports MBS and/or MBS for RRC inactive. Based on the information, the first NG-RAN may configure an RNA for a UE. This may assist the first NG-RAN to configure the RAN with one or more NG-RANs supporting MBS for RRC inactive state.

In an example, the second NG-RAN may send a second NG request (e.g., NG setup request) to the AMF. The second NG request may comprise a second MBS capability information. For example, the second MBS capability information may comprise at least one of:

whether the second NG-RAN supports MBS.

whether the second NG-RAN supports MBS for RRC inactive state.

information of one or more MBS sessions supported by the second NG-RAN.

information of one or more MBS service areas of the second NG-RAN.

For example, based on the fact that the second NG-RAN supports MBS for RRC inactive state, the second MBS capability information may indicate that the second NG-RAN supports MBS for RRC inactive state.

In an example, the AMF may receive the second NG request. In response to receiving the second NG request, the AMF may send a second NG response (e.g., NG setup response) to the second NG-RAN. For example, the second NG response may comprise a second Neighbor MBS capability information. For example, the second Neighbor MBS capability information may indicate whether one or more NG-RANs support MBS and/or MBS for RRC inactive state.

In an example, the second NG-RAN may receive the second NG response from the AMF.

In an example, the third NG-RAN may send a third NG request (e.g., NG setup request) to the AMF. Because the third NG-RAN does not support MBS and/or MBS for RRC inactive state, the third NG request may not comprise a third MBS capability information.

In an example, the AMF may receive the third NG request. In response to receiving the second NG request, the AMF may send a third NG response (e.g., NG setup response) to the third NG-RAN. For example, because the third NG request does not comprise the third MBS capability information, the third NG response may not comprise a third Neighbor MBS capability information.

In an example, the third NG-RAN may receive the third NG response from the AMF.

In an example, the first NG-RAN may send a first NG request (e.g., NG setup request) to the AMF. The first NG request may comprise a first MBS capability information. For example, the first MBS capability information may indicate at least one of:

whether the first NG-RAN supports MBS.

whether the first NG-RAN supports MBS for RRC inactive state.

information of one or more MBS sessions supported by the first NG-RAN.

information of one or more MBS service areas of the first NG-RAN.

For example, based on the fact that the first NG-RAN supports MBS for RRC inactive state, the first MBS capability information may indicate that the first NG-RAN supports MBS for RRC inactive state.

In an example, the AMF may receive the first NG request. In response to receiving the first NG request, the AMF may send a first NG response (e.g., NG setup response) to the second NG-RAN. The first NG response may comprise a first Neighbor MBS capability information. For example, the first Neighbor MBS capability information may indicate whether one or more NG-RANs support MBS and/or MBS for RRC inactive state. For example, the first Neighbor MBS capability information may indicate that the second NG-RAN supports MBS and/or MBS for RRC inactive state. For example, the first Neighbor MBS capability information may indicate that the third NG-RAN does not support MBS and/or MBS for RRC inactive state.

In an example, the first NG-RAN may receive the first NG response from the AMF.

In an example, the first NG-RAN may determine to transition the UE into RRC inactive state. For example, to reduce power consumption of the UE, the first NG-RAN may determine to move the UE into RRC inactive state. To move the UE into RRC inactive state, the first NG-RAN may send an RRC Release message to the UE. The RRC Release message may comprise an indication to move into RRC Inactive state. The RRC Release message may comprise information of a RAN notification area (RNA). For example, the information of RNA may comprise at least one of information of one or more cells, information of one or more tracking areas, information of one or more RAN area codes. To determine the RNA for the UE, the first NG-RAN may use the first Neighbor MBS capability information received from the AMF. For example, based on that the UE subscribes to the MBS session, based on that the second NG-RAN supports the MBS session, and/or based on that the second NG-RAN supports MBS for RRC inactive state, the first NG-RAN may determine to add the area of the second NG-RAN in the RNA. For example, based on the fact that the UE subscribes to the MBS session, and/or based on that the third NG-RAN does not support MBS for RRC inactive state, the first NG-RAN may determine not to add the area of the third NG-RAN in the RNA. Based on that the second NG-RAN supports MBS, and/or based on that the third NG-RAN does not support MBS, the RNA may comprise the area of the second NG-RAN, and/or may not comprise the area of the third NG-RAN.

In an example, the UE may receive the RRC Release message sent by the first NG-RAN. Based on the received RRC Release message, the UE may transition into RRC inactive state.

In an example, when the MBS session starts, the AMF may send a N2 message to the first NG-RAN. For example, the N2 message may request that the first NG-RAN activates the MBS session. The first NG-RAN may determine one or more UEs which subscribe to the MBS session. For example, the first NG-RAN may determine that the UE subscribes to the MBS session and/or that the UE is in the RRC inactive state. Based on the determination, the first NG-RAN may determine to notify the activation of the MBS session. Based on the fact that the second NG-RAN supports MBS and/or MBS for RRC inactive state, the first NG-RAN may send multicast RAN group paging to the second NG-RAN. The multicast RAN group paging may comprise the identifier of the MBS session. Based on the fact that the third NG-RAN does not support MBS and/or MBS for RRC inactive state, the first NG-RAN may send RAN paging request to the third NG-RAN. The RAN paging request may comprise the identifier of the UE.

In another example, when the MBS session starts, the AMF may send the N2 message to the first NG-RAN. For example, the N2 message may further comprise activation requirement for the MBS session. For example, the activation requirement may comprise at least one of information of whether paging of the UE in the RRC inactive state can be skipped, information of maximum allowed delay, information of urgency, information of whether RRC inactive state is allowed for the MBS session. For example, if the information of whether paging of the UE in the RRC inactive state can be skipped is set to allowed, the first NG-RAN may not initiate a paging procedure to bring the UE into RRC connected state. For example, when the first NG-RAN performs the paging procedure to bring the UE into RRC connected state, if the UE does not transit into RRC connected state until the time period of the maximum allowed delay elapses, the first NG-RAN may abort the paging procedure. For example, if information of urgency is set to not urgent, the first NG-RAN may initiate a paging procedure to bring the UE into RRC connected state. For example, if the information of whether RRC inactive state is allowed is set to allowed, the first NG-RAN may not initiate a paging procedure to bring the UE into RRC connected state. This may help for the first NG-RAN to determine whether to page the UE or not, whether to bring the UE into RRC connected state or not, reducing resource congestion.

Figure 27:
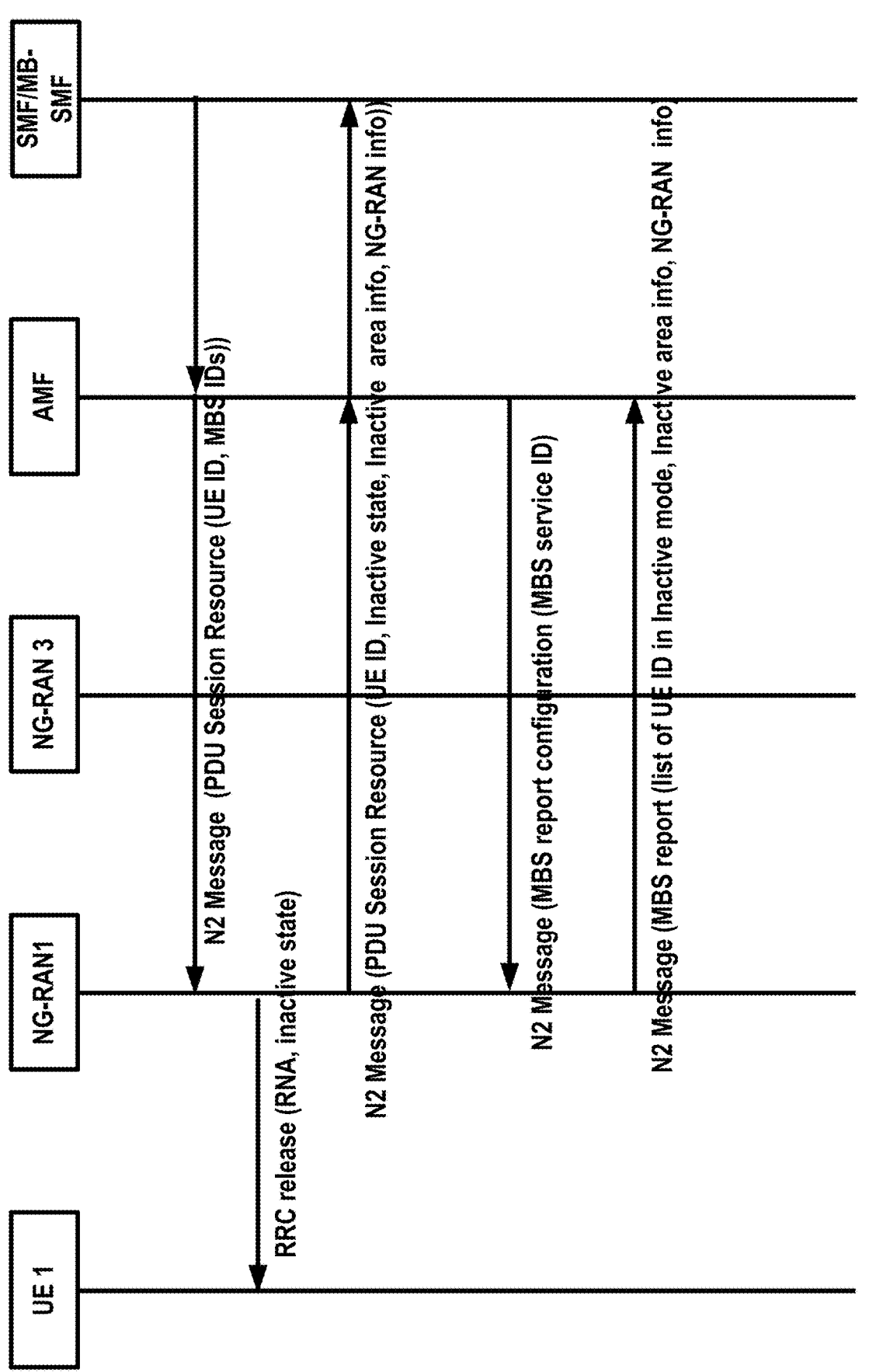
FIG. 27 is an example diagram of an aspect of an embodiment of the present disclosure.

FIG. 27 depicts one example embodiment of the present disclosure. In an example, a NG-RAN may send to an AMF, information of one or more UEs in the RRC inactive state. This may assist one or more core network node to reserve resource required to set up individual MBS traffic delivery. For example, reserving resources for the MBS session may help to provide reliable services, when the MBS session start, if there are lots of UEs located in one or more NG-RANs not supporting MBS.

In an example, a first NG-RAN (NG-RAN 1) may have a RRC connection with a UE. For example, the UE may use the RRC connection to join an MBS session for which the UE is interested in receiving. For example, for the UE, the first NG-RAN may receive an N2 message (e.g., PDU Session Resource Setup Request) from an AMF. The N2 message (e.g., PDU Session Resource Setup Request) may comprise at least one of:

Identifier of the UE: This may indicate the UE. For example, this may comprise at least one of AMF UE NGAP ID, RAN UE NGAP ID.

Identifier of a PDU session: This may indicate the PDU session associated with the N2 message. For example, this may comprise PDU Session ID.

Identifier of a network slice: This may indicate a network slice associated with the PDU session. For example, this may comprise S-NSSAI.

Identifier of MBS session: This may indicate one or more MBS sessions for which the PDU session is associated. For example, this may comprise MBS Session Setup Request List or MBS Session ID.

Authorization of Inactive state for the MBS session: This may indicate whether the UE is allowed to receive the MBS session in the RRC Inactive state.

Capability of UE for MBS for Inactive state: This may indicate whether the UE can receive the MBS session in the RRC Inactive state. For example, when a cell supports the MBS session for RRC Inactive state and when the UE is not capable of receiving the MBS session in the RRC Inactive state, the NG-RAN needs to perform paging to bring the UE into RRC Connected state.

For example, based on the N2 message (e.g., PDU Session Resource Setup Request), the first NG-RAN may identify one or more MBS session for which the UE joins or subscribes.

In an example, the first NG-RAN may determine to transit the UE into RRC Inactive state. For example, to reduce power consumption for the UE, the first NG-RAN may determine to move the UE into RRC Inactive state. To move the UE into RRC Inactive state, the first NG-RAN may send RRC Release message to the UE. The RRC Release message may comprise at least one of indication to move into RRC Inactive state, information of RAN notification area (RNA). For example, the information of RNA may comprise at least one of information of one or more cells, information of one or more tracking areas, information of one or more RAN area codes. For example, the RNA may comprise one or more areas of the first NG-RAN, a second NG-RAN (NG-RAN 2), and/or a third NG-RAN (NG-RAN 3)

In an example, the UE may receive the RRC Release message sent by the first NG-RAN. Based on the received RRC Release message, the UE may transit into RRC Inactive state.

In an example, based on the fact that the UE is in the RRC inactive state, the first NG-RAN may send a N2 message (e.g., PDU session resource update) to the AMF. For example, the N2 message (e.g., PDU session resource update) may comprise at least one of:

the identifier of the UE.

indication that the UE is in the RRC inactive state.

information of the RNA: This may indicate one or more TAs, one or more NG-RAN associated with the RNA of the UE.

In an example, the AMF may receive the N2 message (e.g., PDU session resource update, and/or the like) from the first NG-RAN. For example, based on the N2 message, the AMF may send a Nsmf message to a SMF associated with the MBS session. For example, based on the N2 message, the AMF may send a Nmbsmf message to a MB-SMF associated with the MBS session. For example, the Nsmf message and/or the Nmbsmf message may comprise at least one of the indication that the UE is in the RRC inactive state, and/or information of the RNA of the UE. Based on the Nsmf message and/or the Nmbsmf message, the SMF and/or the MB-SMF may reserve resources for the UE and/or for the MBS session. For example, the SMF and/or the MB-SMF may reserve memory resource, bandwidth resource for the UE.

In an example, to determine how many UEs subscribing to the MBS session are in the RRC inactive state, a core network node (e.g., AMF, SMF, MB-SMF) may send a N2 request (MBS report configuration) the first NG-RAN. For example, the N2 request (MBS report configuration) may comprise MBS report configuration. The MBS report configuration may comprise the identifier of the MBS session.

In an example, the first NG-RAN may receive the N2 request (MBS report configuration). In response to the N2 request (MBS report configuration), the first NG-RAN may send a N2 response (MBS report). The N2 response (MBS report) may comprise at least one of:

one or more identifier of one or more UEs (subscribing to the MBS session) in the RRC inactive mode.

information of one or more RNAs for the one or more UEs.

information of one or more NG-RANs for the one or more RNAs.

Figure 28:
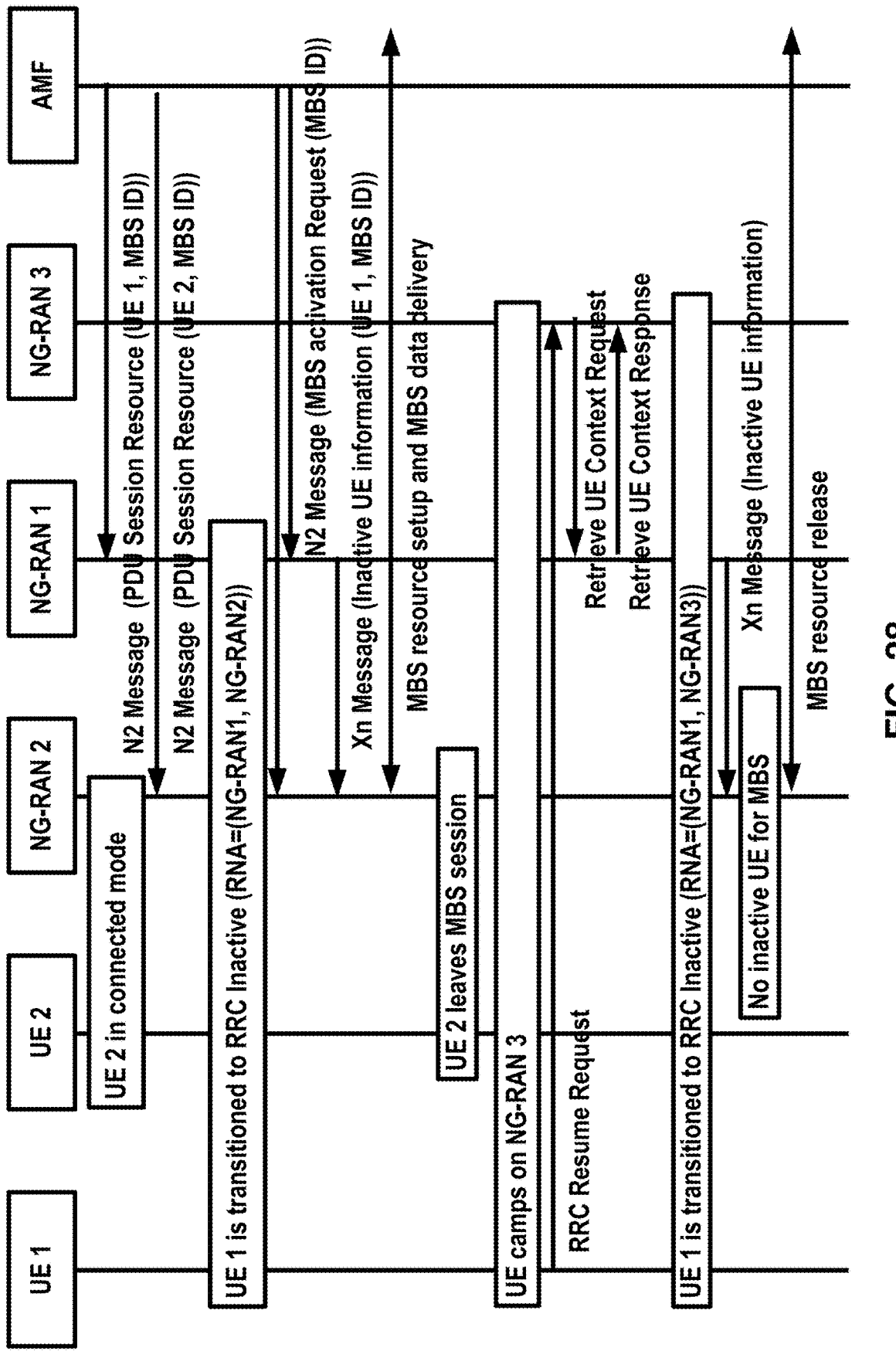
FIG. 28 is an example diagram of an aspect of an embodiment of the present disclosure.

FIG. 28 depicts one example embodiment of the present disclosure. In an example, a first NG-RAN may send to a second NG-RAN, information of one or more UEs in the RRC inactive state. This may assist the second NG-RAN to reserve resource required to set up individual MBS traffic delivery, and/or to determine whether to provide the MBS service for RRC inactive state.

In an example, the first NG-RAN (NG-RAN 1) may have a first RRC connection with a first UE and/or the second NG-RAN (NG-RAN 2) may have a second RRC connection with the second UE.

For example, the first UE may use the first RRC connection to join an MBS session for which the first UE is interested in receiving. For example, for the first UE, the first NG-RAN may receive a first N2 message (e.g., PDU Session Resource Setup Request) from an AMF. The first N2 messages (e.g., PDU Session Resource Setup Request) may comprise at least one of:

Identifier of the first UE: This may indicate the first UE associated with the first N2 message. For example, this may comprise at least one of AMF UE NGAP ID, RAN UE NGAP ID.

Identifier of a PDU session: This may indicate the PDU session associated with the first N2 message. For example, this may comprise PDU Session ID.

Identifier of a network slice: This may indicate a network slice associated with the PDU session. For example, this may comprise S-NSSAI.

Identifier of MBS session: This may indicate one or more MBS sessions for which the PDU session is associated. For example, this may comprise MBS Session Setup Request List or MBS Session ID.

Authorization of Inactive state for the MBS session: This may indicate whether the UE is allowed to receive the MBS session in the RRC Inactive state.

Capability of UE for MBS for Inactive state: This may indicate whether the UE can receive the MBS session in the RRC Inactive state. For example, when a cell supports the MBS session for RRC Inactive state and when the UE is not capable of receiving the MBS session in the RRC Inactive state, the NG-RAN needs to perform paging to bring the UE into RRC Connected state.

For example, based on the first N2 messages (e.g., PDU Session Resource Setup Request), the first NG-RAN may identify one or more MBS session for which the first UE joins and/or subscribes.

For example, the second UE may use the second RRC connection to join the MBS session for which second first UE is interested in receiving. The second UE may be in the RRC connected state. For example, for the second UE, the second NG-RAN may receive a second N2 message (e.g., PDU Session Resource Setup Request) from an AMF. The second N2 messages (e.g., PDU Session Resource Setup Request) may comprise at least one of:

Identifier of the second UE: This may indicate the first UE associated with the first N2 message. For example, this may comprise at least one of AMF UE NGAP ID, RAN UE NGAP ID.

Identifier of a PDU session: This may indicate the PDU session associated with the second N2 message. For example, this may comprise PDU Session ID.

Identifier of a network slice: This may indicate a network slice associated with the PDU session. For example, this may comprise S-NSSAI.

Identifier of MBS session: This may indicate one or more MBS sessions for which the PDU session is associated. For example, this may comprise MBS Session Setup Request List or MBS Session ID.

Authorization of Inactive state for the MBS session: This may indicate whether the UE is allowed to receive the MBS session in the RRC Inactive state.

Capability of UE for MBS for Inactive state: This may indicate whether the UE can receive the MBS session in the RRC Inactive state. For example, when a cell supports the MBS session for RRC Inactive state and when the UE is not capable of receiving the MBS session in the RRC Inactive state, the NG-RAN needs to perform paging to bring the UE into RRC Connected state.

For example, based on the second N2 messages (e.g., PDU Session Resource Setup Request), the second NG-RAN may identify one or more MBS session for which the second UE joins and/or subscribes.

In an example, the first NG-RAN may determine to transit the first UE into RRC Inactive state. For example, to reduce power consumption for the first UEs, the first NG-RAN may determine to move the first UE into RRC Inactive state. To move the first UE into RRC Inactive state, the first NG-RAN may send an RRC Release message to the first UE. The RRC Release messages may comprise at least one of indication to move into RRC Inactive state, information of RAN notification area (RNA). For example, the information of RNA may comprise at least one of information of one or more cells, information of one or more tracking areas, information of one or more RAN area codes. For example, the RNA may comprise one or more areas of the first NG-RAN, a second NG-RAN (NG-RAN 2), and/or a third NG-RAN (NG-RAN 3)

In an example, the first UE may receive the RRC Release message sent by the first NG-RAN. Based on the received RRC Release message, the first UE may transit into RRC Inactive state.

In an example, the AMF may send one or more N2 messages (e.g., Multicast Session Activation Request) message to one or more NG-RANs, to notify start of an MBS session. For example, when an application server for the MBS session requests activation of the MBS session and/or when a core network receives a data for the MBS session, the AMF may send the one or more N2 messages (e.g., Multicast Session Activation Request) to one or more NG-RANs. For example, the one or more NG-RANs may comprise the first NG-RAN and/or the second NG-RAN. The one or more NG-RANs may receive the one or more N2 messages (e.g., Multicast Session Activation Request) message sent by the AMF. For example, each of the one or more N2 message (e.g., Multicast Session Activation Request) message may comprise an identifier of the MBS session (e.g., MBS Session ID).

In an example, the first NG-RAN and/or the second NG-RAN may receive the one or more N2 messages (e.g., Multicast Session Activation Request). For the one or more N2 messages (e.g., Multicast Session Activation Request), the first NG-RAN may determine that the first UE subscribes to the MBS session associated with the one or more N2 messages, that the first UE is in the RRC inactive state, and/or that the second NG-RAN is in the RNA for the first UE. Based on the determination, the first NG-RAN may send a first Xn message to the second NG-RAN. For example, the first Xn message may be Inactive UE information, MBS Assistance information, and/or the like. The first Xn message may comprise at least one of information of inactive UEs, and/or identifier of the MBS session. For example, the first Xn message may indicate that the first UE is managed by the first NG-RAN, that the first UE is in the RRC inactive state, that the RNA for the first UE comprises the second NG-RAN, and/or that the number of inactive state UEs is increased.

In an example, the second NG-RAN may receive the first Xn message from the first NG-RAN. Based on the first Xn message, the second NG-RAN may determine that the first UE may be in the coverage of the second NG-RAN, that the first UE subscribes to the MBS session, and/or that the RNA of the first UE comprises an area of the second NG-RAN. Based on the determination, the second NG-RAN may configure resources for the MBS session, may configure resources for the MBS inactive state, and/or may start transmission of one or more packets of the MBS session for UEs in the RRC inactive state.

In an example, the second UE may not receive the MBS session. For example, the second UE may leave the MBS session, may not have interest in receiving the MBS session anymore.

In an example, the first UE may move into area of the third NG-RAN and/or may select a third cell of the third NG-RAN. The first UE may send a RRC resume request to the third NG-RAN. Based on the RRC resume request, the third NG-RAN may perform procedure to retrieve/relocate the context for the first UE from the first NG-RAN to the third NG-RAN. Based on that the context of the UE is relocated from the first NG-RAN to the third NG-RAN, based on that the first NG-RAN does not manage the first UE anymore, based on that the first UE subscribes to the MBS session, and/or that the RAN of the first UE comprises the second NG-RAN, the first NG-RAN may send a second Xn message to the second NG-RAN. For example, the second Xn message may be Inactive UE information, MBS Assistance information, and/or the like. The second Xn message may comprise at least one of information of inactive UEs, and/or identifier of the MBS session. For example, the second Xn message may indicate that the first UE is not managed by the first NG-RAN anymore, that the first UE is not in the RRC inactive state, that the RNA for the first UE does not comprise the second NG-RAN, and/or that the number of inactive state UEs is decreased.

In an example, the second NG-RAN may receive the second Xn message from the first NG-RAN. Based on the second Xn message, the second NG-RAN may determination that the first UE may be not in the coverage of the second NG-RAN, that the first UE subscribes to the MBS session, and/or that the RNA of the first UE does not comprise an area of the second NG-RAN. Based on the determination, the second NG-RAN may update the number of RRC inactive state UE under the coverage of the second NG-RAN. For example, based on the second Xn message, the second NG-RAN may decrease the number of the RRC inactive UE under the coverage of the second NG-RAN. For example, based on the second Xn message, the second NG-RAN may determine that there are no more RRC inactive state UEs under the coverage of the second NG-RAN. Based on the determination that there is no more RRC inactive state UEs under the coverage of the second NG-RAN, the second NG-RAN may release resources allocated for the MBS session and/or may release resources allocated to provide the MBS session for RRC inactive UEs.

Figure 29:
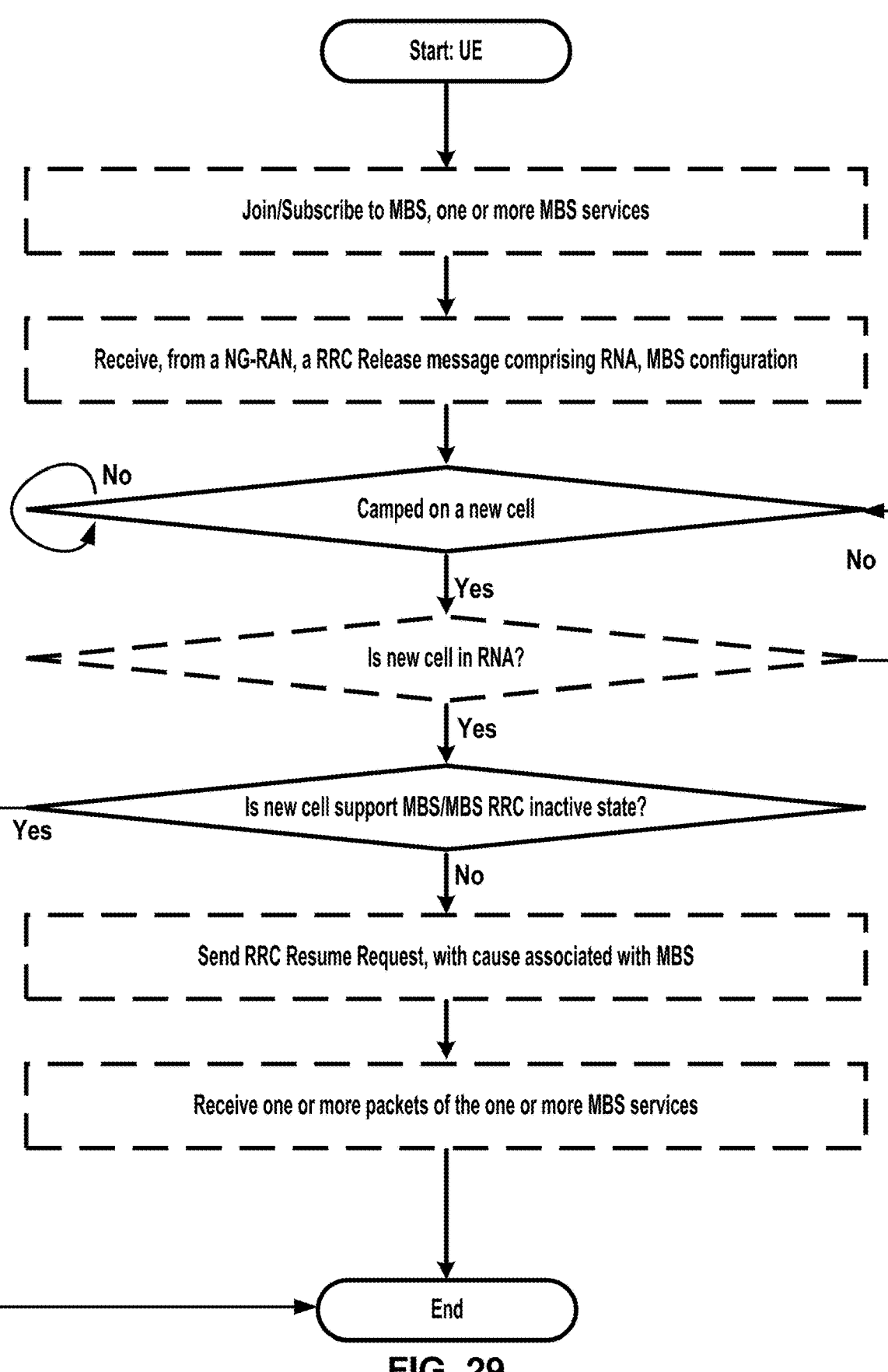
FIG. 29 is an example diagram of an aspect of an embodiment of the present disclosure.

FIG. 29 depicts one example embodiment of the present disclosure.

In an example, a UE may join to an MBS session. By joining to the MBS session, the UE may get authorization to receive one or more packets of the MBS session. In an example, the UE may subscribe to MBS. By subscribing to MBS, the network may allow to use functionalities of MBS to deliver one or more packets of the MBS session for the UE.

In an example, the UE may receive from a NG-RAN, an RRC release message. The RRC release message may comprise at least one of information of a RAN notification area (RNA), MBS configuration. For example, the information of RNA may comprise at least one of information of one or more cells, information of one or more tracking areas, information of one or more RAN area codes, and/or the like. For example, the MBS configuration may comprise an indication of whether the UE sends RRC resume request if the UE enters a cell not configured with the MBS session.

In an example, the UE may determine whether to select a new cell.

In an example, if the UE selects the new cell and/or camps on the new cell, the UE may determine whether the new cell belongs to the RNA. If the new cell belongs to the RNA, the UE may determine whether the new cell supports MBS and/or whether the new cell supports MBS for RRC inactive state. If the new cell does not support MBS and/or MBS for RRC inactive state, the UE may send RRC resume request to the new cell. For example, the RRC resume request may comprise an indication that the RRC resume request is associated with the MBS. For example, the indication that the RRC resume request is associated with the MBS may comprise at least one of a cause value associated with the MBS and/or the identifier of the MBS session. For example, the cause value associated with the MBS may indicate at least one of that the RRC resume request is associated with MBS, that the UE is in the cell which does not support MBS, that the UE is in the cell which does not support MBS for RRC inactive state, that the cell does not configure the MBS session, that the cell does not configure the MBS, that the UEs does not receive information associated with MBS from the cell, that context relocation is required for the UE, that the UE requests the MBS service, and/or the like.

In an example, in response to sending the RRC resume request, the UE may receive a message configuring one or more unicast bearers for MBS, and/or a message configuring resources for individual MBS traffic delivery. The UE may receive one or more packets for the MBS session, via the one or more unicast bearers for MBS, and/or the resources for individual MBS traffic delivery.

Figure 30:
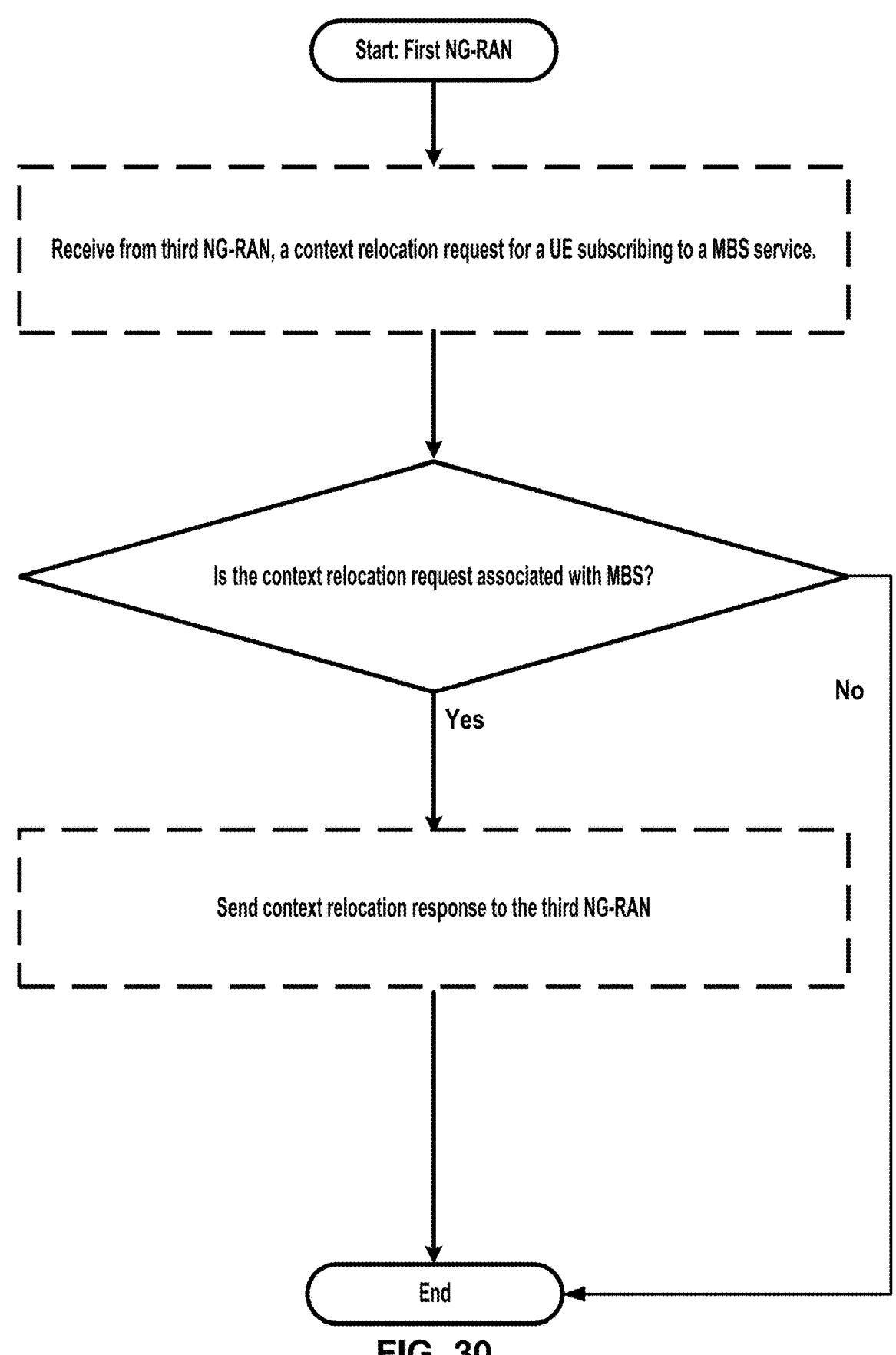
FIG. 30 is an example diagram of an aspect of an embodiment of the present disclosure.

FIG. 30 depicts one example embodiment of the present disclosure.

In an example, a first NG-RAN may receive a context relocation request for a UE, from a third NG-RAN. The UE may subscribe to MBS and/or may join an MBS session. For example, the third NG-RAN may receive a RRC resume request from the UE. The context relocation request may comprise at least one of the RRC resume request, RRC resume cause, MBS capability indicator, new cell identifier and/or the like. For example, the RRC resume request may be the message received by the third NG-RAN from the UE. For example, the RRC resume cause may be the cause value associated with the MBS of the RRC resume request. For example, the new cell identifier may indicate the cell from which the third NG-RAN receives the RRC resume request from the UE.

In an example, the first NG-RAN may determine whether the context relocation request is associated with MBS. For example, the first NG-RAN may determine that the context relocation request is associated with MBS, if the context relocation request comprises the cause value associated with MBS, if the third NG-RAN does not support MBS for RRC inactive state, and/or if the third NG-RAN does not support MBS. If the first NG-RAN determines that the context relocation is associated with MBS, the first NG-RAN may determine to relocate the context of the UE to the third NG-RAN. For example, the first NG-RAN may send to the third NG-RAN, a context relocation response. For example, the context relocation response may comprise one or more information associated with the context of the UE. In an example, a UE may join an MBS service.

In an example, the UE may receive from a first NG-RAN, an RRC release message indicating transition of the UE to an RRC inactive state. For example, the RRC release message may comprise at least one of redirected carrier information, and/or suspend configuration. For example, the suspend configuration may comprise at least one of an indication of transition of the UE to the RRC inactive state (e.g., full I-RNTI, short I-RNTI, RAN notification area (RNA) information, indication of RRC inactive state, and/or the like), and/or MBS configuration. For example, the MBS configuration may comprise at least one of RNA update configuration, and/or MBS support area information. For example, the RNA update configuration comprises at least one of information of whether to send RRC resume request if the UE determines that the MBS service is not configured in the cell, and/or information of whether MBS is allowed/authorized for RRC inactive state. For example, the MBS support area information may comprise at least one of information of one or more areas where MBS for RRC inactive state is supported, information of one or more cells where MBS for RRC inactive state is supported, and/or information of one or more tracking areas where MBS for RRC inactive state is supported.

In an example, the UE in the RRC inactive state, may camp on a cell of a third NG-RAN. For example, the cell may be in a service area of the MBS service.

In an example, the UE in the RRC inactive state, may determine whether the MBS service is configured in the cell. For example, the UE may determine whether the MBS service is configured in the cell or not, based on if the one or more conditions are met for the MBS service. For example, the one or more conditions may comprise at least one of that the cell does not support MBS, that the cell does not configure MBS, that the cell does not broadcast MBS configuration information via system information block, that the cell does not broadcast system information associated with MBS, that the cell does not broadcast information associated with MBS, that the cell does not configure multicast control channel (MCCH), that the cell does not send configuration information of the MCCH, that the cell does not send configuration information of MBS for RRC inactive state, that the cell does not send an indication that the cell supports MBS, that the cell does not send an indication that the cell supports MBS for RRC inactive state, and/or the like. For example, if the one or more conditions are not met, the UE may determine that the MBS service is configured in the cell. For example, if the one or more conditions are not met, the UE may determine that the cell supports MBS. For example, if the one or more conditions are met, the UE may determine that the MBS service is not configured in the cell. For example, if the one or more conditions are met, the UE may determine that the cell does not support MBS. For example, if the UE receives from the cell at least one of the indication that the cell supports MBS for RRC inactive state, and/or a configuration information of MBS for RRC inactive state, the UE may determine that the cell supports MBS for RRC inactive state. For example, if the UE does not receive from the cell, the indication that the cell supports MBS for RRC inactive state, and/or the configuration information of MBS for RRC inactive state, the UE may determine that the cell does not support MBS for RRC inactive state. That the cell does not support MBS for RRC inactive state may be that the MBS service is not configured in the cell.

In an example, based on determination that the MBS service is not configured in the cell, the UE may send to the third NG-RAN, a RRC resume request comprising an indication that the RRC resume request is associated with MBS. For example, the indication that the RRC resume request is associated with MBS may comprise at least one of a cause value associated with MBS, and/or an identifier of the MBS service. For example, the cause value associated with MBS may indicate at least one of that the RRC resume request is associated with MBS, that the UE is in the cell which does not support MBS, that the UE is in the cell which does not support MBS for RRC inactive state, that the cell does not configure the MBS service, that the UEs does not receive information associated with MBS from the cell, that the UEs does not receive information associated with MBS for RRC inactive state from the cell, that context relocation is required for the UE, that the UE requests the MBS service, and/or the like. For example, the RRC resume request may further comprise at least one of an identifier associated with the UE, and/or a message authentication code for integrity (MAC-I). For example, the identifier associated with the UE may comprise at least one of a radio network temporary identifier (RNTI), a cell RNTI (C-RNTI), an inactive RNTI (I-RNTI), a short I-RNTI, a subscription concealed identifier (SUCI), and/or a subscription permanent identifier (SUPI).

In other example, based on determination that the MBS service is configured in the cell, the UE may not send to the third NG-RAN, the RRC resume request comprising an indication that the RRC resume request is associated with MBS. In other example, if the cell supports MBS for RRC inactive state, the UE may not send the RRC resume request. In other example, if the RNA information comprises the cell and/or if the MBS service is not configured in the cell, the RRC resume request may comprise the indication that the RRC resume request is associated with MBS. In other example, if the RNA update configuration indicates that the UE sends the RRC resume request for MBS, and if the UE determines that the MBS service is not configured in the cell, the UE may send the RRC resume request. In another example, if the RNA update configuration indicates that the UE does not send the RRC resume request for MBS, and if the UE determines that the MBS service is not configured in the cell, the UE may not send the RRC resume request. In another example, when the UE determines that the MBS service is not configured in the cell, the UE sends the RRC resume request if one or more second conditions are met. For example, the one or more second conditions may comprise at least one of that the UE is in the RRC inactive state, that the UE is subscribed to the MBS service, and/or that the UE is interested in receiving the MBS service.

In an example, the UE may receive from the cell, a response to the RRC resume request. For example, the response to the RRC resume request may indicate the UE to transit into the RRC connected state. For example, the UE may move into the RRC connected state.

In an example, the UE may receive from the third base station, configuration parameters for one or more unicast bearers associated with the MBS service. For example, the response to the RRC resume request may comprise the configuration parameters (e.g., SDAP configuration, PDCP configuration, RLC configuration, MAC configuration, PHY configuration, PDU session information, and/or the like). For example, each of the one or more unicast bearers may comprise at least one of a bearer not shared with other UEs, a bearer used for individual MBS traffic delivery, a bearer established between the UE and a user plane function (UPF) for the UE, and/or a bearer using a packet data unit (PDU) session which is not shared with other UEs.

In an example, the UE in the RRC connected state may receive via the cell, one or more packets of the MBS service via the one or more unicast bearers.

In an example, a UE not in a RRC connected state may send to a NG-RAN, based on that an MBS service is not configured in a cell of the NG-RAN, a RRC request (e.g., RRC resume request, RRC setup request, and/or the like) requesting a RRC connection. The RRC request may comprise indication that the RRC request is associated with MBS. The UE may transit to RRC connected state. For example, the UE in the RRC connected state may receive via the cell, one or more packets of the MBS service via a unicast bearer. For example, the unicast bearer may be associated with individual MBS traffic delivery.

In an example, a first NG-RAN may send to a UE, a RRC release message indicating transition of the UE to an RRC inactive state. The first NG-RAN may receive from the UE, an RRC resume request comprising an indication that the RRC resume request is associated with MBS. The first NG-RAN may send to a third NG-RAN, based on the RRC resume request, a message relocating a context of the UE from the first NG-RAN to the third NG-RAN. In an example, a third NG-RAN may receive from a UE, a RRC resume request, comprising an indication that the RRC resume request is associated with MBS. The third NG-RAN may send to a first NG-RAN, a context relocation request comprising the RRC resume request. The third NG-RAN may receive from the first NG-RAN, a context relocation response comprising a context of the UE.

In an example, a fourth NG-RAN may receive from a UE, a RRC resume request. The fourth NG-RAN may send to a first NG-RAN, a context relocation request message. The context relocation request message may comprise the RRC resume request, and/or an indication that the fourth base station supports MBS. The fourth NG-RAN may receive from the first NG-RAN, a context relocation response message. The context relocation response message may not comprise a context of the UE.

In an example, the first NG-RAN may receive from a fifth NG-RAN, a context relocation request message for a UE. The context relocation request message may comprise a RRC resume request of the UE. The first NG-RAN may determine to relocate a context of the UE, based on that the context relocation request does not comprise an indication that the fourth NG-RAN supports (MBS), and/or based on that the UE subscribes an MBS session. The first NG-RAN may send to the fifth NG-RAN, a context relocation response comprising a context of the UE.

In an example, a first NG-RAN may receive from a second NG-RAN, a Xn message indicating that the second NG-RAN supports MBS. The first NG-RAN may determine, based on the Xn message, an RNA for a UE. For example, based on the fact that the second NG-RAN supports MBS, and/or based on that the UE subscribes an MBS session, the RNA of the UE may comprise an area of the second NG-RAN. The first NG-RAN may send to the UE, a RRC release message comprising information of the RNA.

In an example, the first NG-RAN may send to a UE, a RRC release message indicating transition of the UE to an RRC inactive state. The first NG-RAN may receive, from a core network, a message indicating activation of an MBS service. The first NG-RAN may send to the second NG-RAN, a Xn message comprising at least one of an identifier of the UE, an indication that the UE is in the RRC inactive state, an indication that an RNA of the UE comprises an area of the second NG-RAN, and/or an identifier of the MBS service.

In an example, the first NG-RAN may send to a UE, a RRC release message indicating transition of the UE to an RRC inactive state. The first NG-RAN may receive from a third NG-RAN, a context relocation request message for the UE. The first NG-RAN may send to a second NG-RAN, an Xn message comprising at least one of an identifier of the wireless device and/or an identifier of a multicast broadcast service (MBS) service. For example, the Xn message may indicate to the second NG-RAN that the UE is not in the RRC inactive state, that the first NG-RAN does not manage the context of the UE, and/or that the context of the UE is relocated.

What is claimed is:

1. A method comprising:
  receiving, by a wireless device from a first base station, a radio resource control (RRC) release message indicating transition of the wireless device from an RRC connected state to an RRC inactive state or an RRC idle state;
  performing, by the wireless device, a cell reselection of a cell of a second base station;
  determining, by the wireless device and after the cell reselection, whether one or more RRC messages are received via a multicast control channel (MCCH), wherein the one or more RRC messages comprise a configuration in the cell for a multicast and broadcast service (MBS) session, that the wireless device has joined, for the RRC inactive state or the RRC idle state; and
  sending, by the wireless device in the RRC inactive state or the RRC idle state to the second base station and based on the determining associated with the MBS session, an RRC resume request comprising an indication of a cause for the RRC resume request.

2. The method of claim 1, wherein the configuration is a point-to-multipoint (PTM) configuration for the MBS session for the RRC inactive state and the RRC idle state.

3. The method of claim 1, wherein the RRC release message further comprises a first information indicating whether the MBS session is allowed for the wireless device in the RRC inactive state or in the RRC idle state, a second information indicating one or more cells supporting the MBS session via the RRC inactive state or the RRC idle state, and a third information indicating one or more cells associated with a radio access network notification area.

4. The method of claim 3, wherein the one or more cells associated with the radio access network notification area comprises the cell.

5. The method of claim 1, wherein a N2 message, delivered from an access and mobility management function (AMF) to the first base station, indicates whether the MBS session is allowed for the wireless device in the RRC inactive state or in the RRC idle state, and whether the wireless device supports a capability receiving the MBS session in the RRC inactive state or the RRC idle state.

6. The method of claim 5, wherein, based on the RRC resume request, a path switch request message sent from the second base station to the AMF comprises an indication indicating whether the second base station supports MBS session for the RRC inactive state or the RRC idle state.

7. The method of claim 1, further comprising: performing an additional cell reselection of an additional cell of an additional base station after receiving the RRC release message and prior to the performing the cell reselection.

8. The method of claim 7, further comprising: performing an additional determining by the wireless device after the additional cell reselection and before the cell reselection, whether one or more additional RRC messages are received via an additional MCCH of the additional cell, wherein the one or more additional RRC messages comprise an additional configuration in the additional cell for the MBS session for the RRC inactive state or the RRC idle state.

9. The method of claim 1, wherein a system information block (SIB), associated with the MCCH, of the cell indicates a configuration information of the MCCH.

10. The method of claim 9, wherein the wireless device determines that the configuration is not supported based on the SIB associated with the MCCH is not broadcast in the cell.

11. The method of claim 1, wherein the MBS session is an MBS multicast session.

12. A wireless device comprising:
  one or more processors; and
  memory storing instructions that, when executed by the one or more processors, cause the wireless device to perform:
    receiving, from a first base station, a radio resource control (RRC) release message indicating transition of the wireless device from an RRC connected state to an RRC inactive state or an RRC idle state;

performing a cell reselection of a cell of a second base station;

determining, by the wireless device and after the cell reselection, whether one or more RRC messages are received via a multicast control channel (MCCH), wherein the one or more RRC messages comprise a configuration in the cell for a multicast and broadcast service (MBS) session, that the wireless device has joined, for the RRC inactive state or the RRC idle state; and sending, in the RRC inactive state or the RRC idle state to the second base station and based on the determining associated with the MBS session, an RRC resume request comprising an indication of a cause for the RRC resume request.

13. The wireless device of claim 12, wherein the RRC release message further comprises a first information indicating whether the MBS session is allowed for the wireless device in the RRC inactive state or in the RRC idle state, a second information indicating one or more cells supporting the MBS session via the RRC inactive state or the RRC idle state, and a third information indicating one or more cells associated with a radio access network notification area.

14. The wireless device of claim 12, wherein the configuration is a point-to-multipoint (PTM) configuration for the MBS session for the RRC inactive state and the RRC idle state.

15. The wireless device of claim 12, wherein, based on the RRC resume request, a path switch request message sent from the second base station to an AMF comprises an indication indicating whether the second base station supports MBS for the RRC inactive state or the RRC idle state.

16. A non-transitory computer-readable medium comprising instructions that, when executed by one or more processors of a wireless device, cause the wireless device to perform:

receiving, from a first base station, a radio resource control (RRC) release message indicating transition of the wireless device from an RRC connected state to an RRC inactive state or an RRC idle state;

performing a cell reselection of a cell of a second base station;

determining, by the wireless device and after the cell reselection, whether one or more RRC messages are received via a multicast control channel (MCCH), wherein the one or more RRC messages comprise a configuration in the cell for a multicast and broadcast service (MBS) session, that the wireless device has joined, for the RRC inactive state or the RRC idle state; and sending, in the RRC inactive state or the RRC idle state to the second base station and based on the determining associated with the MBS session, an RRC resume request comprising an indication of a cause for the RRC resume request.

17. The non-transitory computer-readable medium of claim 16, wherein the RRC release message further comprises a first information indicating whether the MBS session is allowed for the wireless device in the RRC inactive state or in the RRC idle state, a second information indicating one or more cells supporting the MBS session via the RRC inactive state or the RRC idle state, and a third information indicating one or more cells associated with a radio access network notification area.

18. The non-transitory computer-readable medium of claim 16, wherein the configuration is a point-to-multipoint (PTM) configuration for the MBS session for the RRC inactive state and the RRC idle state.

19. The non-transitory computer-readable medium of claim 16, wherein, based on the RRC resume request, a path switch request message sent from the second base station to an AMF comprises an indication indicating whether the second base station supports MBS for the RRC inactive state or the RRC idle state.

20. The non-transitory computer-readable medium of claim 16, wherein the MBS session is an MBS multicast session.

* * * * *